(12) United States Patent
Dray et al.

(10) Patent No.: US 12,258,097 B2
(45) Date of Patent: Mar. 25, 2025

(54) MOTORISED SCOOTER

(71) Applicant: D-FLY GROUP LTD, London (GB)

(72) Inventors: Andrew John Dray, Ravenshead (GB); Jeremy Williman, London (GB)

( * ) Notice: Subject to any disclaimer, the term of this patent is extended or adjusted under 35 U.S.C. 154(b) by 0 days.

(21) Appl. No.: 17/784,540

(22) PCT Filed: Dec. 9, 2020

(86) PCT No.: PCT/EP2020/085303
§ 371 (c)(1),
(2) Date: Jun. 10, 2022

(87) PCT Pub. No.: WO2021/116181
PCT Pub. Date: Jun. 17, 2021

(65) Prior Publication Data
US 2023/0031917 A1    Feb. 2, 2023

(30) Foreign Application Priority Data

Dec. 10, 2019 (GB) ..................................... 1918130

(51) Int. Cl.
*B62K 5/08* (2006.01)
*B62K 5/027* (2013.01)
*B62K 5/05* (2013.01)
*B62K 15/00* (2006.01)
*B62K 21/12* (2006.01)
*B62K 23/02* (2006.01)
*B62K 25/04* (2006.01)

(52) U.S. Cl.
CPC ................ *B62K 5/08* (2013.01); *B62K 5/027* (2013.01); *B62K 5/05* (2013.01); *B62K 15/006* (2013.01); *B62K 21/12* (2013.01); *B62K 23/02* (2013.01); *B62K 25/04* (2013.01); *B62K 2202/00* (2013.01)

(58) Field of Classification Search
CPC . B62K 5/08; B62K 5/027; B62K 5/05; B62K 15/006; B62K 21/12; B62K 23/02; B62K 25/04; B62K 2202/00
See application file for complete search history.

(56) References Cited

U.S. PATENT DOCUMENTS

| 4,775,162 | A | 10/1988 | Chao | |
|---|---|---|---|---|
| 6,286,843 | B1 | 9/2001 | Lin | |
| 6,378,642 | B1 * | 4/2002 | Sutton | B62M 6/65 180/208 |
| 8,141,890 | B2 * | 3/2012 | Hughes | B62K 5/10 280/5.509 |
| 9,073,594 | B2 * | 7/2015 | Sluijter | B62K 15/006 |
| 9,446,811 | B1 * | 9/2016 | Abel | B62K 3/002 |
| 9,567,034 | B2 * | 2/2017 | Sirbu | B62K 21/12 |

(Continued)

FOREIGN PATENT DOCUMENTS

| CN | 1966344 A | 5/2007 |
|---|---|---|
| CN | 204527473 U | 8/2015 |

(Continued)

*Primary Examiner* — Toan C To
(74) *Attorney, Agent, or Firm* — Harter Secrest & Emery LLP

(57) ABSTRACT

A battery powered electric scooter (100) having two front wheels, a deck (102) and tiller (104), and a dual mode steering system responsive to turn the wheels upon rotation of the tiller (104) about a vertical axis and/or upon rotation of the deck (102) about a horizontal axis.

19 Claims, 45 Drawing Sheets

(56) References Cited

U.S. PATENT DOCUMENTS

| | | | |
|---|---|---|---|
| 9,610,998 B1 | 4/2017 | Labonty | |
| 10,189,533 B2* | 1/2019 | Lovley | B62K 11/02 |
| 10,696,344 B2* | 6/2020 | Augustin | B62J 43/16 |
| 11,420,703 B2* | 8/2022 | Virag | B62K 3/002 |
| 11,702,048 B2* | 7/2023 | Kandemir | G08C 17/02 188/74 |
| 2005/0236803 A1 | 10/2005 | Summers et al. | |
| 2008/0251309 A1* | 10/2008 | Lippert | B62K 5/08 180/212 |
| 2010/0044977 A1* | 2/2010 | Hughes | B62K 5/10 280/5.509 |
| 2011/0024217 A1* | 2/2011 | Sluijter | B62K 15/006 180/208 |
| 2011/0057412 A1* | 3/2011 | Owoc | B62M 1/26 280/257 |
| 2015/0122566 A1* | 5/2015 | Constien | B62J 6/022 280/651 |
| 2016/0315521 A1* | 10/2016 | Gimlan | B62M 1/28 |
| 2017/0210440 A1* | 7/2017 | Dragomir | B62K 23/06 |
| 2019/0144035 A1* | 5/2019 | Doerksen | B62D 9/02 280/124.103 |
| 2019/0152554 A1 | 5/2019 | Xiansheng | |
| 2019/0275896 A1 | 9/2019 | Hiroki et al. | |
| 2021/0046994 A1* | 2/2021 | Virag | A63C 17/015 |
| 2022/0017121 A1* | 1/2022 | McLean | G06V 20/593 |
| 2022/0306233 A1* | 9/2022 | Chee | B62K 5/05 |

FOREIGN PATENT DOCUMENTS

| | | |
|---|---|---|
| CN | 105189274 A | 12/2015 |
| CN | 205837069 U | 12/2016 |
| CN | 205931088 U | 2/2017 |
| CN | 206813188 U | 12/2017 |
| CN | 108337883 A | 7/2018 |
| CN | 109018134 A | 12/2018 |
| DE | 20021083 U1 | 3/2001 |
| DE | 20103486 U1 | 5/2001 |
| DE | 102017001556 A1 | 8/2018 |
| DE | 102018205518 B3 | 8/2019 |
| DE | 102018206225 A1 | 10/2019 |
| EP | 3702259 A1 | 9/2020 |
| FR | 2961960 A1 | 12/2011 |
| GB | 2367541 A | 4/2002 |
| GB | 2385838 A | 9/2003 |
| JP | 2004123080 A | 4/2004 |
| KR | 20160103472 A | 9/2016 |
| KR | 201765798 A | 6/2017 |
| WO | 2015095368 A1 | 6/2015 |
| WO | 20170197725 A1 | 11/2017 |
| WO | 2018068277 A1 | 4/2018 |
| WO | 20180172308 A1 | 9/2018 |
| WO | 2019171313 A1 | 9/2019 |
| WO | 20190201508 A1 | 10/2019 |
| WO | 2020033599 A1 | 2/2020 |
| WO | WO-2022224238 A1 * | 10/2022 |
| WO | WO-2022263755 A1 * | 12/2022 |

* cited by examiner

MOTORISED SCOOTER

TECHNICAL FIELD

The present disclosure relates generally to a motorised scooter. More specifically, the present disclosure is concerned with an electric scooter.

BACKGROUND

Where used herein, the term "scooter" is intended to mean a stand-up scooter or 'kick' scooter, rather than a motorcycle-type scooter. Scooters according to the present disclosure are distinguished in having a deck, generally proximate and parallel to the floor with wheels mounted thereon. An upright or 'tiller' is provided extending vertically upward from the forward end of the deck featuring handlebars to facilitate stability and steering.

Traditionally such scooters have been human-powered, specifically by pushing the scooter along with one foot whilst the other (load-bearing) foot remains on the deck. More recently, motorised scooters have appeared on the market. Initial designs utilised internal combustion engines, but battery-powered electric scooters have grown in popularity since the early 2010s and represent a fast, efficient, environmentally friendly and convenient way to travel.

Some kick scooters (in particular those marketed towards the junior market) typically have a single front wheel and a single rear wheel. They utilised a simple steering system in which rotation of the tiller about a vertical axis, using the handlebars, would also rotate the front wheel.

One such known scooter is the Moove™ range of scooters. These battery powered electric scooters are of a two wheel design (front and rear) with the front wheel pivoting about a substantially vertical axis to steer. Rotation of the handlebars about that axis rotates the front wheel. These products are based on traditional two-wheeled "trick" scooters.

The Bajaboard™, although not a scooter per se, is a four-wheeled electric skateboard designed for off-road use. It can be steered by rotating the board about a longitudinal or horizontal axis (i.e. "leaning" on the board).

The Cycleboard™ is a three-wheeled electric scooter that features a "lean to steer" steering system. Two wheels are provided at the front, and one at the rear. U.S. Pat. No. 9,610,988 B1 relates to the Cycleboard™. According to that document, "A steering transmission arm transmits lateral movement via a pair of steering rods to the front wheels, so that when the scooter deck is leaned to one of the leaning configurations, the movement causes the steering transmission arm to turn the front wheels via the steering rods."

U.S. Pat. No. 9,610,988 B1 discloses a scooter in which the two front wheels are rotatable relative to a frame about respective wheel pivots having vertical steering axes. The deck is also mounted for rotation about a "roll" or horizontal axis in the direction of travel. The upright of the disclosed scooter is foldable towards the deck, but otherwise is rigidly attached thereto such that it can be used to help "roll" or "lean" the deck about the roll axis. The upright is rotationally fixed about the vertical axis.

A mechanism is provided such that when the deck is leaned to the side about the roll axis, the wheels turn about their respective steering axes (in the same direction as the roll). The mechanism has a steering transmission arm pivoted to the frame at a first end, coupled to the deck at a mi-point and attached to two steering rods at a second end. When the deck is rotated about the horizontal axis, the steering transmission arm is driven in rotation and as such drives the steering arms to rotate the respective wheels about their respective steering axes.

Essentially, there are two types of steering provided in the prior art. One type is "vertical pivot" steering found on most two-wheeled trick scooters. This type of steering is useful for low speed movements and tricks because it is highly sensitive and can offer a high degree of maneuverability. The other type is "lean to steer" steering found on three-wheeled off-road and high-speed electric scooters. This type of steering is suitable for high-speed, stable "carving" turns, but lacks manoeuvrability at low speeds. Indeed, performing tight turns at low speed would require the rider to roll the deck to a significant degree which would be difficult.

It is an aim of the present invention to overcome, or at least mitigate the aforementioned problems with the prior art.

SUMMARY

According to a first aspect of the invention there is provided a scooter comprising:
  a deck for a rider to stand on;
  a tiller projecting upwardly from the deck in use;
  two front wheels;
  a steering mechanism configured to steer the two front wheels about respective steering axes; and,
  at least one rear wheel;
  wherein the steering system has:
    a first mode of steering in which rotation of the tiller about a vertical axis steers the wheels; and,
    a second mode of steering in which rotation of the deck about a horizontal axis steers the wheels.

Advantageously, this dual mode steering provides both the ability to provide a high degree of manoeuvrability in the first mode for low speeds, and a 'carving' high speed mode of steering using deck roll. Both modes can be used together, without having to switch any controls on the scooter.

By "first mode of steering" and "second mode of steering" we do not mean that a positive control is required to switch between two modes—rather that the steering can be operated using the first mode and/or the second mode. In other words, the modes can be utilised independently or simultaneously at any point during use of the scooter at the rider's preference.

Preferably a central boss is provided, wherein;
  the tiller is mounted for rotation relative to the central boss about the vertical axis; and,
  the deck is mounted for rotation relative to the central boss about the horizontal axis.

Preferably the steering system comprises a pair or steering arms connected to respective front wheels, the steering arms being connected to a steering hub, wherein the steering hub is configured to move with rotation of the tiller in the first steering mode, and with rotation of the deck in the second steering mode.

Preferably the steering hub is mounted for rotation with the tiller, the tiller is mounted for rotation in a tiller pivot member about the vertical axis, and the tiller pivot member is mounted for rotation in the central boss about the horizontal axis.

Preferably a resilient centring mechanism is provided for resiling the tiller to a predetermined neutral rotational position relative to the central boss.

Preferably an anti-camber mechanism is provided for resiling the deck to a predetermined neutral rotational position relative to the central boss.

Preferably the two front wheels are mounted to the central boss via a suspension system.

Preferably the suspension system is a double-wishbone suspension system.

Preferably the rear wheel is mounted for rotation in a rear wheel mount, and in which the deck is rotatable about the horizontal axis about the rear wheel mount.

There is also an embodiment having four wheels, in which a pair of rear wheels and a rear steering mechanism is provided configured to steer the two rear wheels about respective steering axes.

Preferably rotation of the deck about the horizontal axis steers the wheels.

Preferably rotation of the deck about the horizontal axis causes the front wheels to steer in a first direction about their respective steering axes, and causes the rear wheels to steer a second, opposite, direction about their respective steering axes.

Preferably the rear steering system is configured to steer the rear wheels in the second mode of steering but not in the first mode of steering.

Preferably the rear steering mechanism is adjustable to provide at least two steering settings, in which each steering steers the wheels by a different angle in response to a predetermined degree of deck roll.

Preferably the rear steering mechanism is configured for Ackermann steering.

Preferably the front steering mechanism is configured for Ackermann steering.

According to a second aspect there is provided a motorised scooter comprising:
   a deck for a rider to stand on;
   a tiller projecting upwardly from the deck in use;
   at least one front wheel;
   at least one rear wheel;
   wherein at least one wheel is motorised;
   wherein the tiller comprises a left-hand grip, a right-hand grip, and a first control member between the left-hand grip and right-hand grip, the control member being pivotable about a horizontal axis to control power to the motorised wheel.

Advantageously this provides a convenient degree of control whereby the user can simply use one or two thumb to control the scooter.

Preferably the first control member comprises a first control region adjacent the left-hand grip, and a second control region adjacent the right-hand grip.

Preferably the control regions are at least part-cylindrical.

Preferably the first and second control regions are spaced-apart and comprise a second control member between the first and second control regions.

Preferably the second control member is a button.

Preferably the second control member is a left turn signal control proximate the left-hand control region, and comprising a third control member in the form of a right turn signal control between the first and second control regions, proximate the right-hand control region.

Preferably there is provided a fourth control member between the first and second control regions, the fourth control member being a horn.

According to a third aspect of the invention there is provided a battery-powered electric scooter battery pack, comprising at least two sub-battery packs that can be assembled for use and separated for transit.

Preferably which each sub-battery pack has an energy capacity of 160 Whr or less.

The invention also provides a battery-powered electric scooter comprising a battery pack according to the third aspect.

According to a fourth aspect there is provided a scooter comprising:
   a deck for a rider to stand on;
   a tiller projecting from the deck in use;
   at least one front wheel;
   the scooter having an unfolded condition wherein the tiller projects upwardly from the deck in use, and a folded condition wherein the tiller is rotated to be generally parallel with the deck;
   wherein the folded condition is maintained by a magnetic attraction between a first component on the tiller and a second component on the deck, and wherein alignment of the first and second components is established by a mating connection between corresponding formations on the tiller and deck, being spaced apart from the first and second components.

Preferably the mating connection between corresponding formations is closer to the position where the deck and tiller are joined than the first component on the tiller and a second component on the deck forming the magnetic connection.

According to a fifth aspect there is provided a scooter comprising:
   a deck for a rider to stand on;
   a tiller connected to the deck at a first end, and defining a pair of spaced apart handle portions at a second end;
   at least one front wheel;
   at least one rear wheel;
   wherein the tiller comprises an internal spine extending from first end where the tiller meets the deck, to a second end within the handle portions, wherein the spine is Y-shaped.

BRIEF DESCRIPTION OF THE DRAWING FIGURES

Example scooters in accordance with the present invention will now be described with reference to the accompanying drawings in which:

FIG. 5b is a detailed view of a part of the tiller of FIG. 5a;

FIG. 5c is a detail section view of a part of the tiller of FIG. 5a;

FIG. 5h is a perspective view of a part of the tiller of FIG. 5a;

FIG. 5i is a partially exploded perspective view of a battery pack of the tiller of FIG. 5a;

FIG. 5j is a perspective detail view of a control area of the tiller of FIG. 5a;

FIG. 5k is a perspective detail view of a control area of the tiller of FIG. 5a;

FIG. 5l is a perspective view of an internal component of the tiller of FIG. 5a;

FIGS. 6b and 6c are perspective views of a part of the front wheel suspension and steering assembly of FIG. 6a;

FIGS. 6d and 6e are views from the front and rear respectively of the front wheel suspension and steering assembly of FIG. 6a;

FIG. 6f is a perspective view of the front wheel suspension and steering assembly of FIG. 6a;

FIG. 6g is an exploded view of various parts of the front and rear respectively of the front wheel suspension and steering assembly of FIG. 6a;

FIGS. 6h and 6i are perspective views of various parts of the front and rear respectively of the front wheel suspension and steering assembly of FIG. 6a;

FIG. 6j is and exploded view of various parts of the front and rear respectively of the front wheel suspension and steering assembly of FIG. 6a;

FIG. 6k is a detail view of various parts of the front and rear respectively of the front wheel suspension and steering assembly of FIG. 6a;

FIG. 6l is an underside view of various parts of the front wheel suspension and steering assembly of FIG. 6a;

FIG. 7b is a side view of the rear wheel assembly of FIG. 7a;

FIG. 7c is a perspective view of some parts of the rear wheel assembly of FIG. 7a;

FIG. 7d is an exploded view of some parts of the rear wheel assembly of FIG. 7a;

FIGS. 7e and 7f are perspective views of a part of the rear wheel assembly of FIG. 7a;

FIG. 7g is a perspective view of some parts of the rear wheel assembly of FIG. 7a;

Figure 11:
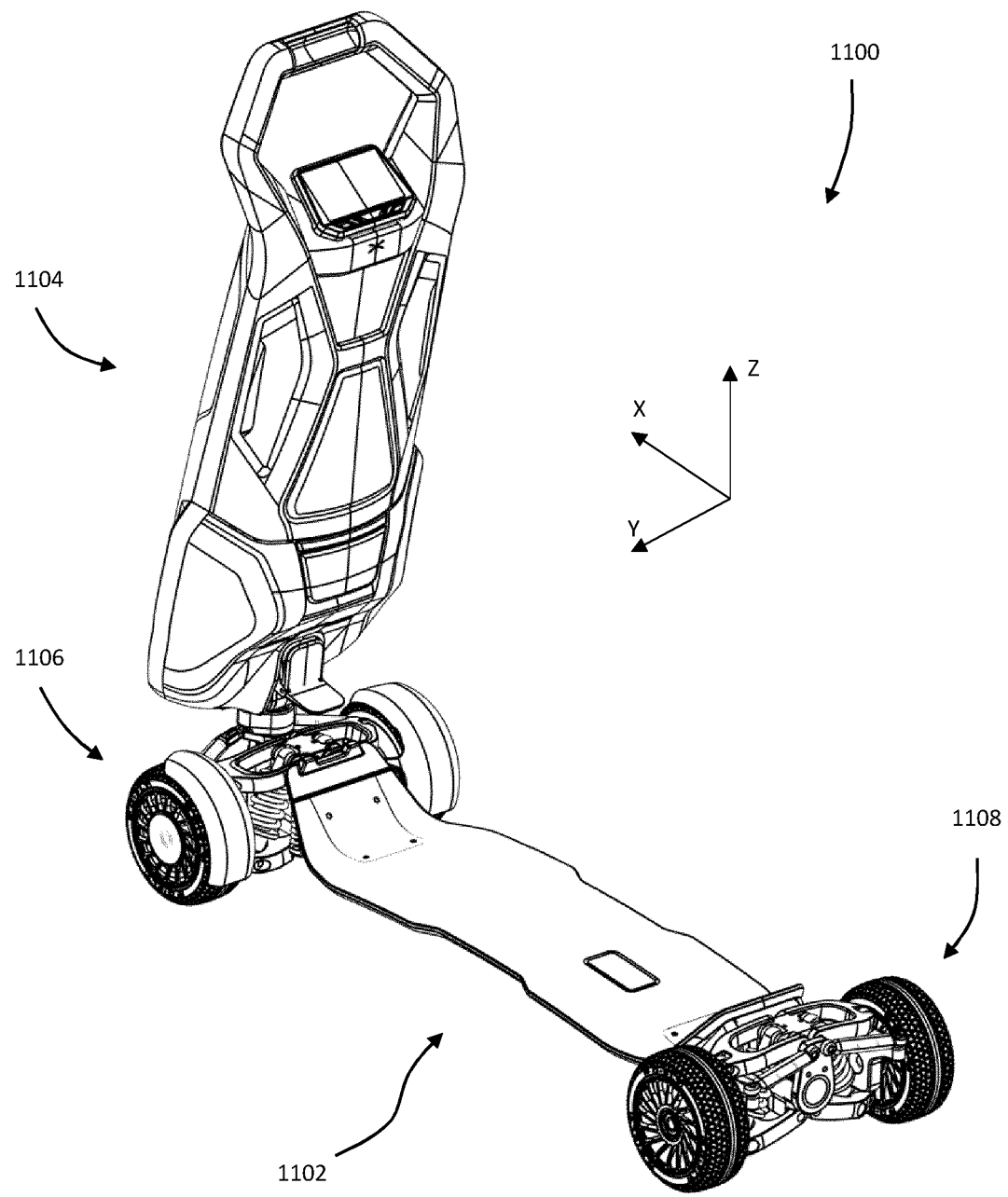
FIG. 11 is a first perspective view of a second scooter in accordance with the present invention.
Figure 15A:
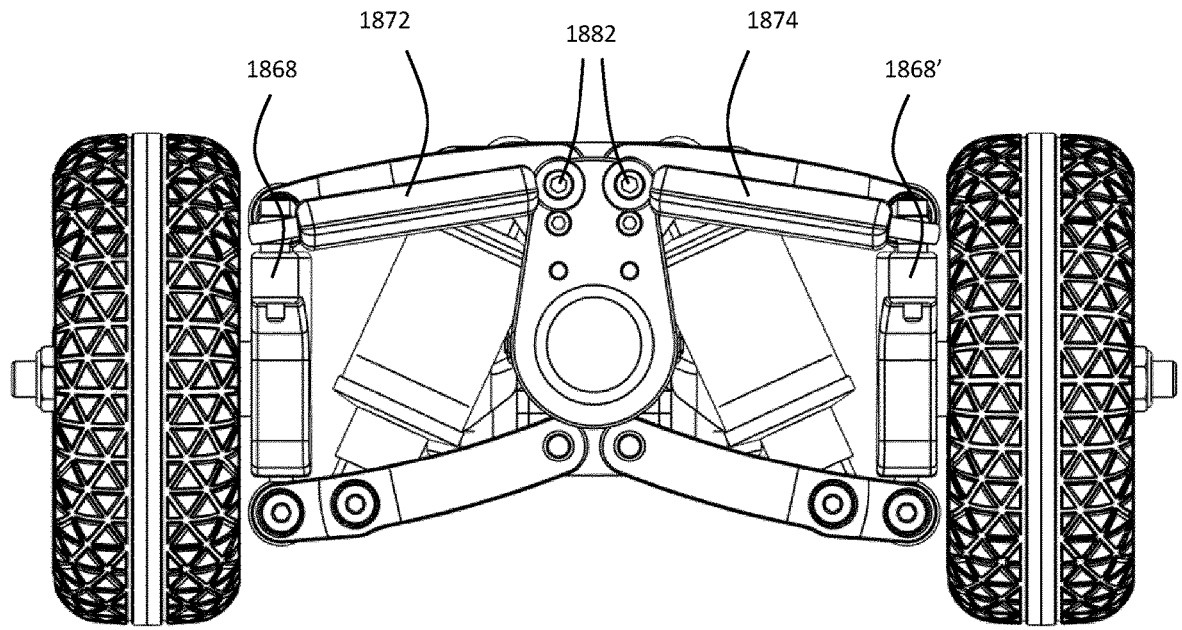
FIG. 15a is a rear view of a part of the scooter of FIG. 11 in a first setting of the steering system.
Figure 15B:
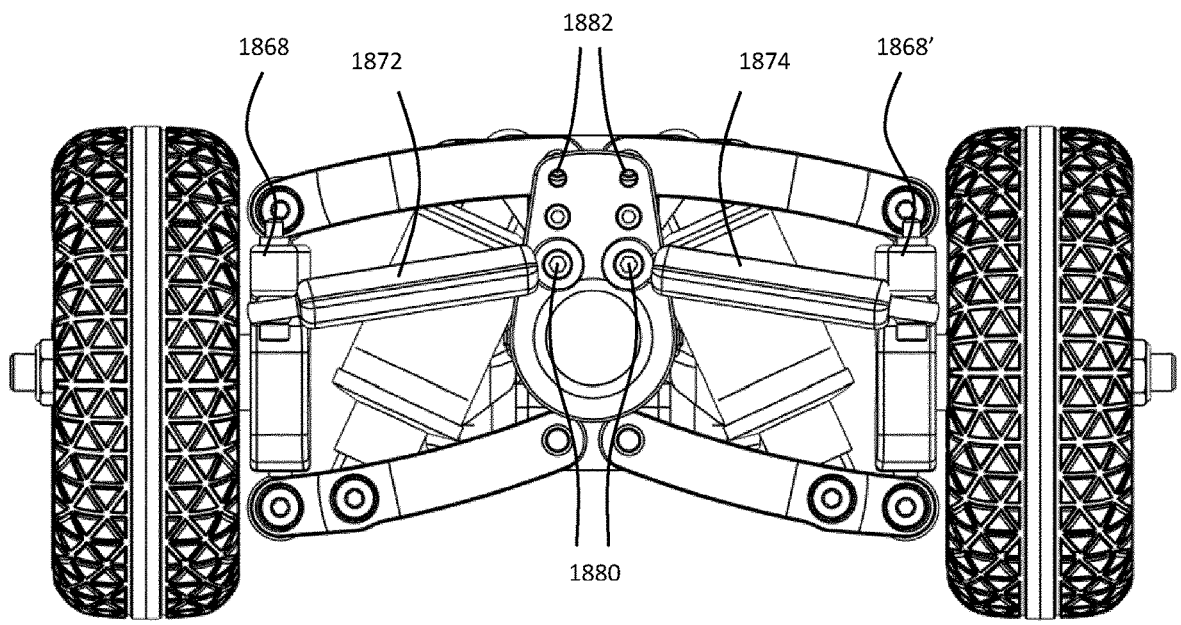

and,

FIG. 15b is a rear view of a part of the scooter of FIG. 11 in a second setting of the steering system.

DETAILED DESCRIPTION

First Embodiment

FIGS. 1a to 1c and 2b are various views of an entire electric scooter 100 according to a first aspect of the present invention. For the purposes of the present disclosure it is useful to define global directions and axes as follows:

Direction of forward travel along horizontal longitudinal axis X;
   Rotation about this axis is "roll";
Lateral direction along horizontal axis Y;
   Rotation about this axis is "pitch";
Vertical direction along vertical axis Z;
   Rotation about this axis is "yaw".

The scooter 100 comprises a deck assembly 102, a tiller assembly 104, a front wheel suspension and steering assembly 106 and a rear wheel assembly 108. Comparing FIGS. 1a to 1c and FIGS. 3a and 3b, the scooter 100 can be moved from an unfolded condition where the deck 102 is on the ground with the tiller 104 normal thereto (upright) to a folded condition where the deck and tiller are parallel.

Structure of the First Embodiment

Deck Assembly 102

Figure 4:
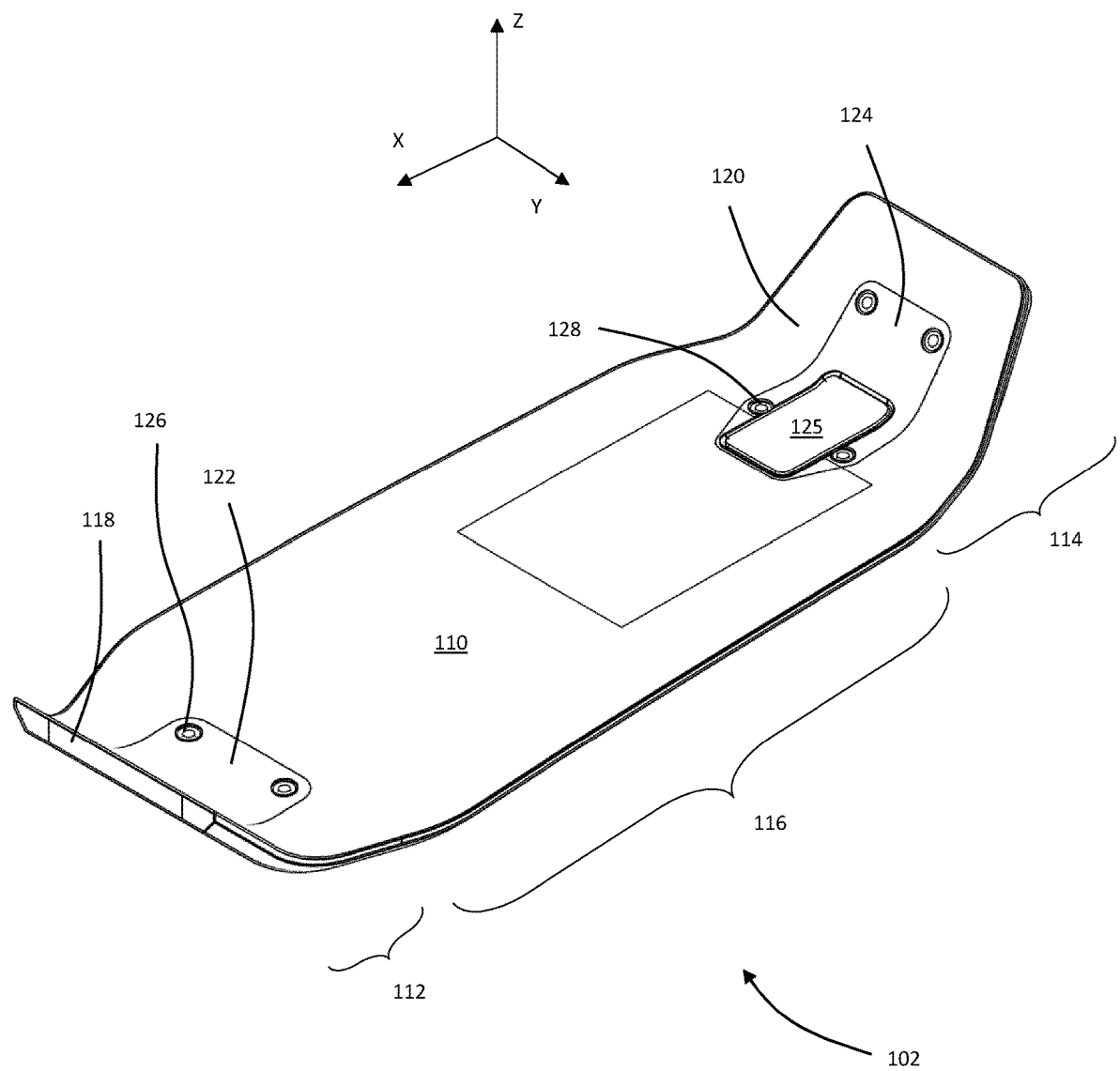
FIG. 4 is a perspective view of the deck assembly of the scooter of FIG. 1.

Referring to FIG. 4, the deck assembly 102 is shown.

The deck assembly 102 comprises a deck panel 110 having a front portion 112, rear portion 114 and a central portion 116. The front and rear portions 112, 114 are defined by upturned, curved regions 118, 120 respectively, extending at 45 degrees to the flat, planar central portion 116. Each of the front and rear portions 112, 114 are also narrower in the lateral direction than the central portion 110, being tapered at the curved regions 118, 120. The deck panel 110 is constructed from a composite material to be lightweight and stiff (e.g. carbon fibre reinforced polymer).

The deck assembly 102 comprises a front deck insert 122 and a rear deck insert 124. The deck inserts 122, 124 are constructed from a metal material (so they are able to hold a thread) and embedded in the panel 110 with fixing holes 126, 128 respectively being open to the surface of the deck assembly 102. Each deck insert 122, 124 extends through the respective curved region 118, 120.

The rear deck insert 124 comprises a locking plate 125 constructed from a ferromagnetic material.

Tiller Assembly 104

FIGS. 5a to 5k show the tiller 104. The tiller 104 comprises:
- A tiller pivot and folding assembly 130 (FIGS. 5b to 5g);
- A battery assembly 134 (FIGS. 5h and 5i);
- A control assembly 135 (FIGS. 5j and 5k); and,
- A spine 132 (FIG. 5l).

The tiller pivot and folding subassembly 130 is shown in FIGS. 5b to 5g. The assembly comprises a tiller pivot shaft 138, a tiller mount 348 and a catch 350.

Figure 5A:
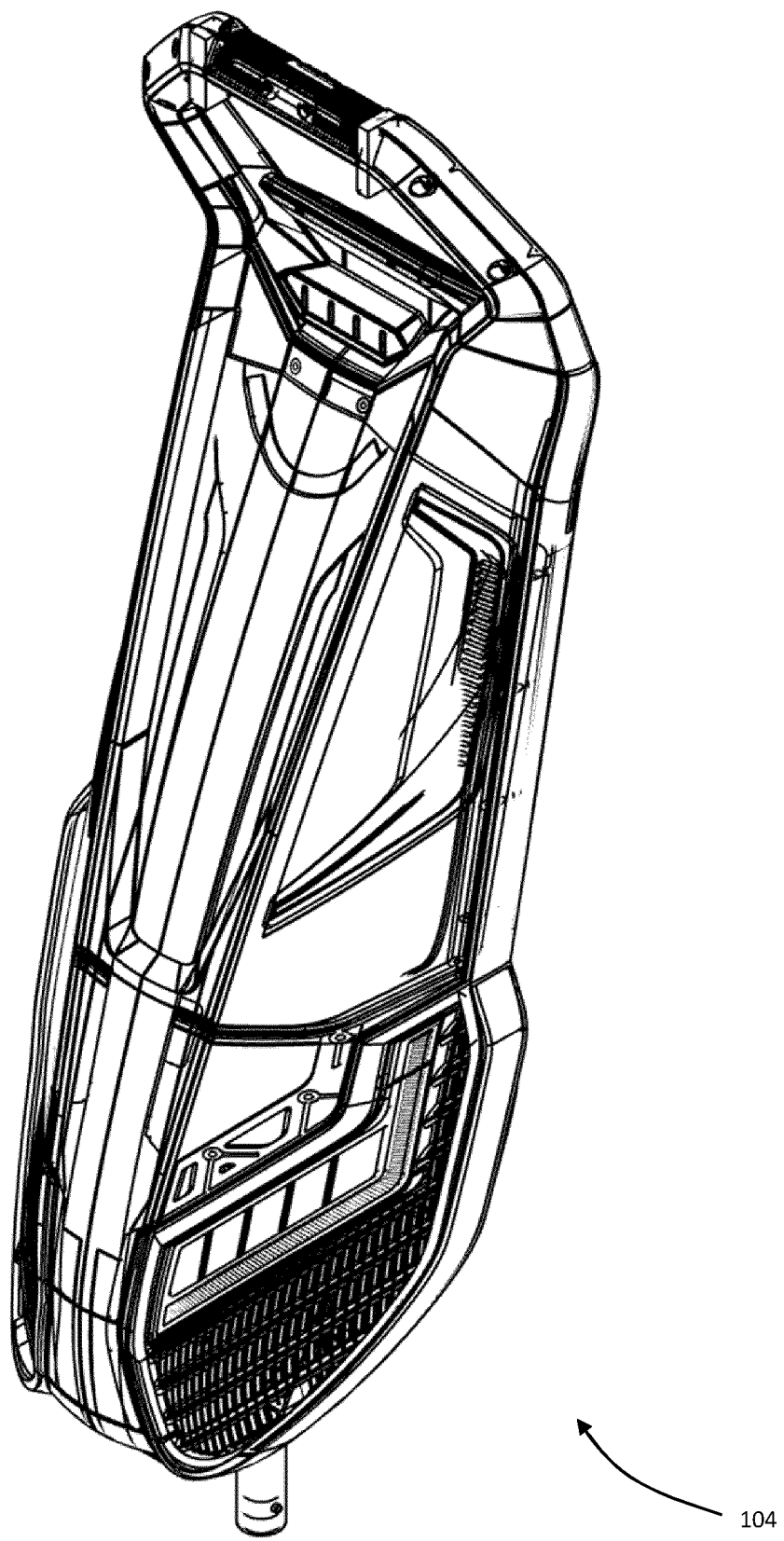
FIG. 5a is a perspective view of the tiller of the scooter of FIG. 1.
Figure 5B:
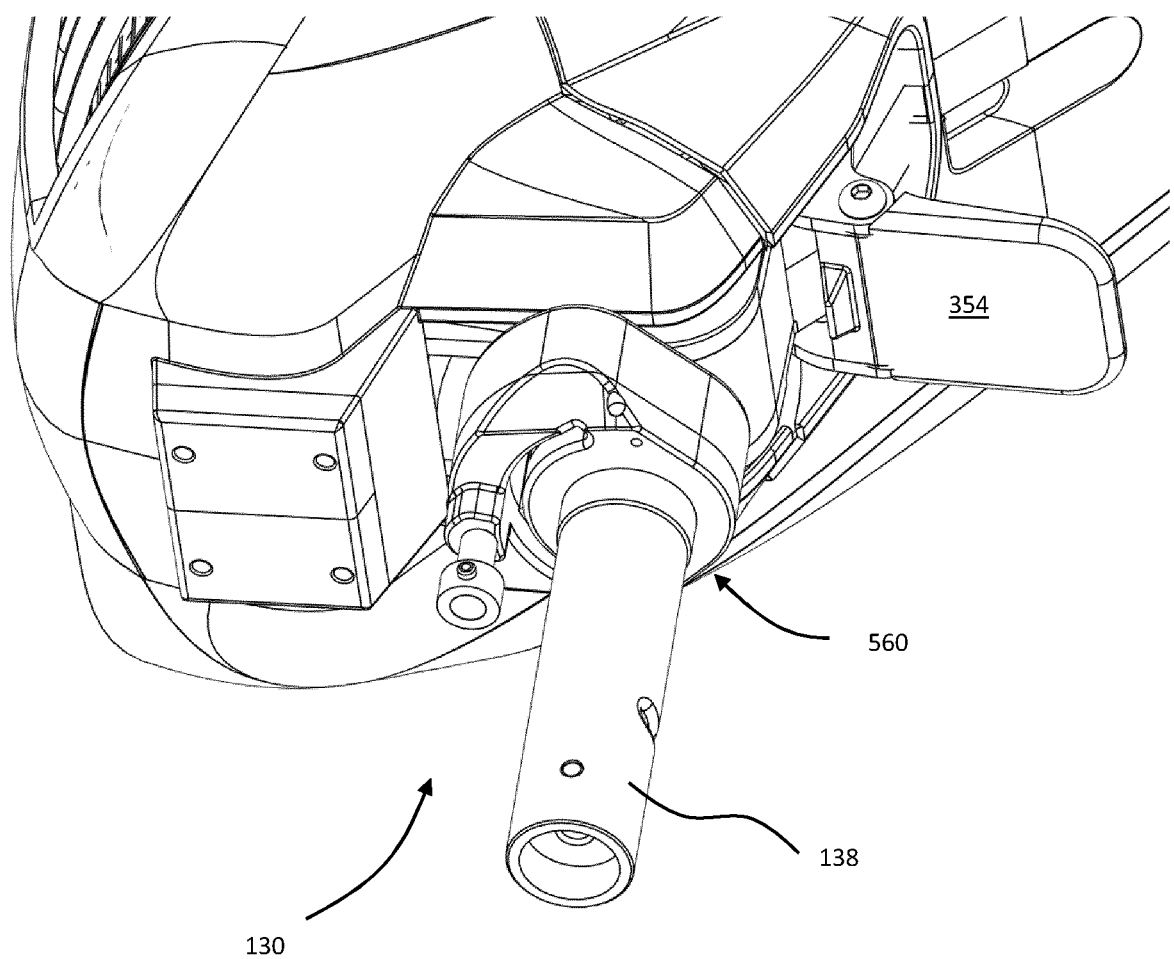
Figure 5C:
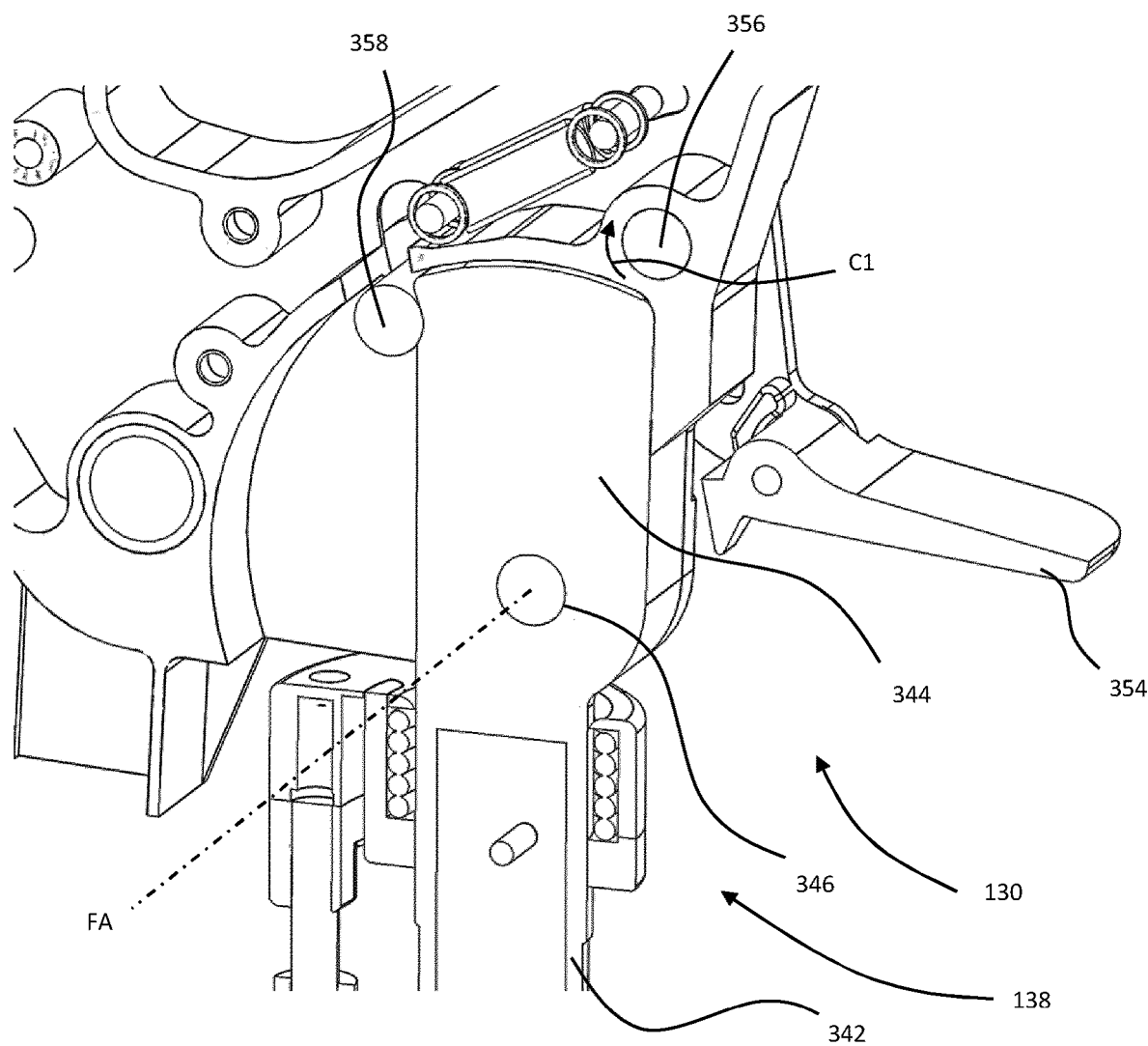
Figure 5D:
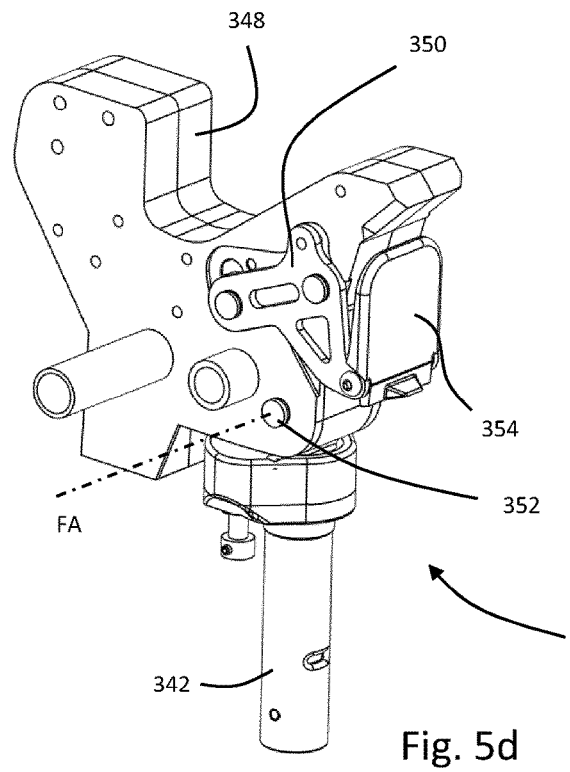
FIG. 5d is a perspective view of the hinge mechanism of the tiller of FIG. 5a in a first condition.
Figure 5E:
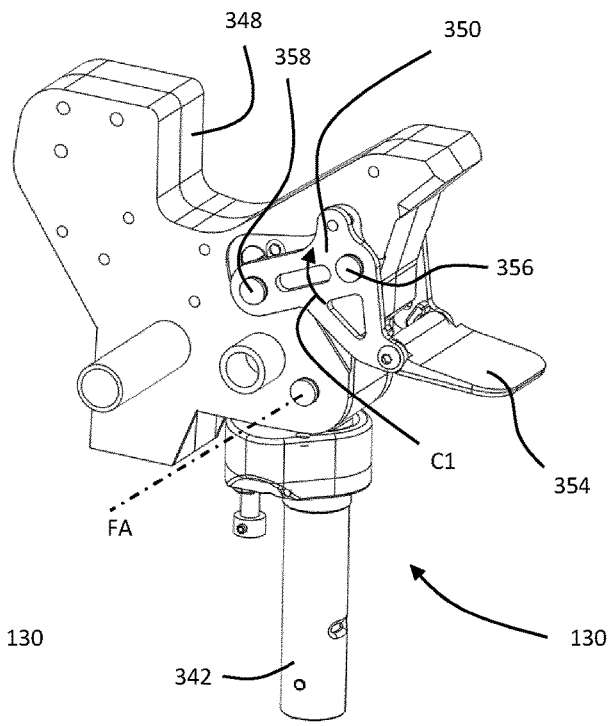
FIG. 5e is a perspective view of the hinge mechanism of the tiller of FIG. 5a in a second condition.
Figure 5F:
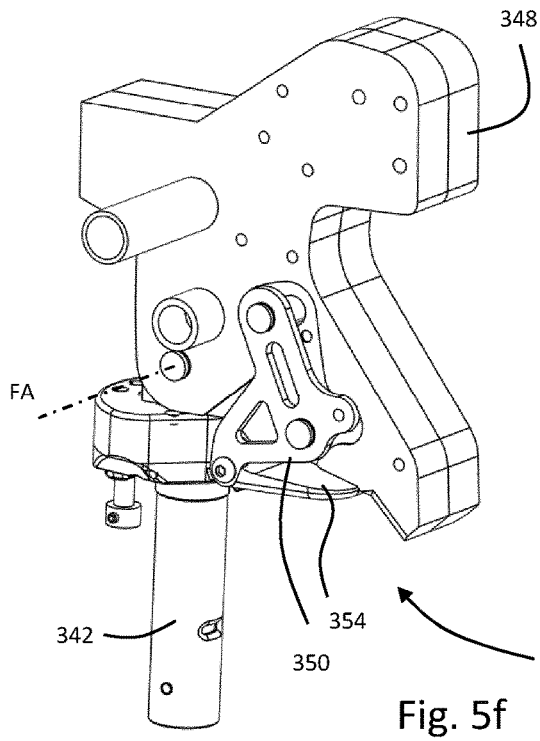
FIG. 5f is a perspective view of the hinge mechanism of the tiller of FIG. 5a in a third condition.
Figure 5G:
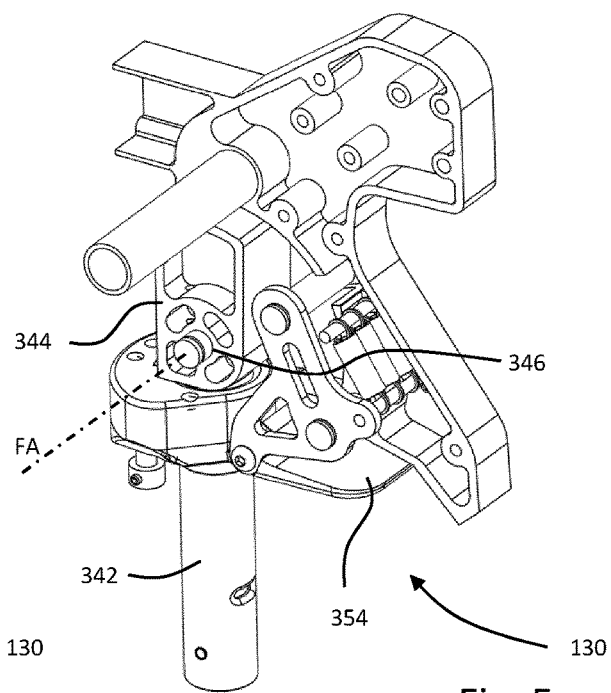
FIG. 5g is a perspective view of the hinge mechanism of the tiller of FIG. 5a in a fourth condition.

The tiller pivot shaft comprises a main shaft portion 342 and a head 344 defining a tilt pivot shaft bore 346 (FIGS. 5c and 5g).

The tiller mount 348 is attached to the main part of the tiller, and moveable therewith. The tiller mount 348 is pivotably mounted to the tiller pivot shaft 130 via a tilt pivot shaft 352 which is engaged with the tilt pivot shaft bore 346. This enables the tiller mount 348 (and tiller) to rotate about a folding axis FA.

The catch 350 comprises two spaced-apart plates either side of the tiller mount 348. The catch 350 comprises a pedal 354 rotatable between a stowed position where is sits flush with the tiller mount 348 (FIG. 5d) and a deployed position rotated 90 degrees to project approximately parallel with the deck. This enables a user's foot to actuate the pedal 354. The catch 350 has a pivot pin 356 to enable rotation relative to the tiller mount 348. The catch 350 further comprises an abutment shaft 358 (FIG. 5c).

The battery assembly 134 is shown in FIGS. 5d and 5e. The battery assembly 134 comprises a tiller subassembly 300 and a battery module 302. The tiller subassembly comprises electrical power connectors for the transfer of electrical energy from the battery module (e.g. when powering the wheel motors, lights, sounds) and to the battery module when recovering energy from e.g. braking (reverse driving the wheel motors).

The battery module 302 is configured to be easily installed and removed in the base of the tiller. The module 302 comprises a lever 304 which can be lifted in direction L to release a mechanical locking mechanism to allow removal of the module 302 in direction BR. Replacement of the module 302 re-connects the electrical contact between the tiller subassembly 300 and the battery module 302.

There are three types of battery module 302 with this particular embodiment:
- A travel pack (module 302);
- A standard capacity pack; and,
- A high capacity pack.

The standard and high capacity packs are unitary modules that provide predetermined amounts of energy (the high capacity pack simply containing more cells).

The travel pack, embodiment in module 302, has a 320 Whr (Watt-hours) energy storage capacity. The pack 302 comprises a module carrier 306, a first battery sub-module 308 and a second battery sub-module 310. Each sub-module 308, 310 has a capacity of 160 Whr. This means that the battery sub-modules 308, 310 may be separate (e.g. by removing both from the carrier 306) and stored in passenger carry-on baggage under CAA (Civil Aviation Authority) rules. This allows the authorised transport of the scooter and associated batteries on aircraft.

Figure 5H:
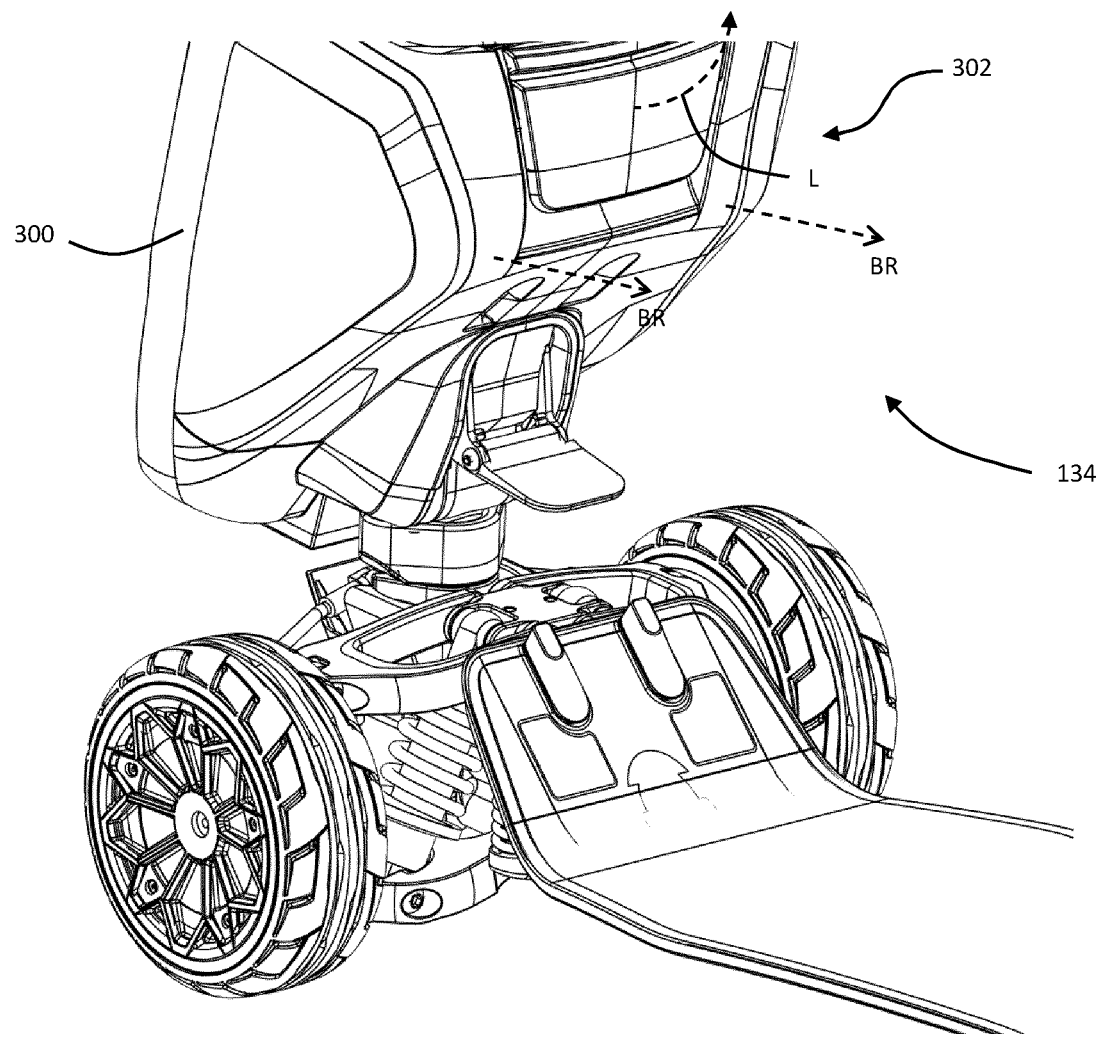
Figure 5I:
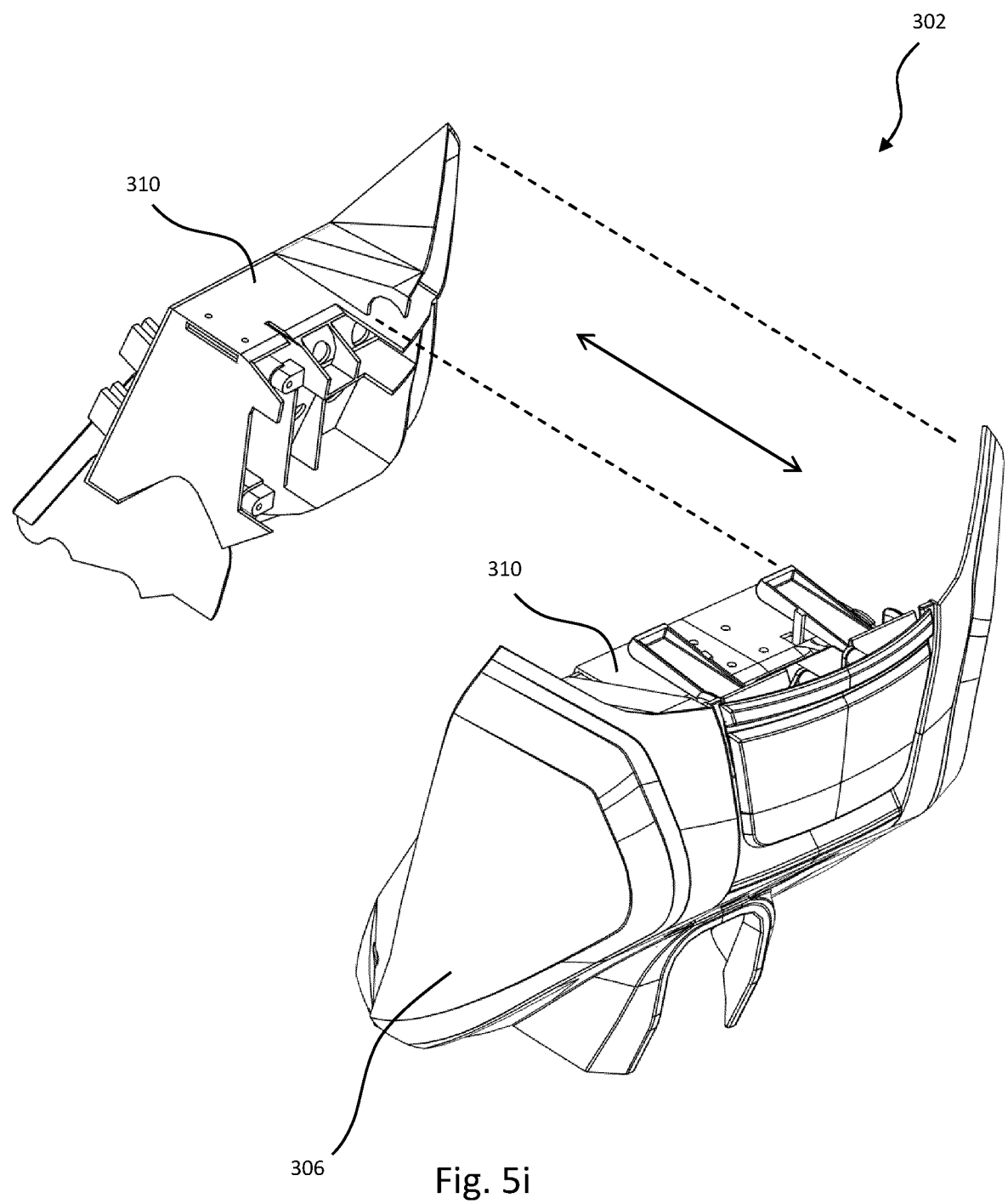
Figure 5J:
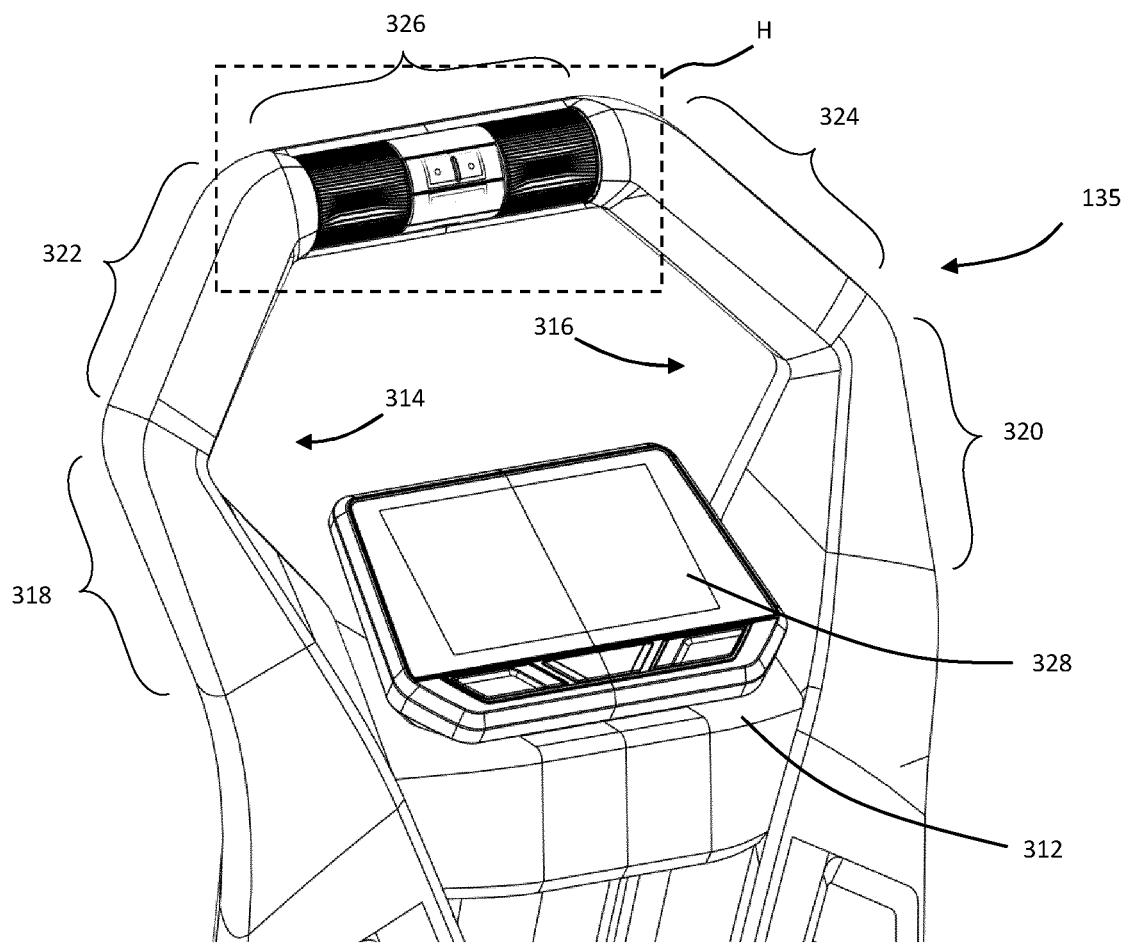
Figure 5K:
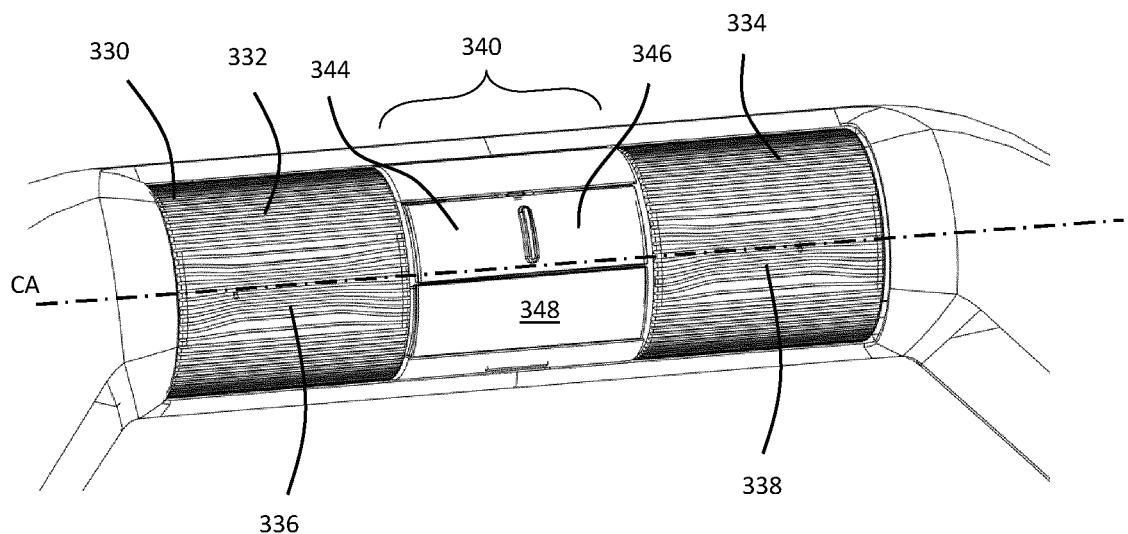
Figure 5L:
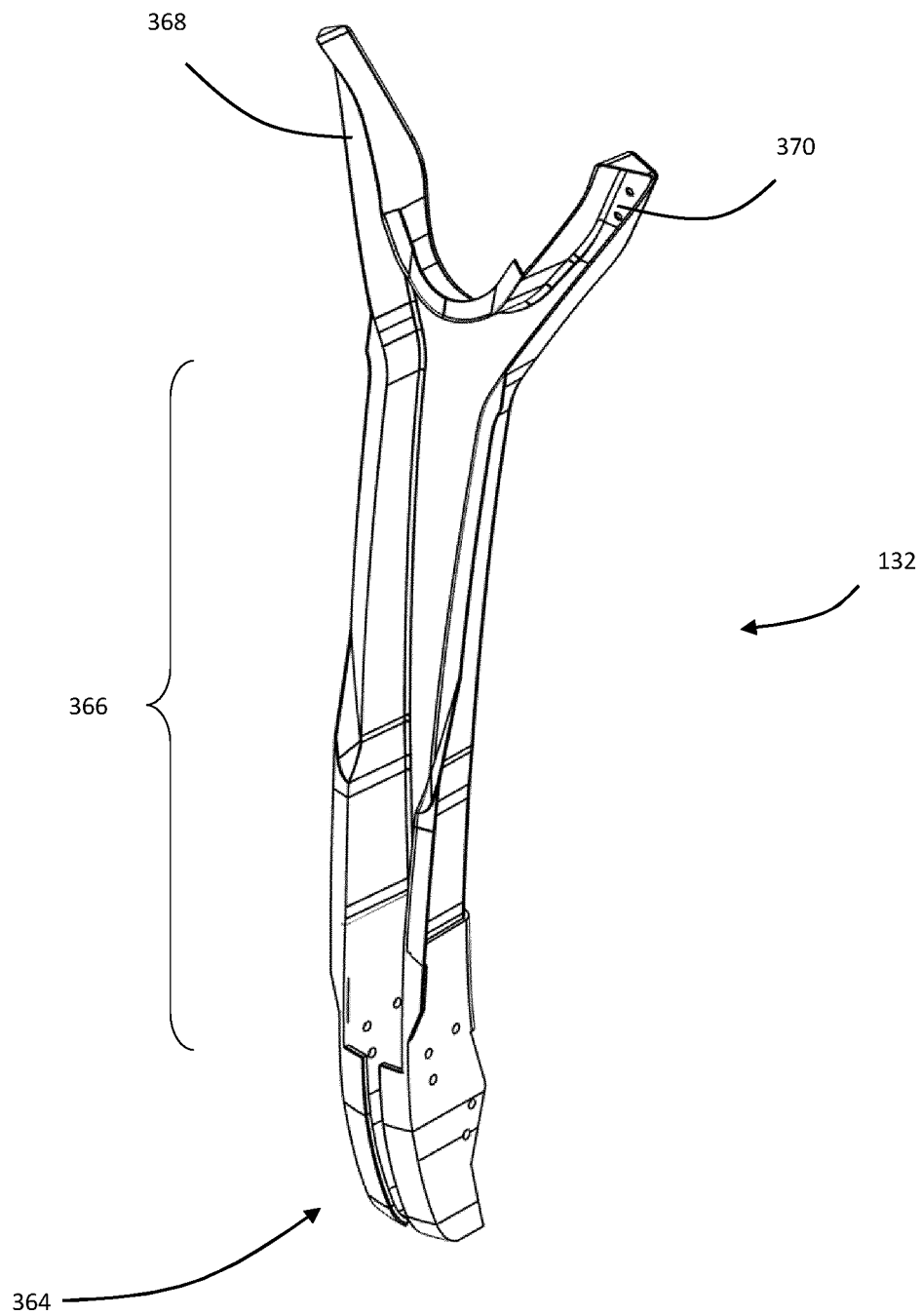

The control assembly 135 is located at the uppermost part of the tiller (furthest from the deck in the unfolded condition) and is shown in FIGS. 5g and 5h. The control assembly comprises a base region 312 from which first and second arms 314, 316 project vertically upwardly and outwardly at a first portion 318, 320 respectively, upwardly and inwardly at a second portion 322, 324 respectively and meeting a crossbar portion 326 joining the respective free ends. The control assembly therefore forms a hexagon shape.

A user interface 328 is provided mounted to the base region 312 and comprises an information screen which can be used to inform the rider of information such as speed, range remaining etc. The screen can also function as an input device to control e.g. sounds, cruise control etc.

The crossbar 326 comprises the primary driving controls. An accelerator/brake control 328 is provided comprising a single rotatable control member 330 rotatable about a horizontal control axis CA (parallel to the crossbar 326). The member 330 comprises two spaced-apart control surfaces 332, 334. One control surface 332 is proximate the left hand arm 314, and another surface 334 proximate the right hand arm 316. The surfaces 332, 334 are cylindrical in shape with depressions 336, 338 formed therein.

Between the surfaces 332, 334 there is provided a button array 340. The button array 340 comprises a horn button 342, and a left and right indicator button 344, 346.

The driving controls are connected and operate as follows.

The user grips the second portions 322, 324 of the arms 314, 316 and as such can position his or her thumbs on one or both of the control surfaces 332, 334 and buttons 344, 346, 348. The thumbs rest in the depressions 336, 338 and allow the user to rotate the member 330 forwards and rearwards. The member 330 is resiliently biased towards the neutral position. Rotation forwards about the axis CA causes power to be delivered from the battery to the wheel motors to accelerate the scooter. Releasing the member 330 will cause the scooter to freewheel, and reversing the direction of rotation (i.e. downwards) will cause braking by harvesting electrical energy from the wheel motor (i.e. acting as generators and charging the battery).

The user also has the ability to depress the horn 348 and left and right indicators 344, 346 using their thumbs. Because the two surfaces 332, 334 rotate together, the user only needs to keep one thumb engaged and can either rest the other, or use it to depress one of the other buttons.

Referring to FIG. 5l, the tiller 104 is supported by a spine 132 that extends from a mounting formation 364 at a first end for mounting to the tiller mount 348, via an elongate U-shaped section 366 to a first arm 368 and a second arm 370 forming a "Y" shaped spine. The arms 368, 370 extend into the first portions 318, 320 of the arms 314, 316 of the control assembly. The spine 132 is provided within the interior of the tiller, and is generally a unitary component. It is therefore stiff, and can react both the bending loads placed on the tiller by the user's hands, as well as transmit the steering torque required during riding.

Front Wheel Suspension and Steering Assembly 106

FIGS. 6a to 6k show the front wheel suspension and steering assembly 106.

The assembly can be separated into the following parts:
- A central boss 400 (FIGS. 6b and 6c);
- A left suspension subassembly 402 and left wheel 404 (FIGS. 6d to 6g);
- A right suspension subassembly 406 and right wheel 408; and,
- A steering subassembly 410 (FIGS. 6h to 6k).

Central Boss 400

Figure 6A:
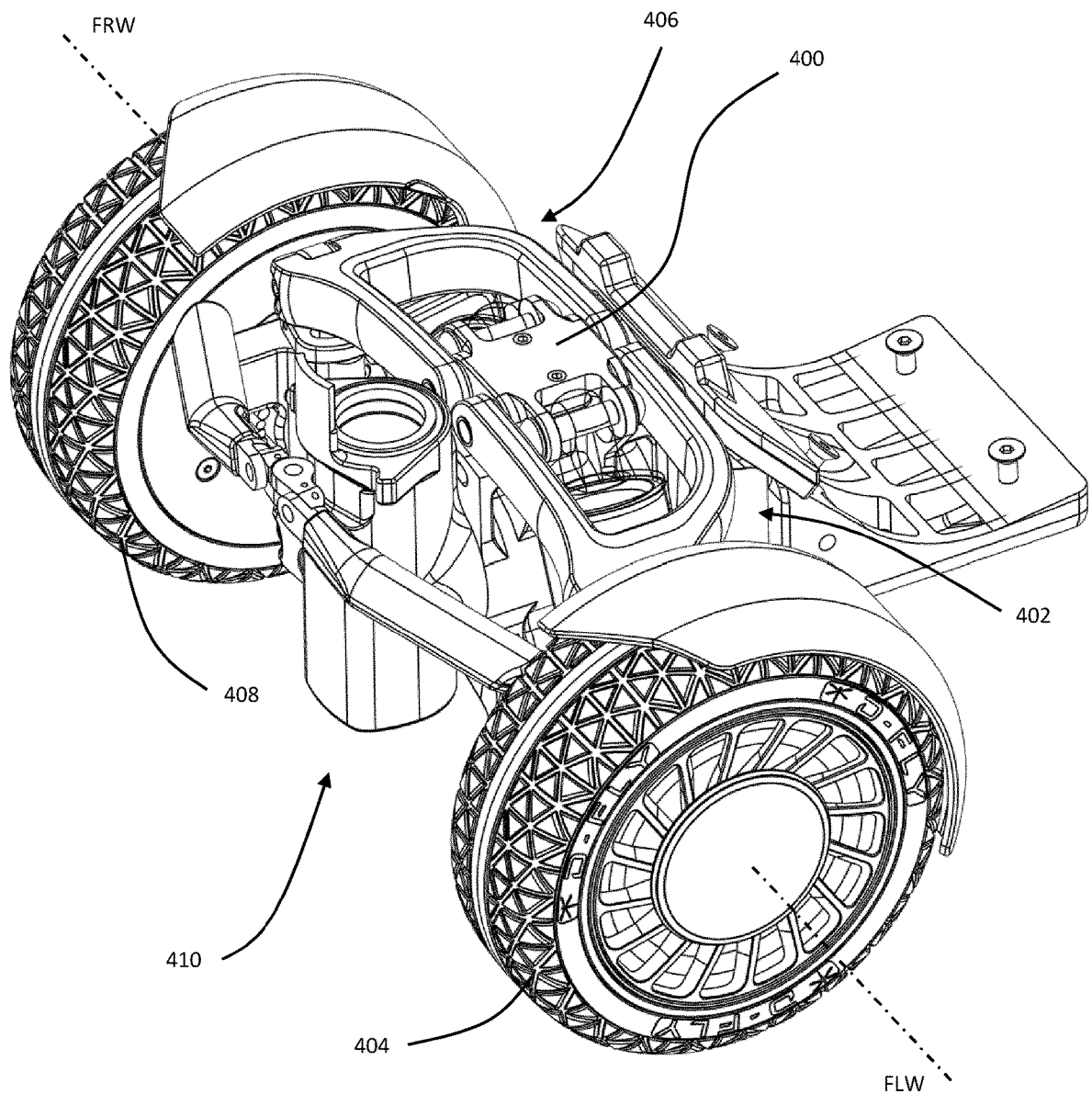
FIG. 6a is a perspective view of the front wheel suspension and steering assembly of the scooter of FIG. 1.
Figure 6B:
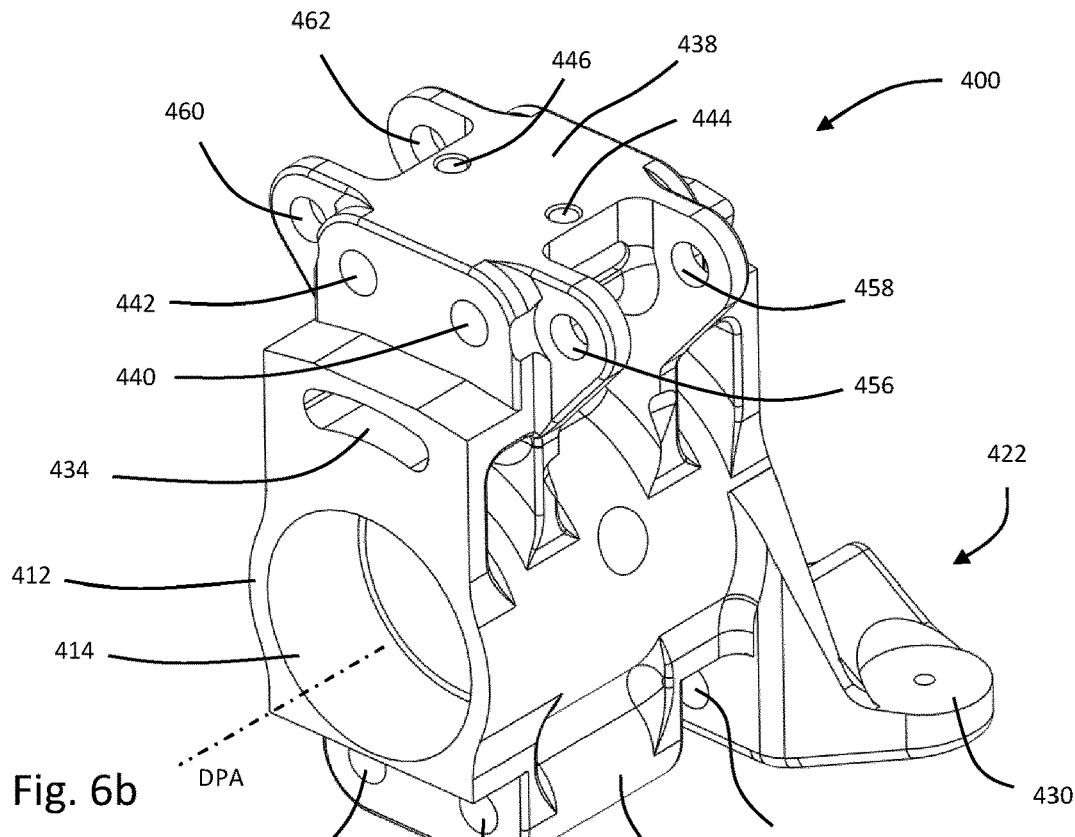
Figure 6C:
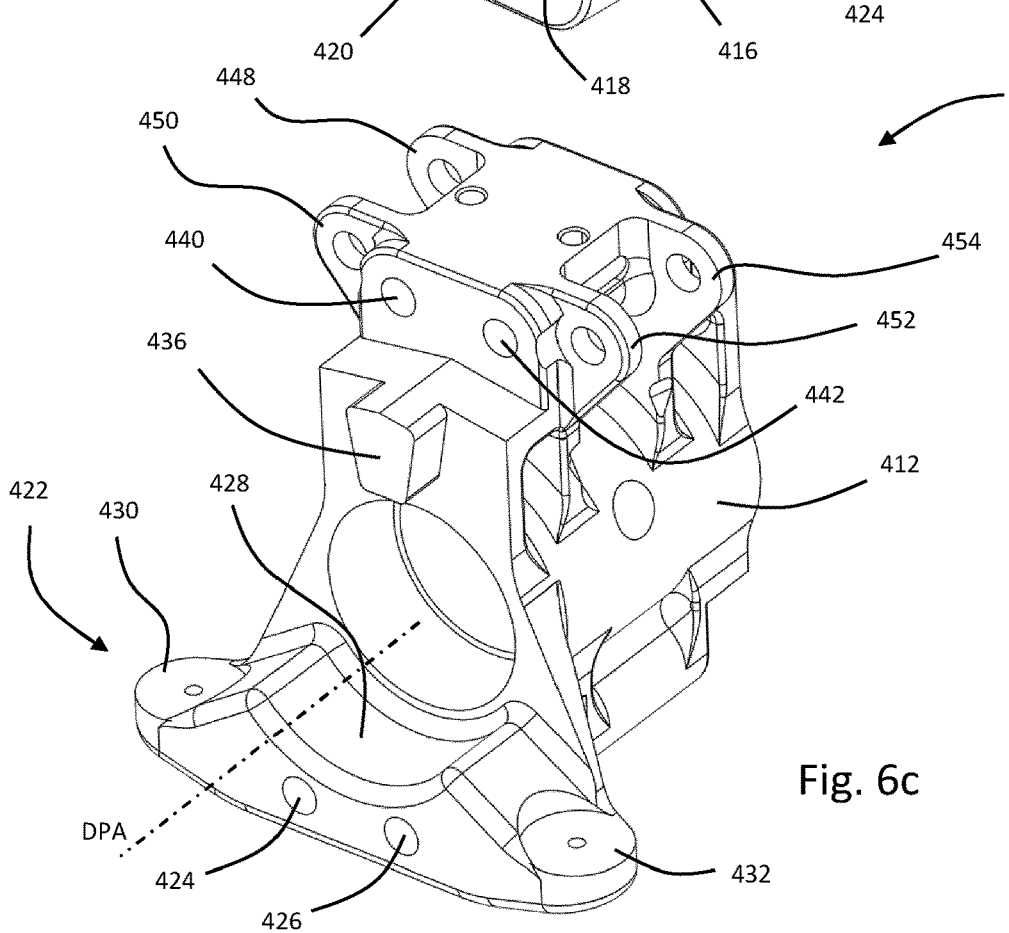

The central boss 400 is shown in detail in FIGS. 6b and 6c. It is a unitary component constructed from metal. The boss 400 comprises a central cylindrical portion 412 having a through-bore 414 defining a deck pivot axis DPA oriented in a longitudinal direction (parallel to axis X).

Referring to FIG. 6b, a lower suspension attachment portion 416 is provided directly below the central cylindrical portion 412. The portion 416 comprises a left-hand lower suspension attachment bore 418 and a right-hand lower suspension attachment bore 420. The bores 418, 420 are offset from each other and parallel with the deck pivot axis DPA and longitudinal axis X. Grub screw bores are provided in communication with, and perpendicular to, the bores 418, 420, extending from a lower surface of the portion 416 (not shown).

Extending below, and rearwardly of the central cylindrical portion 412 there is provided a deck support portion 422. The deck support portion 422 comprises a pair of lower suspension attachment bores 424, 426 directly opposite and aligned with the lower suspension attachment bores 418, 420 respectively of the lower suspension attachment portion 416. Only the left hand lower suspension attachment bore 424 is visible in FIG. 6b.

The deck support portion 422 further defines a deck mount bearing surface 428, which is shaped as a concave, part-cylindrical surface. On the left and right hand sides of the deck support portion 422 are provided respective anti-camber spring support wings 430, 432.

On the front surface of the boss 400, directly above the central cylindrical portion 412, extending into the boss 400 parallel to the deck pivot axis DPA there is provided a rotation-limiting slot 434. The slot 434 is arcuate and centred on the deck pivot axis DPA.

On the rear surface of the boss 400, directly above the central cylindrical portion 412, and extending rearwardly parallel to the deck pivot axis DPA there is provided a rotation-limiting protrusion 436.

An upper suspension attachment portion 438 is provided directly above the central cylindrical portion 412. The portion 438 comprises a left-hand upper suspension attachment bore 440 and a right-hand upper suspension attachment bore 442. The bores 440, 442 are offset from each other and parallel with the deck pivot axis DPA and longitudinal axis X. They are directly above the respective lower suspension attachment bores 424, 426. Grub screw bores 444, 446 are provided in communication with, and perpendicular to, the bores 440, 442, extending from an upper surface of the portion 438.

Extending laterally either side of the portion 438 there are provided two parallel left-hand upper wishbone attachment flanges 448, 450 and two parallel right-hand upper wishbone attachment flanges 452, 454. Each flange defines a respective wishbone attachment bore 456, 458, 460, 462 respectively.

Left Suspension Subassembly 402 and Left Wheel 404

Figure 6D:
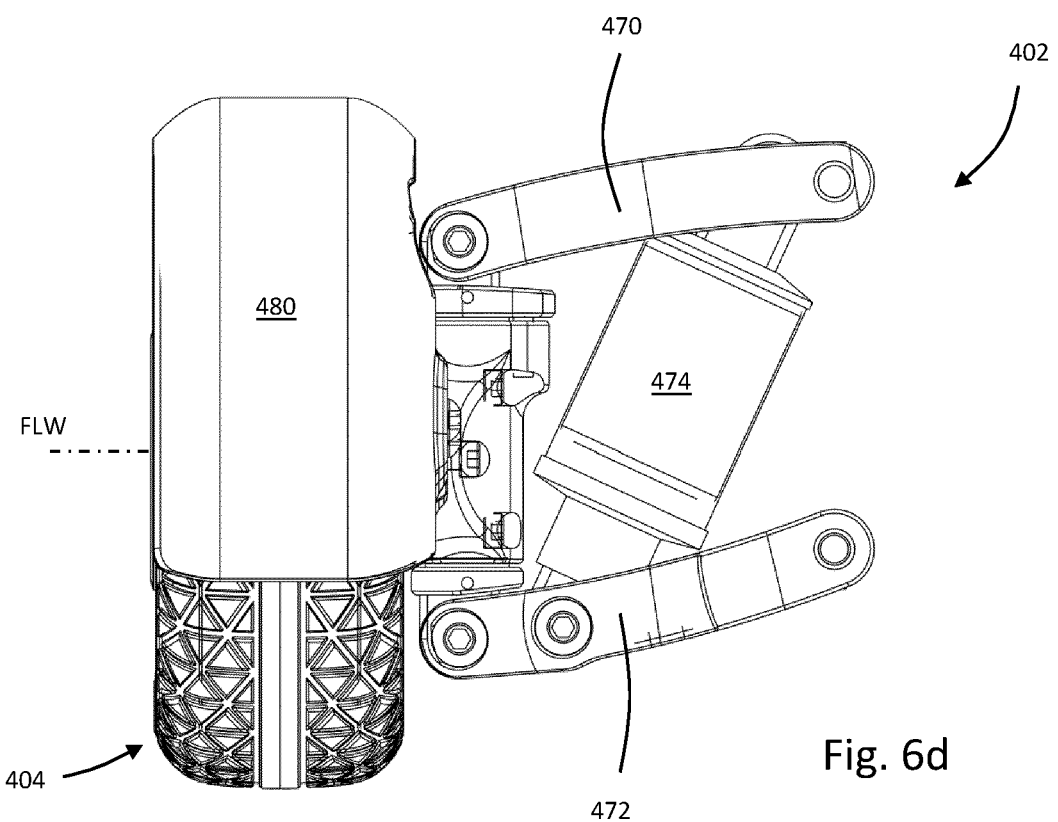
Figure 6E:
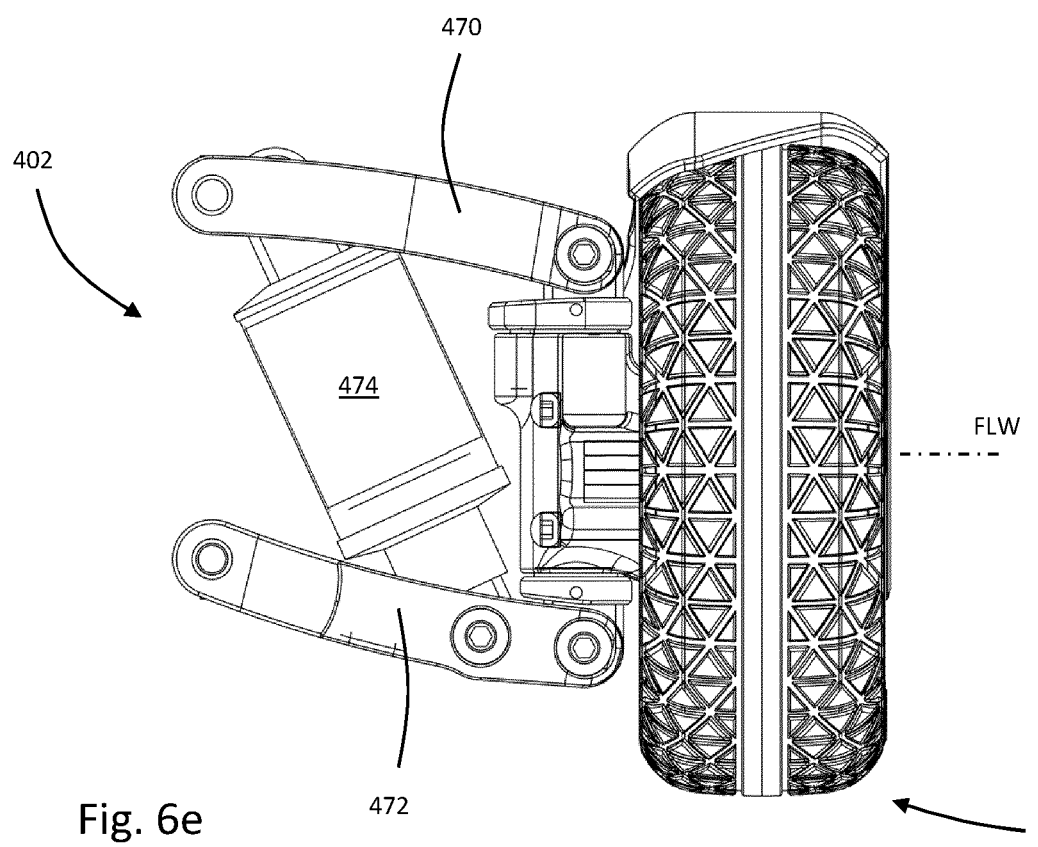
Figure 6F:
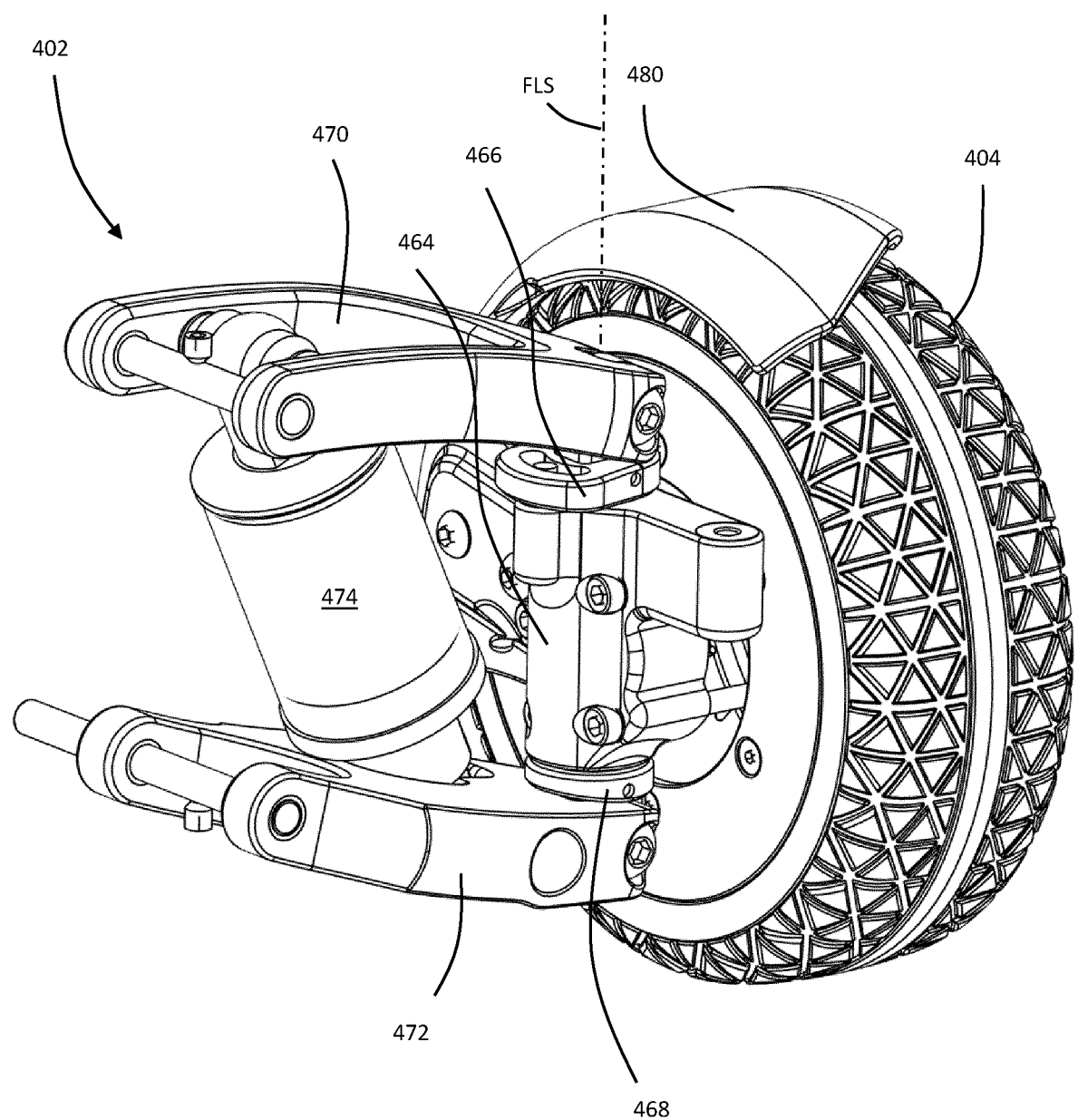
Figure 6G:
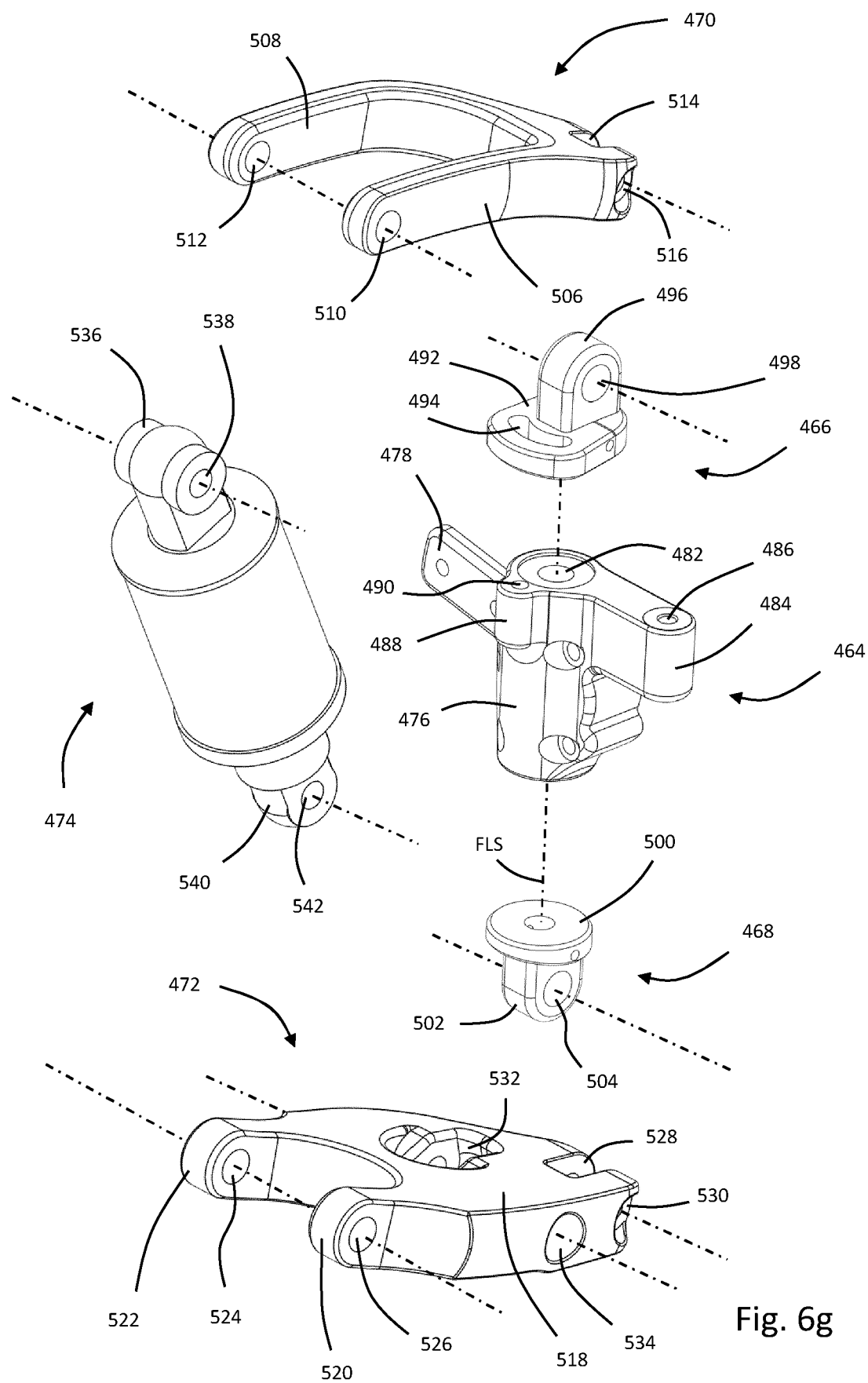

The left suspension assembly 402 and wheel 404 is shown in FIGS. 6d to 6f. The left suspension assembly is of an independent double-wishbone configuration.

The assembly comprises a left wheel hub 464, a left upper wheel pivot 466, a left lower wheel pivot 468 a left upper wishbone 470, a left lower wishbone 472 and a left spring-damper assembly 474.

The left wheel hub 464 comprises a body 476 configured for rotational mounting of the left wheel 402 via a DC electric motor, which is nested inside the wheel itself. The DC electric motor is configured to impart a torque to the wheel 404 to drive the wheel in rotation about a front left wheel axis FLW.

The hub 464 further comprises a mudguard attachment flange 478 extending rearwardly for attachment of a mudguard 480.

The left wheel hub comprises a steering kingpin receiving bore 482 extending vertically therethrough. Extending forward of the hub there is defined a steering arm 484 defining a vertical steering pin receiving bore 486.

A rotation limiting pin lug 488 is defined protecting laterally inwardly from the hub 464 defining a pin receiving bore 490.

The left upper wheel pivot 466 comprises a base portion 492 defining an arcuate slot 494. A wishbone mounting lug 496 defining a pivot bore 498 projects upwardly from the base portion 494.

The left lower wheel pivot 468 comprises a base portion 500. A wishbone mounting lug 502 defining a pivot bore 504 projects downwardly from the base portion 500.

The left upper wishbone 470 is a generally U-shaped member having a forward arm 506 and a rearward arm 508 with aligned pivot bores 510, 512 defined at the free ends thereof. Opposite the free ends, a pivot receiving slot 514 is defined having a throughbore 516 intersecting.

The left lower wishbone 472 has a body portion 518, a forward arm 520 and a rearward arm 522 with aligned pivot bores 524, 526 defined at the free ends thereof. Opposite the free ends, a pivot receiving slot 528 is defined having a throughbore 530 intersecting. A spring-damper receiving opening 532 is provided in the body portion intersected by a throughbore 534.

The left spring-damper assembly 474 is known in the art, and will not be described in detail, suffice to say that it comprises a first attachment lug 536 defining a bore 538 and a second attachment lug 540 defining a bore 542. The spring-damper assembly 474 is of variable length, being compressible and resilient as known in the art. It also has damping characteristics.

Right Suspension Subassembly 406 and Right Wheel 408

The right suspension subassembly and wheel are a mirror image of the left suspension subassembly and left wheel, as described above. References to the parts will be made with the prime (')—for example right wheel hub 464'. The right wheel 408 rotates about a right wheel rotation axis FRW, which in a neutral steering position is parallel with the left wheel rotation axis FLW.

Steering Subassembly 410

Figure 6H:
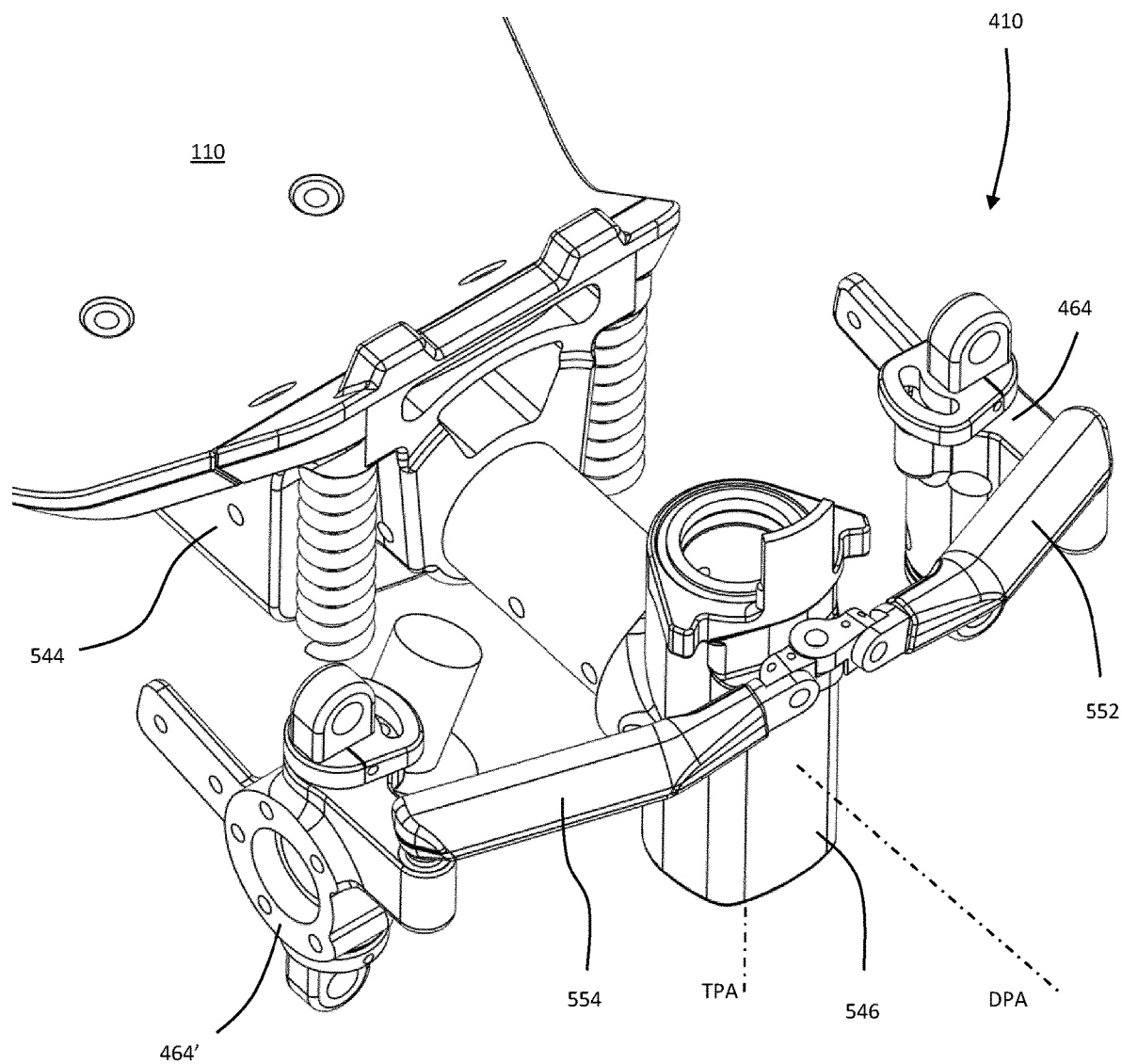
Figure 6I:
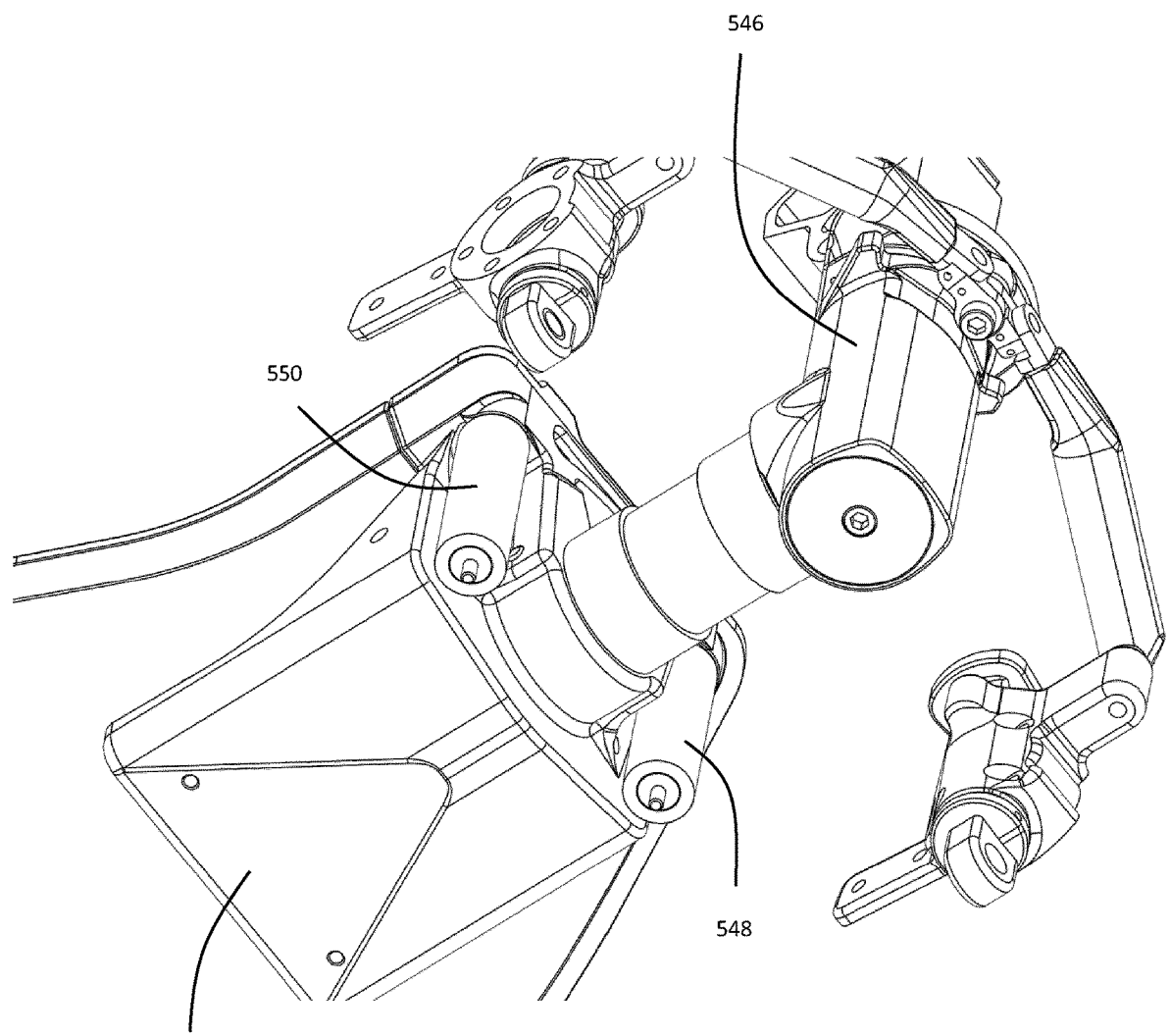
Figure 6J:
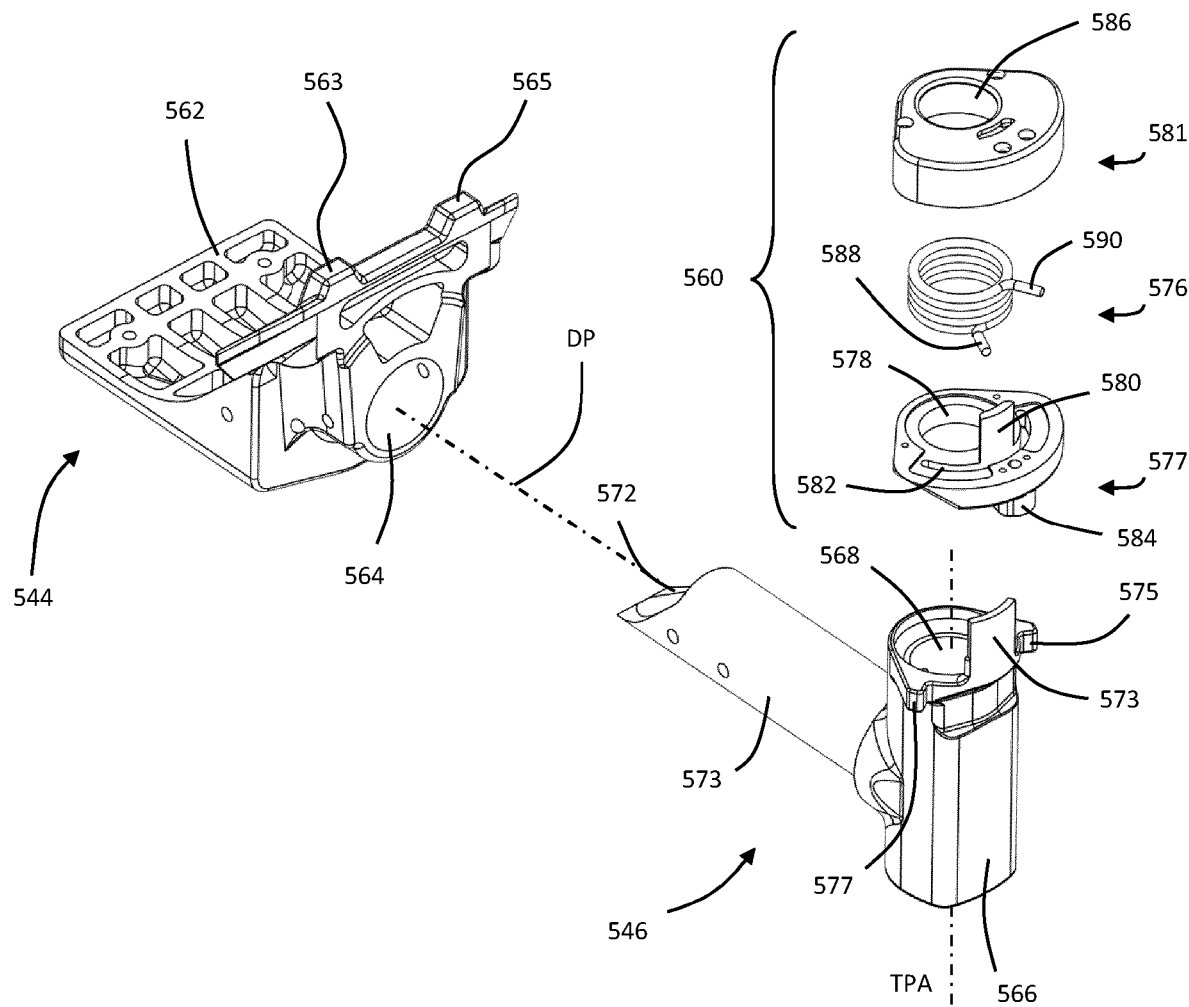
Figure 6K:
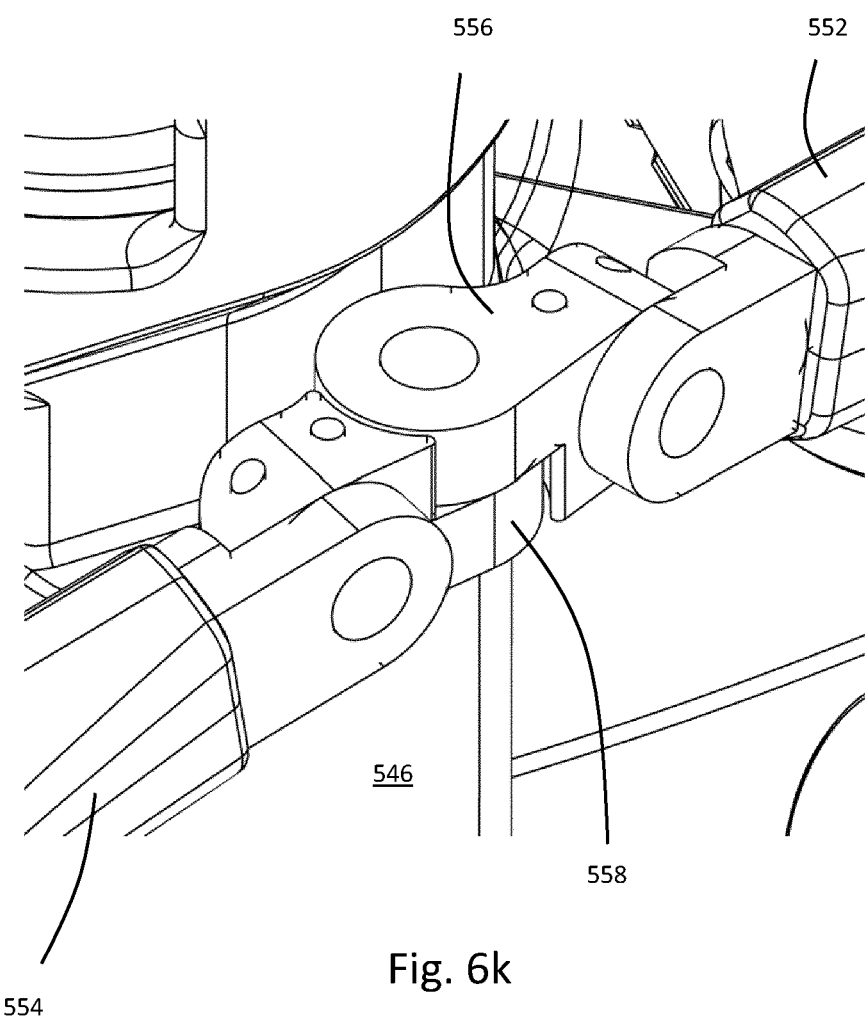

The steering subassembly 410 comprises:
- a front deck mount 544;
- a tiller pivot 546;
- a left-hand anti-camber spring assembly 548;
- a right-hand anti-camber spring assembly 550;
- a left-hand steering link 552;
- a right hand steering link 554;
- a left-hand steering link central pivot 556 (FIG. 6k);
- a right-hand steering link central pivot 558 (FIG. 6k);
- a centring assembly 560 (FIG. 6j).

The tiller pivot shaft 138 of the tiller assembly 104 is also shown.

The front deck mount 544 comprises a deck abutment surface 562 profiled to the underside of the deck 110. Two spaced-apart alignment protrusions 563, 565 extend from an upper edge of the front deck mount 544 such that they project vertically upwards (also see FIG. 2a). The deck mount 544 further comprises a shaft-receiving open bore 564 being generally horizontally oriented.

The tiller pivot 546 comprises a first portion 566 being generally vertical and cylindrical in form, having a pivot shaft bore 568 running therethrough and defining a tiller pivot axis TPA. At the upper end of the first portion there is defined an axially extending spring abutment protrusion 573. Extending tangentially either side of the upper end of the first portion there are provided pivot limit abutments 575, 577. A deck pivot shaft 573 extends normal to the first portion 566 and is generally cylindrical with a profiled end 575.

The left- and right-hand anti-camber spring assemblies 548, 550 comprise compression springs.

The steering links 552, 554 are mirror images of each other and are generally stiff and capable of transmitting compressive and tensile loads.

The centring assembly 560 comprises a steering hub 577, a housing 579 and a torsion spring 581.

The steering hub 577 is generally flat, defining a shaft opening 578 therethrough. Adjacent the shaft opening and projecting upwardly from the steering hub 572 there is provided an arcuate spring abutment 580. Radially outward from the spring abutment 580 there is defined a slot 582. Projecting downwardly from the steering hub 572 there is provided a steering lug 584.

The housing 581 is generally concave defining a cavity, and a shaft opening 586 therethrough.

The torsion spring 576 comprising a first spring abutment 588 and a second spring abutment 590.

Rear Wheel Assembly 108

The rear wheel assembly 108 is shown in FIGS. 7a to 7g.

The rear wheel assembly comprises a rear wheel 700, a rear wheel carriage 702, rear deck mount 704, and a brake subassembly 706.

The rear wheel is generally known in the art and comprises a central bearing arrangement to facilitate rotation about a rear wheel axis RW.

Figure 7A:
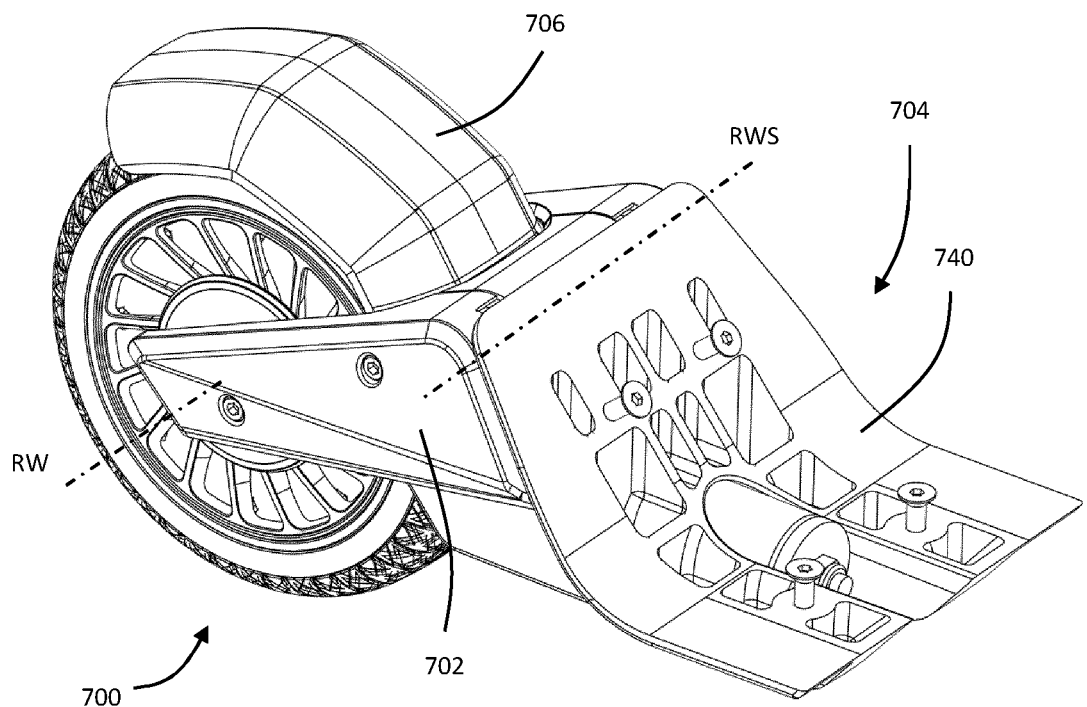
FIG. 7a is a perspective view of the rear wheel assembly of the scooter of FIG. 1.
Figure 7B:
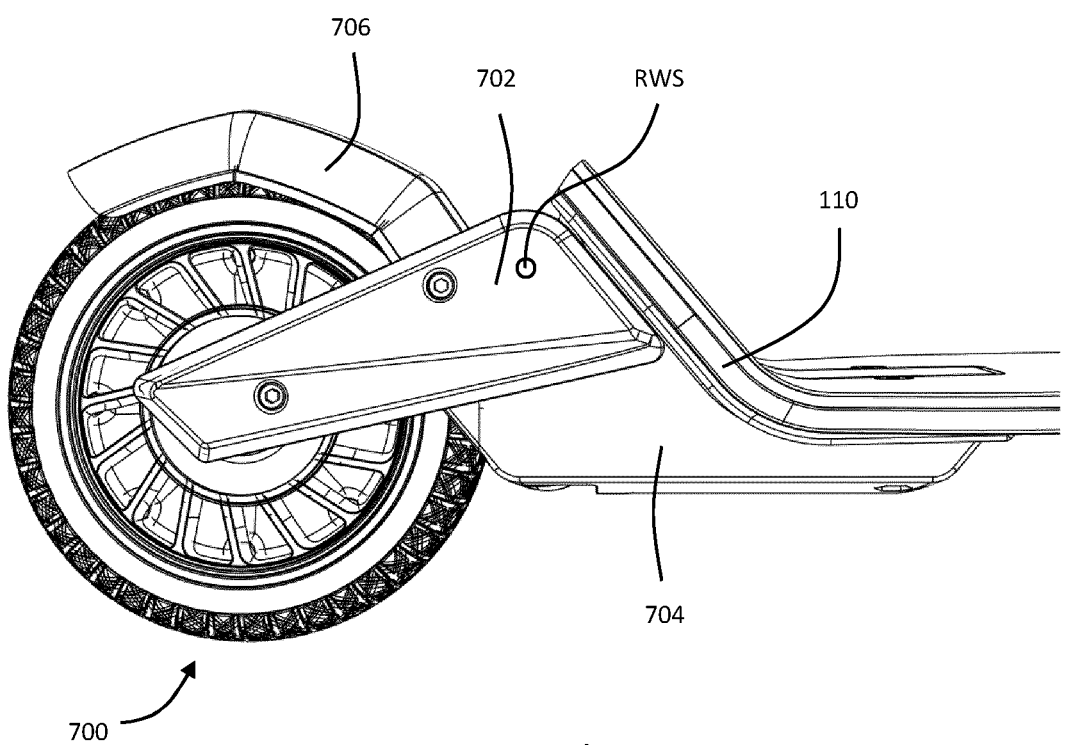
Figure 7C:
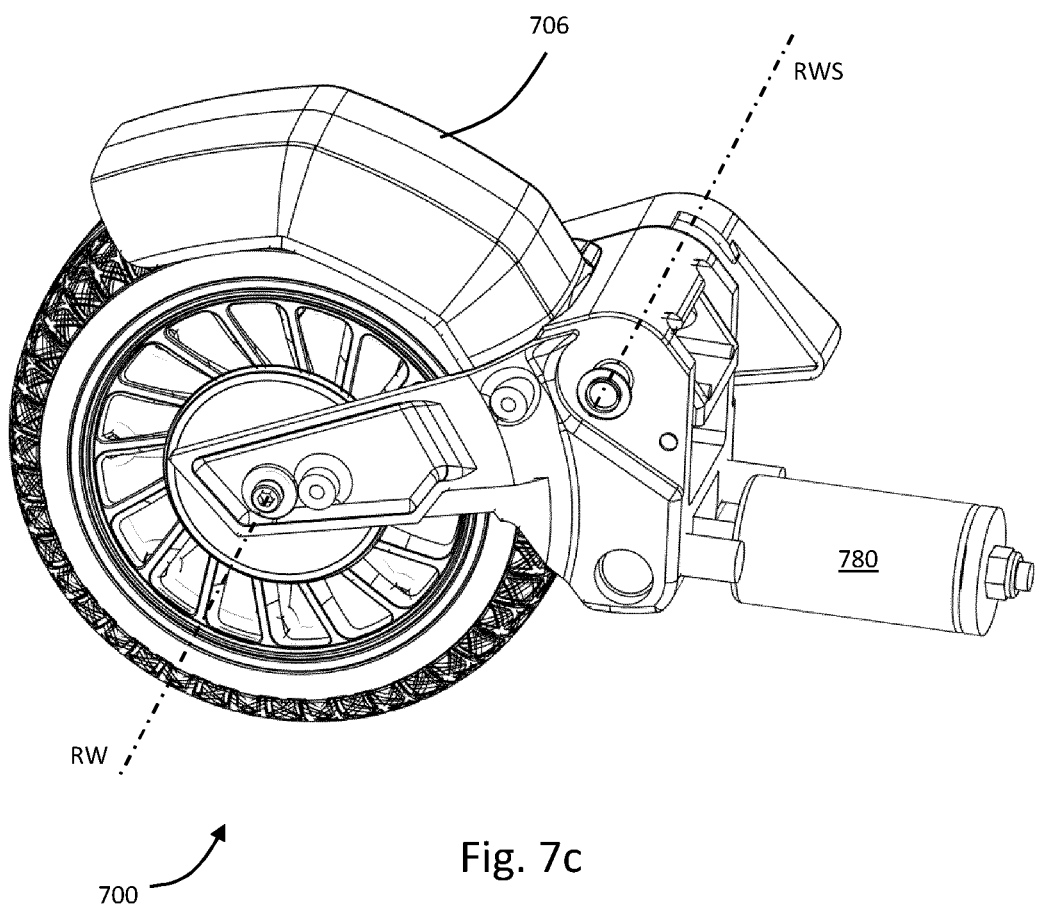
Figure 7D:
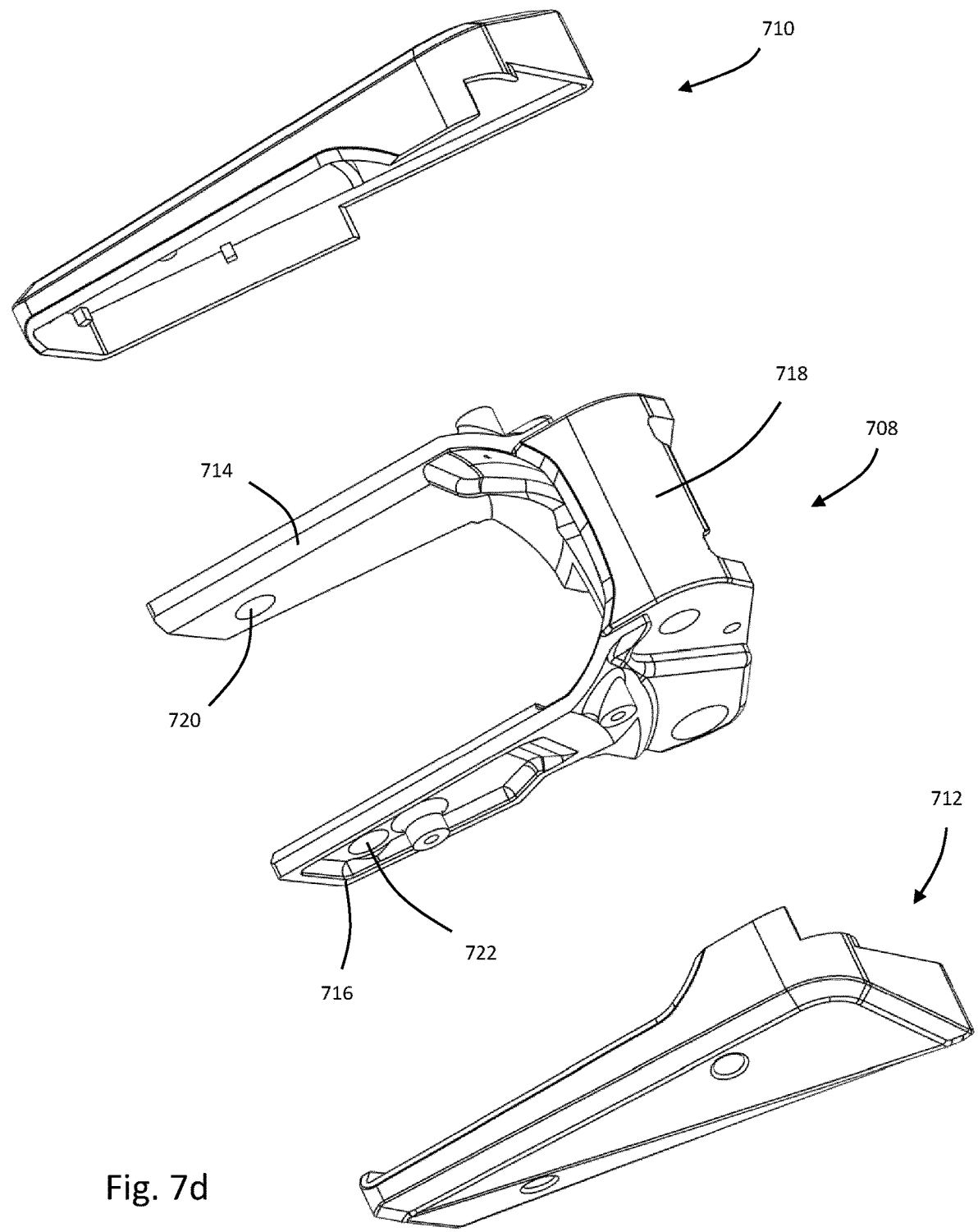
Figure 7E:
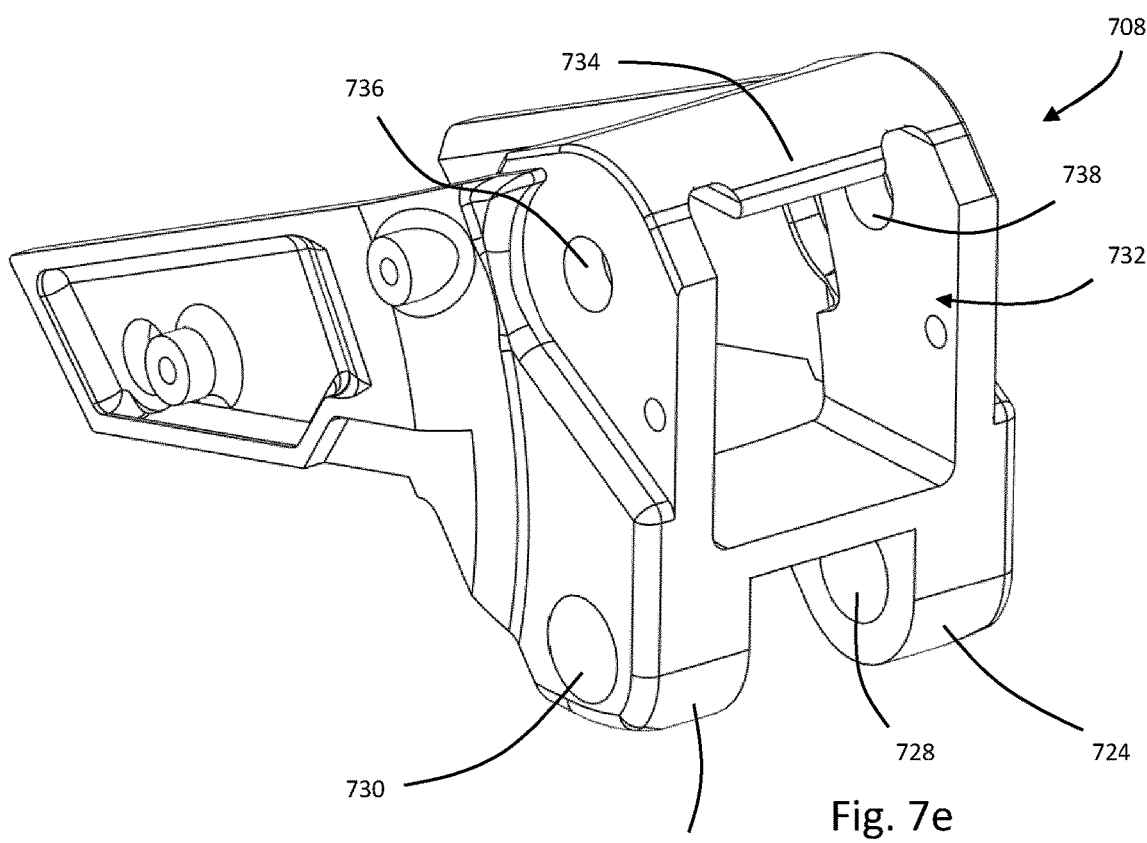
Figure 7F:
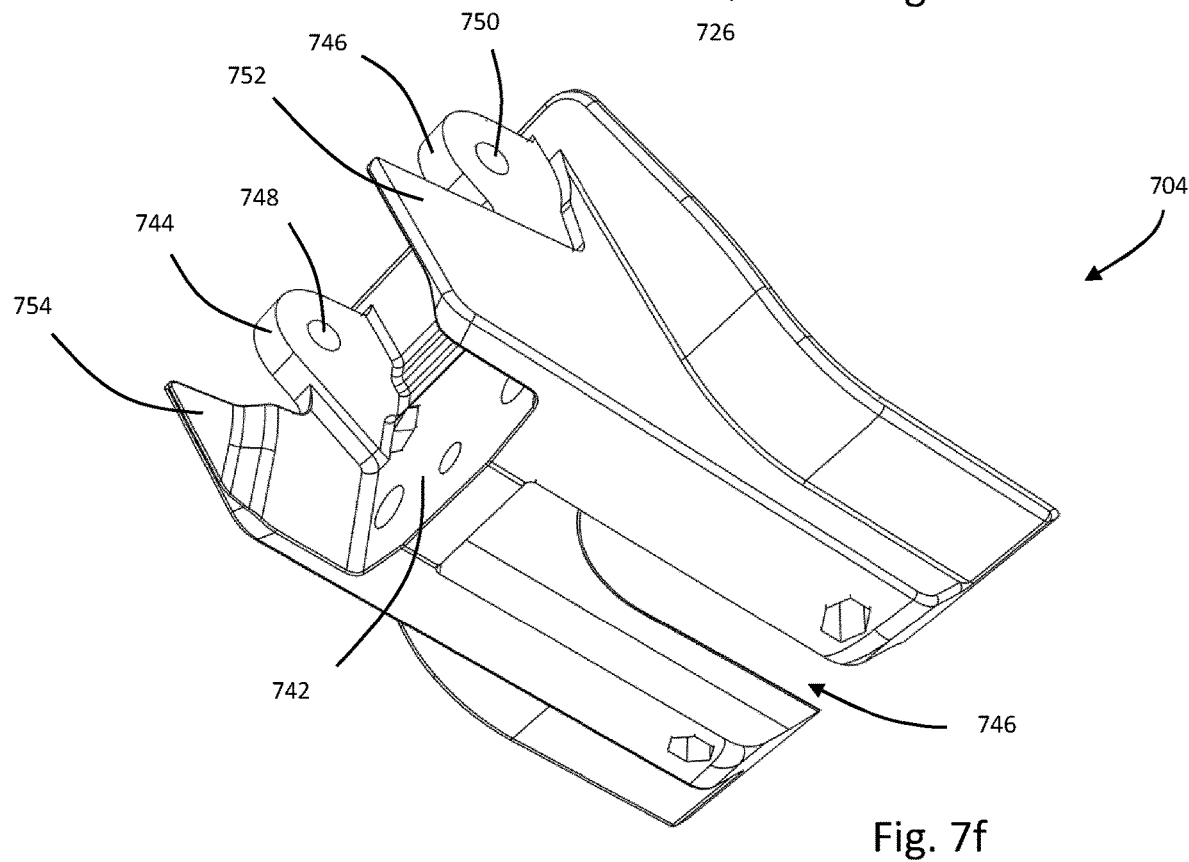

The rear wheel carriage 702 is shown in more detail in FIG. 7d. The carriage comprises a rear fork 708, a left hand cover 710 and a right hand cover 712. The rear fork 708 is generally U-shaped and comprises a left arm 714, a right arm 716 and a base portion 718. Each arm 714, 716 defines an axle receiving bore 720, 722. The base portion 718 defines two lower lugs 724, 726 each defining a spring pin receiving bore 728, 730. The base portion 718 also defines a brake spring cavity 732 passing therethrough defining a spring abutment 734 and two spaced-apart brake pivot bores 736, 738 on opposite walls thereof.

The rear deck mount 704 comprises a deck abutment surface 740 profiled to the underside of the deck 110. The rear deck mount 704 further defines (referring to FIG. 7f) a mounting portion 742 defining two spaced-apart wheel carrier attachment lugs 744, 746 defining respective bores 748, 750. Below the lugs 744, 746 there are provided rear abutment arms 752, 754 extending rearwardly. A spring-damper channel 756 is also defined forward of the mounting portion 742. An extensible spring-damper 708 is provided.

Figure 7G:
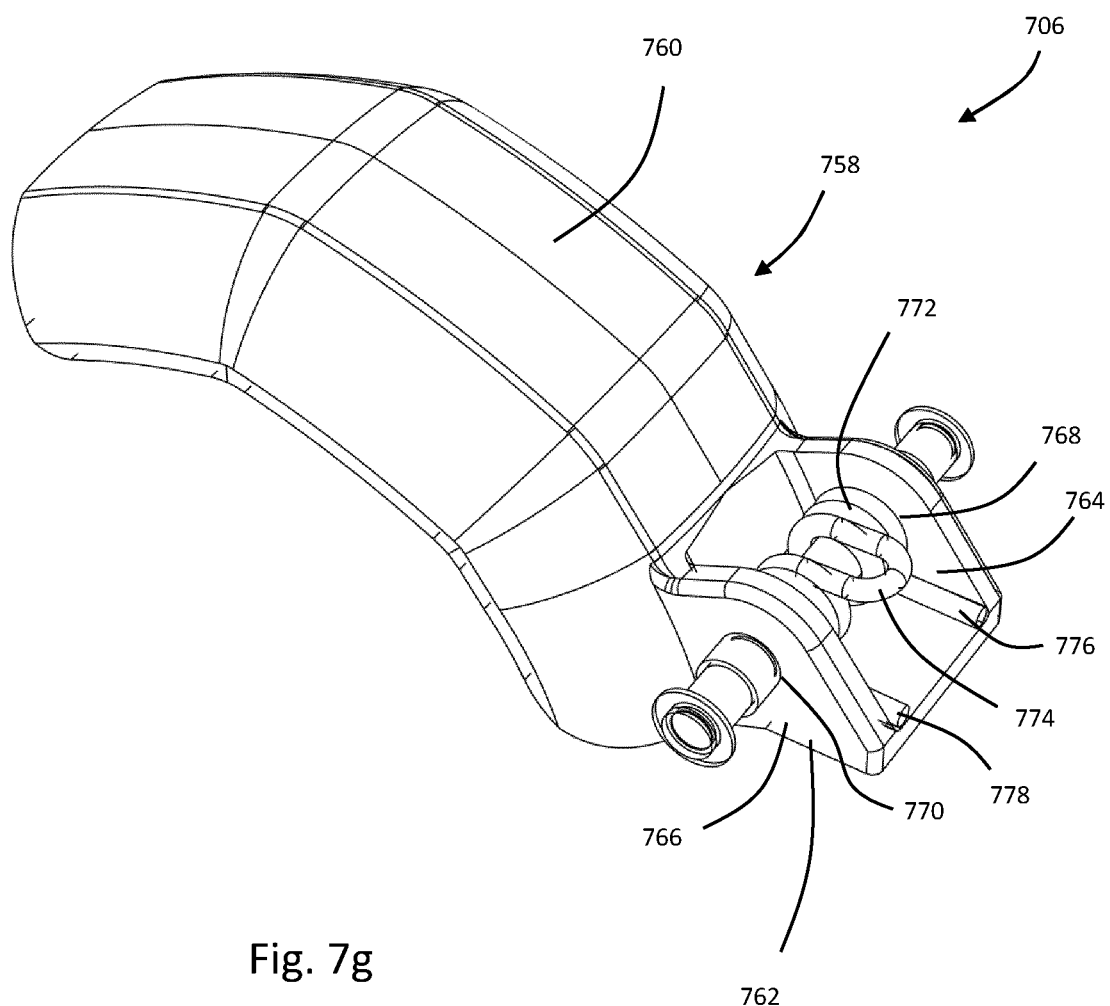

The brake subassembly 706 is shown in FIG. 7g is comprises a wheel contacting brake member 758 in the form of a mudguard and a torsion spring 772. The brake member 758 defines a curved, concave wheel contacting portion 760 and an attachment portion 762 extending outwardly therefrom at one end. The attachment portion 762 comprises two spaced apart walls 764, 766 defining spring pin bores 768, 770. The torsion spring 772 comprises a first abutment 774 and a pair of second abutments 776, 778 either side thereof.

Assembly and Operation of the First Embodiment

Folding

Figure 1A:
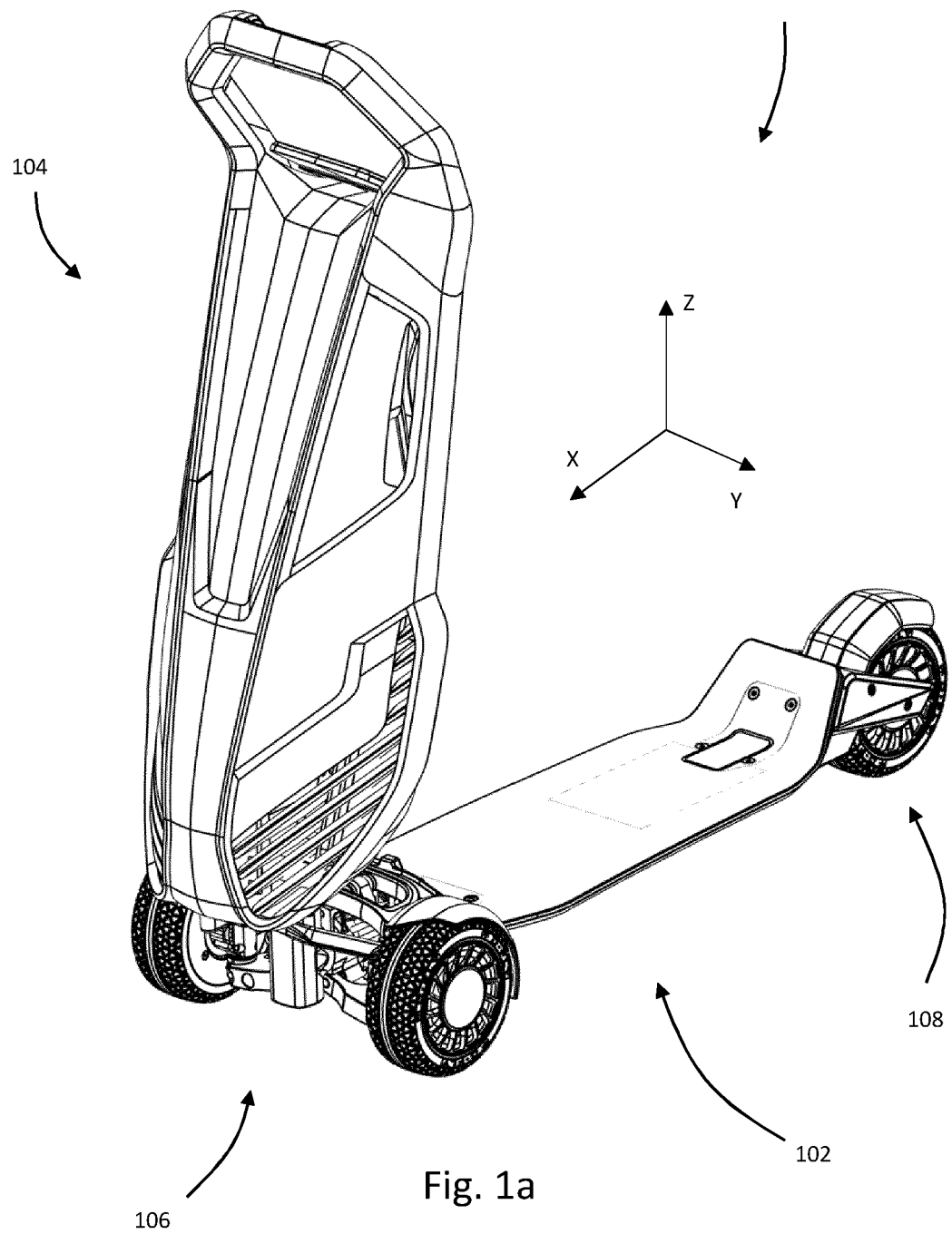
FIG. 1a is a first perspective view of a first scooter in accordance with the present invention in an unfolded condition.
Figure 1B:
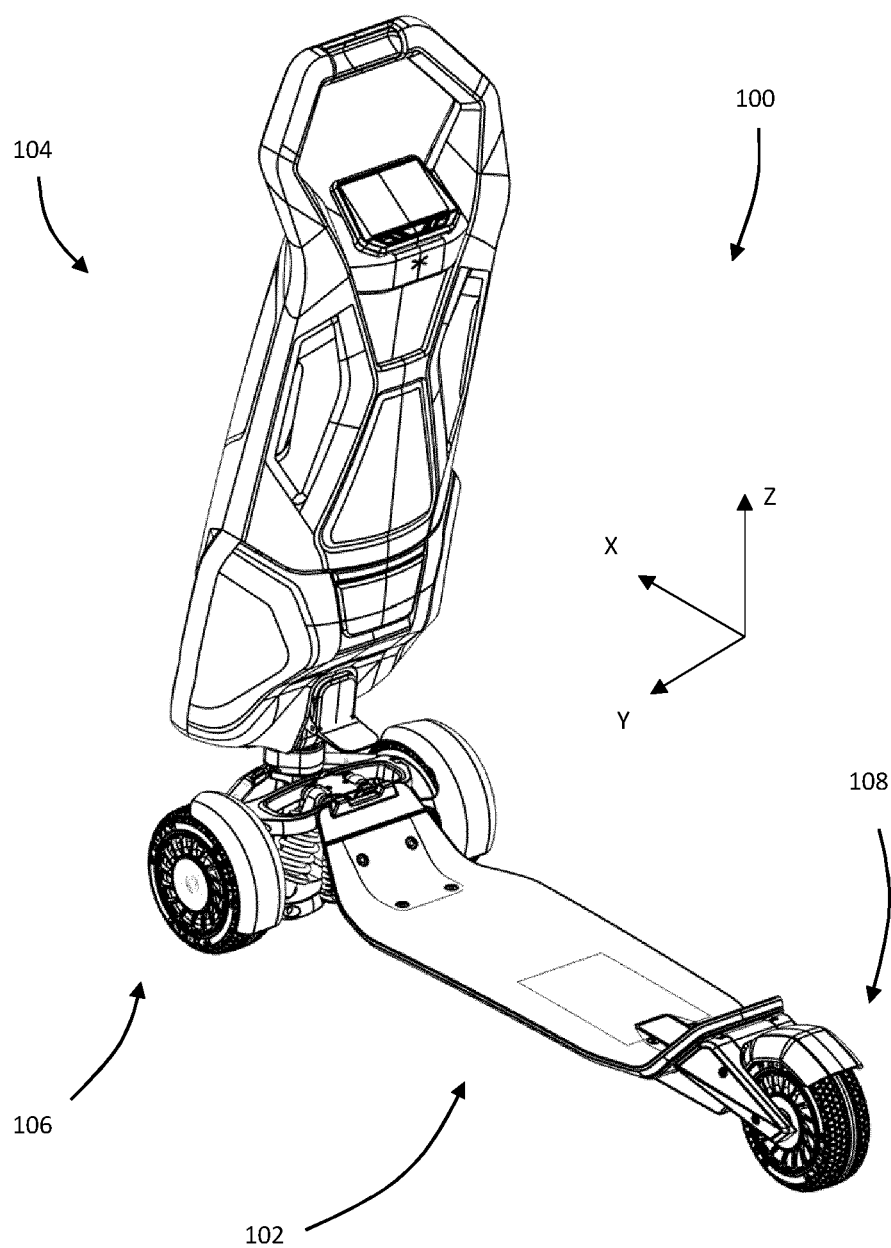
FIG. 1b is a second perspective view of the scooter of FIG. 1.
Figure 1C:
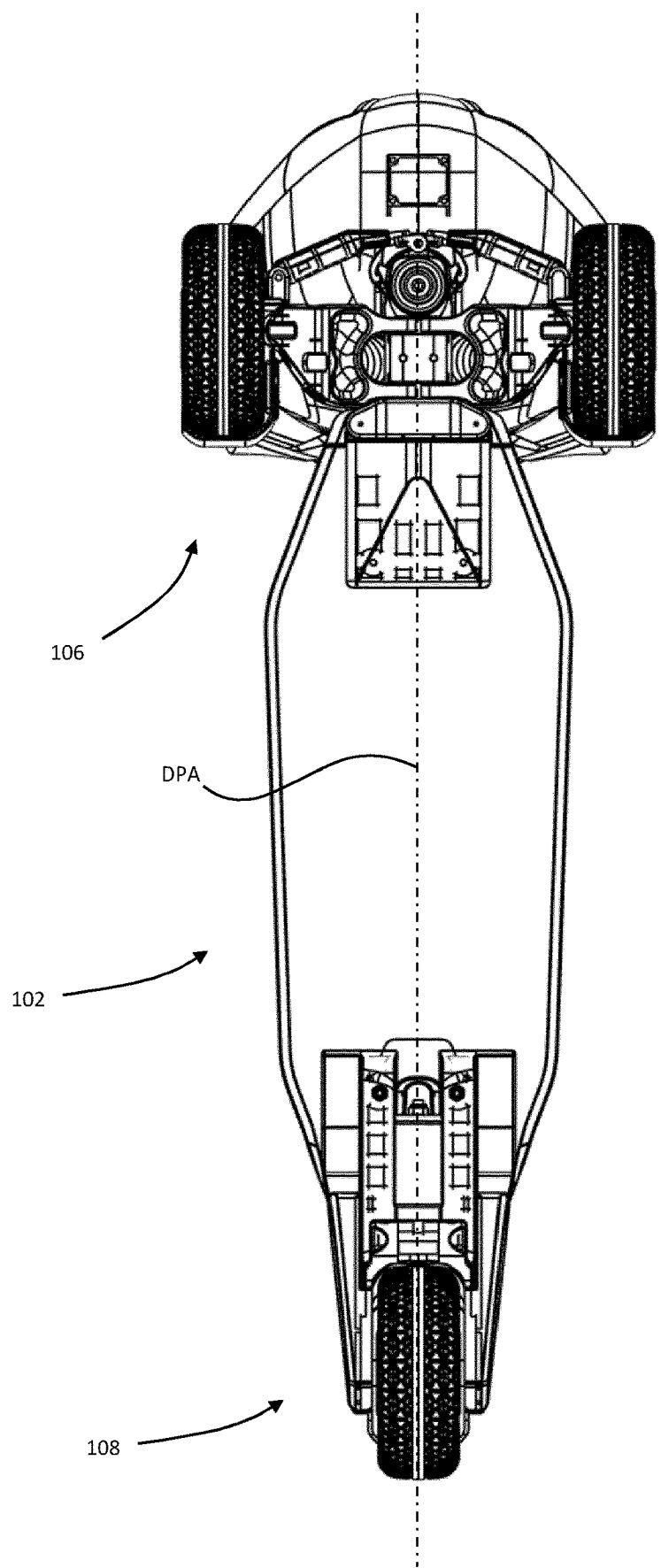
FIG. 1c is an underside view of the scooter of FIG. 1.
Figure 3A:
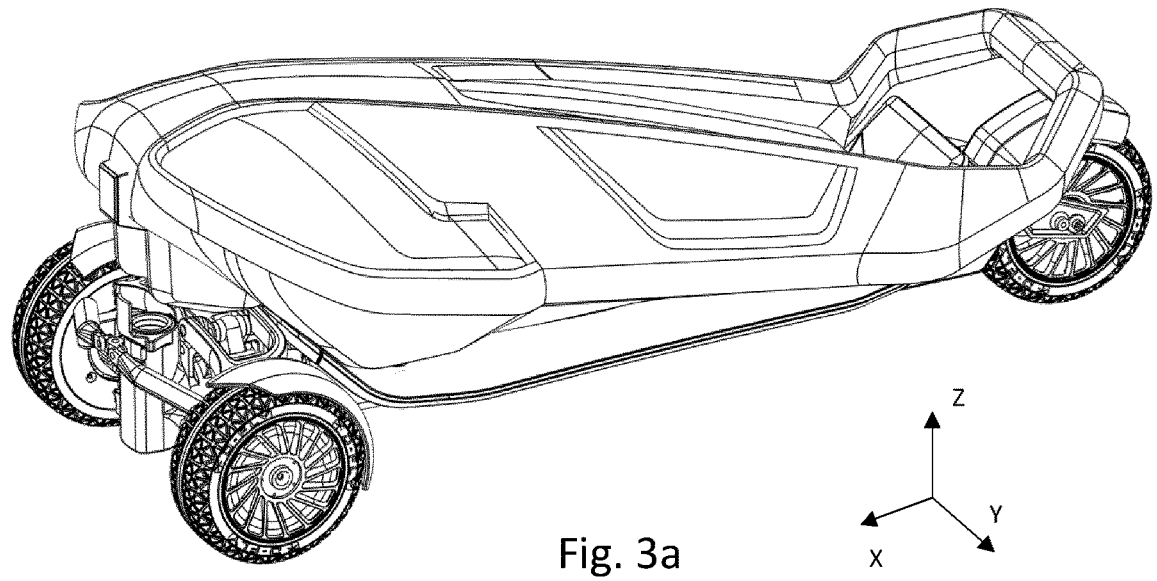
FIG. 3a is a perspective view of the scooter of FIG. 1 in a folded condition lying flat.
Figure 3B:
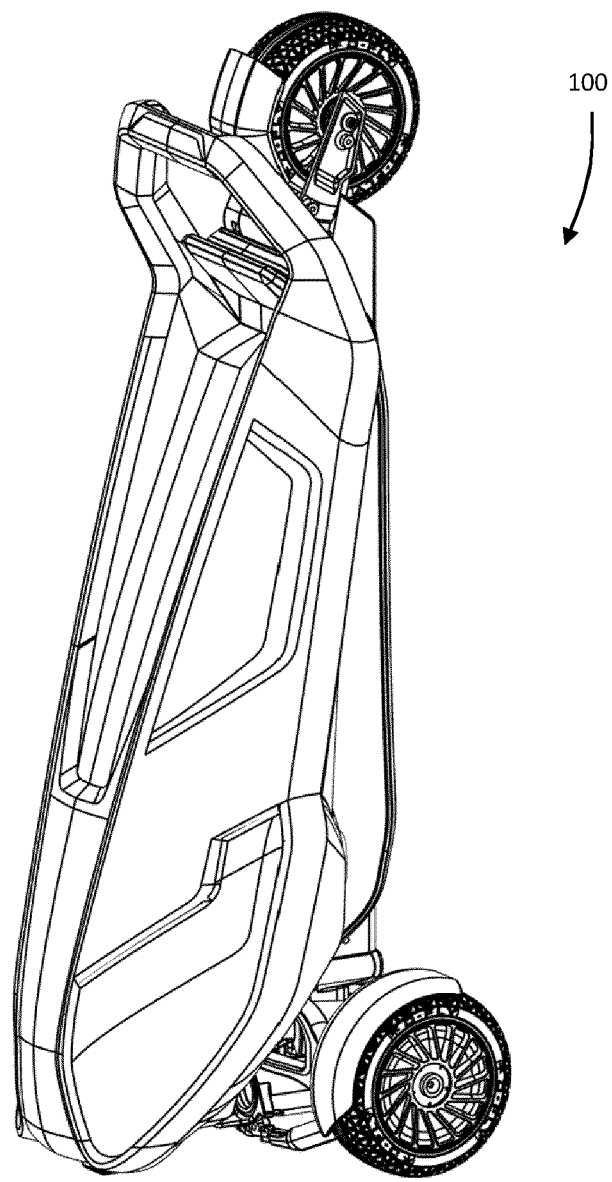
FIG. 3b is a perspective view of the scooter of FIG. 1 in a folded upright condition.

The tiller has two positions as shown by contrasting FIGS. 1a and 3a. Movement between these positions is enabled by the tiller pivot and folding subassembly 130.

Starting at the position of FIG. 1a, rotation of the tiller is effected by firstly dropping the pedal 354 into the deployed position from FIGS. 5d to 5e. This enables the user to place a foot onto the pedal 354 to thereby rotate the catch 350 in direction C1 (FIG. 5e). This rotates the abutment shaft 358 out of the way of the head 344 of the shaft 138. This enables relative rotation of the tiller mount 348 about the folding axis FA, moving from FIGS. 5e to 5f (dripping the tiller to the position of FIG. 3a).

Figure 2A:
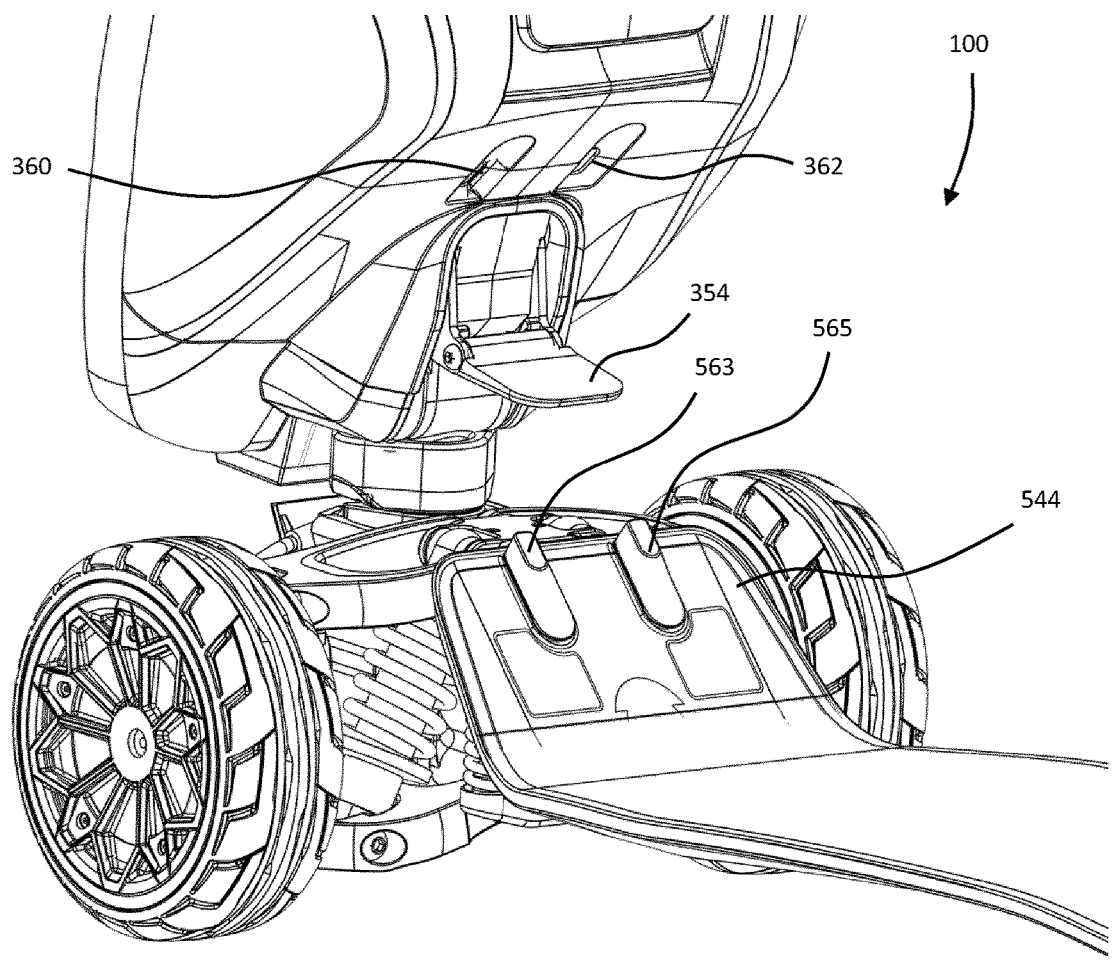
FIG. 2a is a detail view of a part of the scooter of FIG. 1.

The tiller is secured in position against the deck by attraction from a permanent magnet in the tiller attracting the locking plate 125 of the rear deck insert 124. Alignment is ensured by engagement of the male alignment protrusions 563, 565 of the deck with corresponding female recesses 360, 362 on the tiller (FIG. 2a). Manual force is used to separate the tiller and deck to move back to the unfolded condition.

Front Suspension

Referring to FIGS. 6d to 6g, the left wheel hub 464 is generally vertically oriented in use, with the wheel 404 mounted thereto via the DC electric motor for rotation about the front left wheel rotation axis FLW. The mudguard 480 is attached to the mudguard attachment flange 478 so as to at least partially cover the wheel 404.

A kingpin (not shown) is provided passing through the steering kingpin receiving bore 482. The left upper wheel pivot 466 is attached to the upper end of the kingpin on an upper side of the left wheel hub 464, and the left lower wheel pivot 468 connected to the lower end of the kingpin on the opposite, lower side of the left wheel hub 464. The left wheel hub 464 can rotate about the kingpin (and the pivots 466, 468) about a front left wheel steering axis FLS. Rotation about the front left wheel steering axis FLS is limited to a predetermined range by abutment of a steering limiting pin (not shown) inserted into the pin receiving bore 490 of the hub 464 against the ends of the arcuate slot 494 in the left upper wheel pivot 466.

The left upper wishbone 470 is mounted to the left upper wheel pivot 466 for relative rotation via a pivot pin engaged with the pivot bore 498 of the left upper wheel pivot 466 and the throughbores 516 of the left upper wishbone 470. The mounting lug 496 sits in the pivot receiving slot 514 of the left upper wishbone 470.

The left lower wishbone 472 is mounted to the left lower wheel pivot 468 for relative rotation via a pivot pin engaged with the pivot bore 504 of the left lower wheel pivot 468 and the throughbores 530 of the left lower wishbone 472. The mounting lug 502 sits in the pivot receiving slot 528 of the left lower wishbone 472.

The left spring-damper assembly 474 is mounted at a first end via the first attachment lug 536 to an inboard end of the left upper wishbone 470, and via the second end via the second attachment lug 540 to an outboard end of the left lower wishbone 472.

This assembly is attached to the central boss 400 as follows. The left upper wishbone 470 is mounted to the left hand side of the boss 400 by positioning the wishbone arms either side of the wishbone attachment flanges 448, 450. A pivot pin is passed through the aligned bores 460, 462, 510, 512. The left lower wishbone 472 is mounted to the left hand side of the boss 400 by positioning the wishbone arms either side of the lower suspension attachment portion 416. A pivot pin is passed through the aligned bores 418, 510, 512. The pivot pin extends into the lower suspension attachment bore 424 directly opposite and aligned with the lower suspension attachment bore 418.

In this way, a double-wishbone suspension arrangement is formed to mount the left wheel to the boss 400. The wheel 404 is able to move vertically up and down relative to the boss 400 by rotation of the wishbones 470, 472. Upward motion (i.e. downward motion of the vehicle deck) will resiliently extend the spring-damper 474 to provide suspension.

It will be understood that the right-hand wheel is mounted in the same way.

Figure 8A:
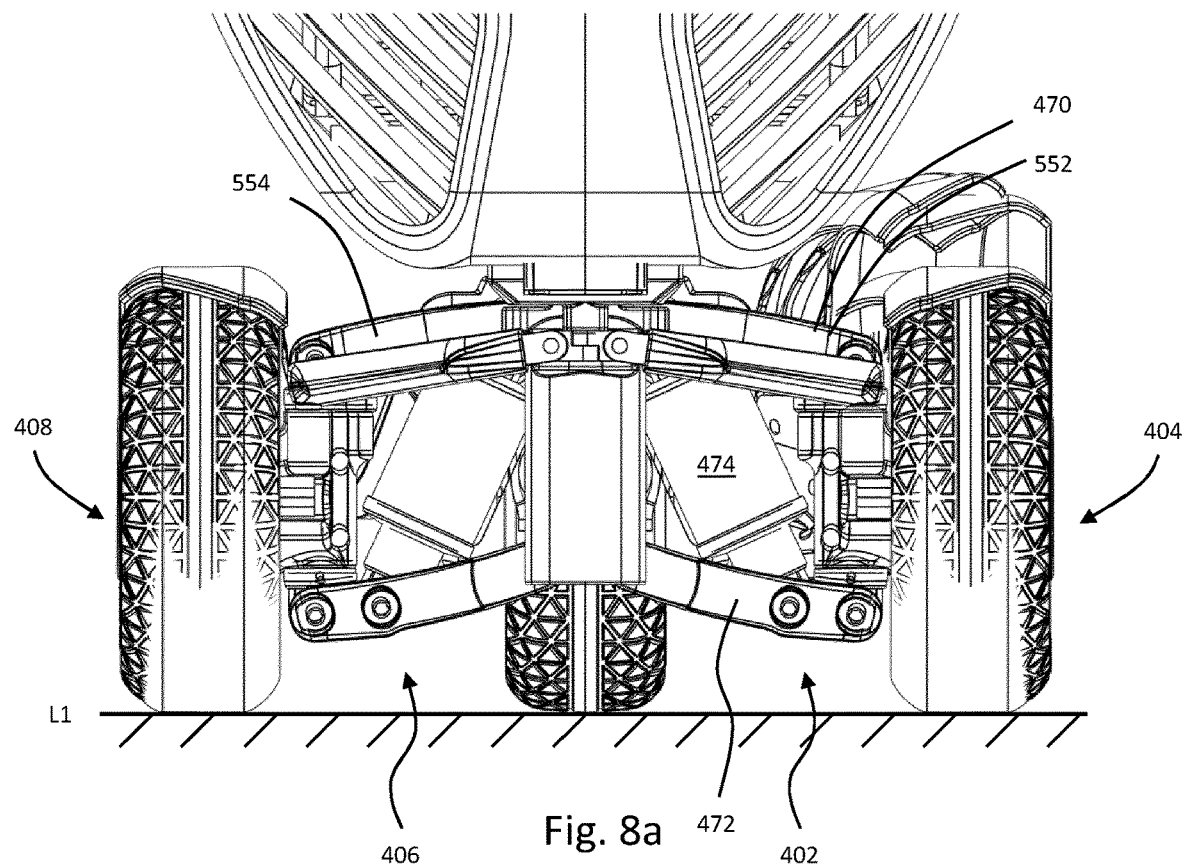
FIG. 8a is a front view of a part of the scooter of FIG. 1 in a neutral condition.
Figure 8B:
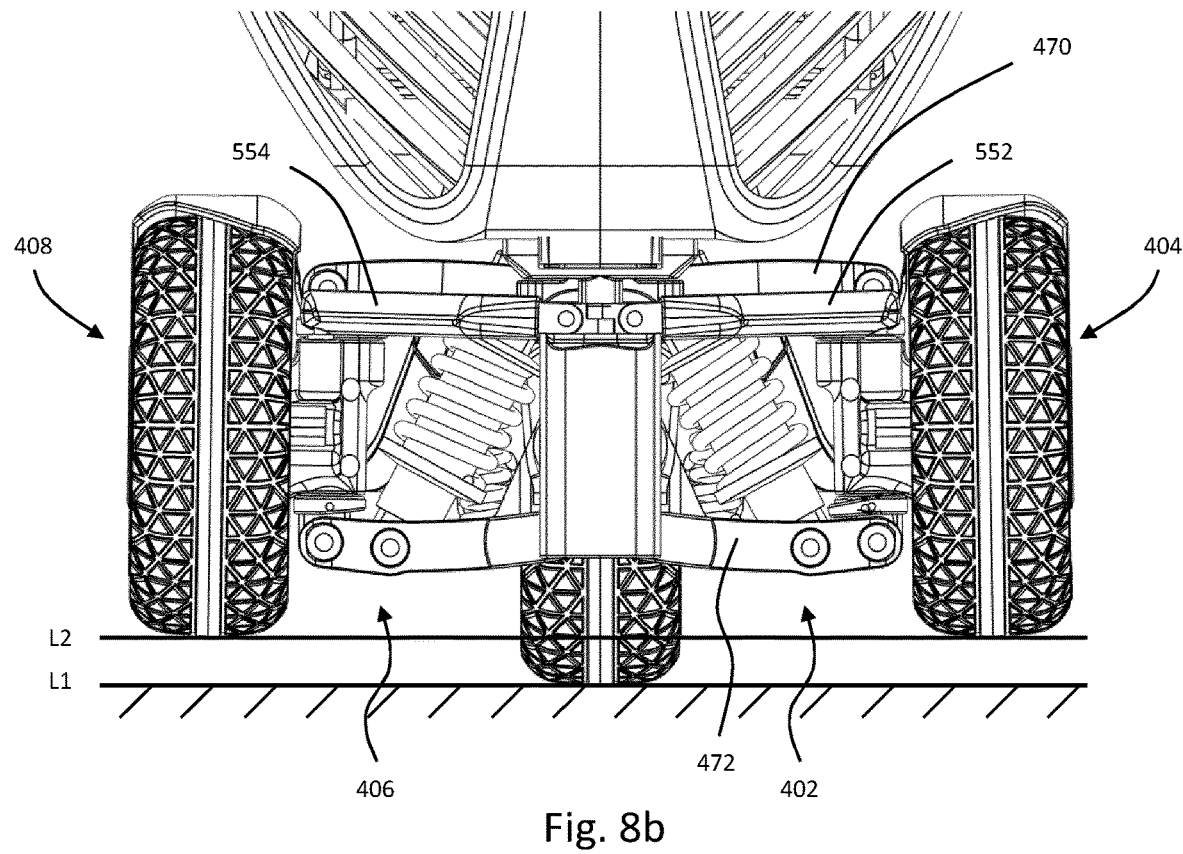
FIG. 8b is a front view of a part of the scooter of FIG. 1 in an articulated condition of the front suspension.

Comparing FIGS. 8a and 8b, articulation of the front suspension is shown. In FIG. 8a, the suspension is in a neutral, unloaded position. The deck is level and all three wheels rest on a first level L1. Turning to FIG. 8b, the front wheels have been raised relative to the deck to a second, higher level L2. In doing so, both of the wheels 404, 408 have caused the left and right suspension subassemblies 402, 406 respectively to articulate. For example, with respect to the left suspension 402, the upper and lower wishbones 470, 472 have rotated in an anti-clockwise direction (viewing FIG. 8a) to become parallel to the horizontal plane. In doing so, the left spring-damper assembly 474 has resiliently compressed resulting in a damping force contrary to the direction of motion, and a resilient force acting to restore the wheel position to FIG. 8a. It will be noted that the steering links 552, 554 have also rotated about their respective end mountings.

Steering

Referring to FIG. 6j, the deck pivot shaft 570 is inserted for rotation about the deck pivot axis DPA into the through-bore 414 of the boss 400 (FIGS. 6b and 6c) to rotationally mount the tiller pivot 546. The front deck mount 544 is attached to the end of the deck pivot shaft 570 and fixed thereto such that the deck mount 544 (and deck when attached) are pivotable about the horizontal deck pivot axis DPA relative to the boss 400.

The rotational position of the deck mount 544 and tiller pivot 546 is resiled back to a neutral position by the use of the two anti-camber spring assemblies 548, 550 that are positioned in compression between the respective anti-camber spring support wings 430, 432 of the boss 400 at the lower ends, and the deck mount 544 at the upper ends.

The tiller pivot shaft 138 is mounted for rotation about the tiller pivot axis TPA in the pivot shaft bore 568 of the tiller pivot 546. Also mounted on the tiller pivot shaft is the centring assembly 560. The steering hub 572 and housing 574 encapsulate the torsion spring 576. The centring assembly 560 is mounted for rotation with the tiller pivot. The centring assembly 560 has several functions. Firstly, the spring abutment protrusion 573 of the tiller pivot 546 is received in the slot 582 and acts as an abutment for either of the spring abutments 588, 590. When the tiller pivot shaft is rotated about the tiller pivot axis TPA, the separation of the (stationary) spring abutment protrusion and moving spring abutment 580 of the steering hub 572 acts to tension the spring, which tries to realign them. Secondly, the steering hub 572 acts as a rotation limit stop as at a predetermined rotational limit (in either direction), the steering lug 584 will abut either stationary pivot limit abutment 575, 577.

Referring to FIG. 6h, the steering links 552, 554 are mounted for rotation about a vertical axis from the underside of the steering lug 584 of the steering hub 572. The steering links 552, 554 are both connected to the steering lug 584 at a respective first end, and to respective steering arms of the wheel hubs at a respective second end. Attachment to the steering hubs is via a pivot shaft engaged with the steering pin receiving bore 486 (for example on the arm 484 of the left hand hub).

Figure 6L:
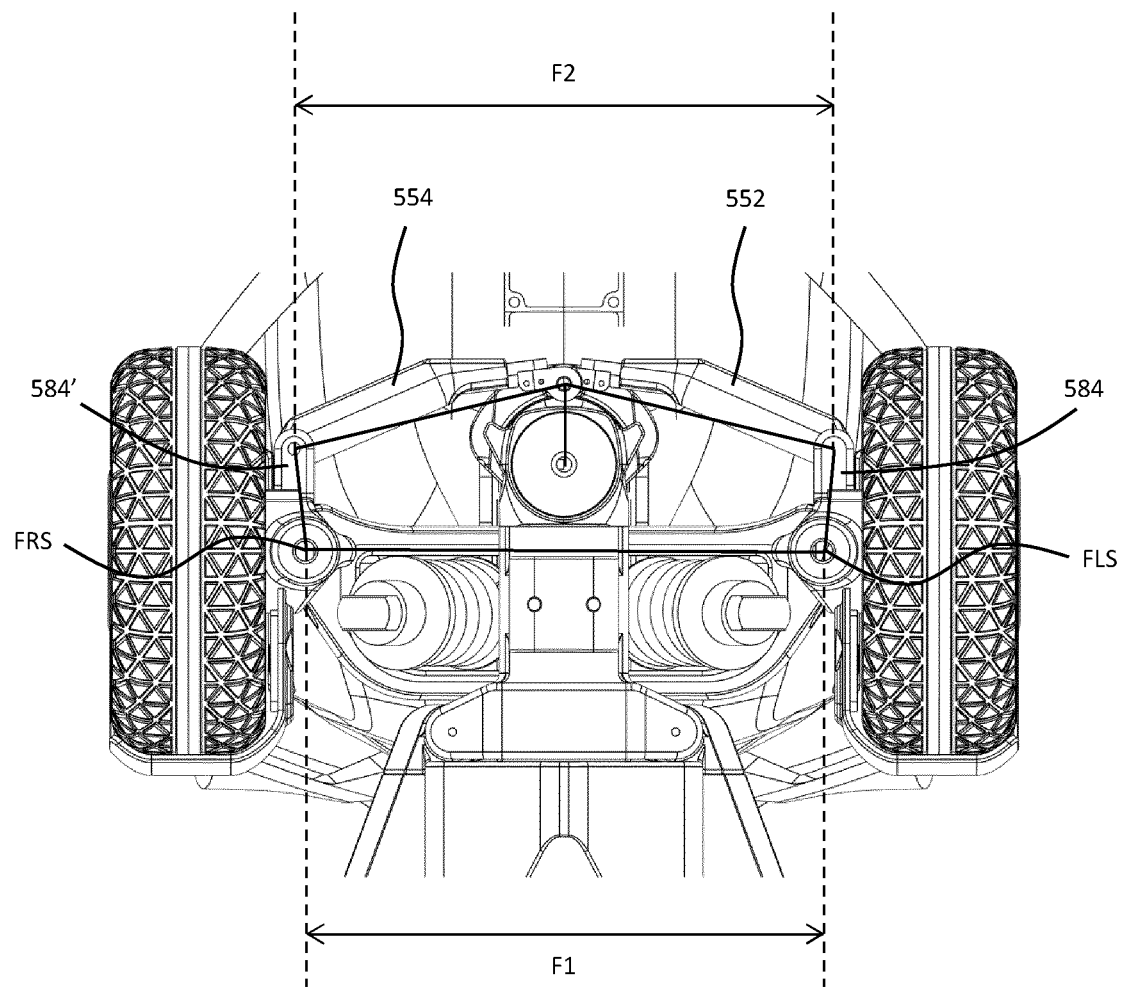

As discussed above, the wheel hubs are rotatable about respective vertical steering axes. Therefore lateral movement of the steering lug either right or left will have the effect of rotating the wheels about their respective steering axes. Referring to FIG. 6l (which is a view from underneath the vehicle, with the lower wishbones removed), the horizontal distance F1 between the steering axes FLS, FRS is less than the distance F2 between the axes of rotation between the steering links 552, 554 and the respective steering lugs 584, 584'. This provides so-called "Ackermann" steering—i.e. when the wheels are turned in a specific direction, the innermost wheel (closest to the centre of the turning circle) will rotate about the steering axis more than the outer wheel. In the present embodiment, F1<F2 because the steering links are forward of the kingpins. It will be noted that if the steering links are rearward of the kingpins then F1>F2 for Ackermann steering.

Figures 9A, 9C:
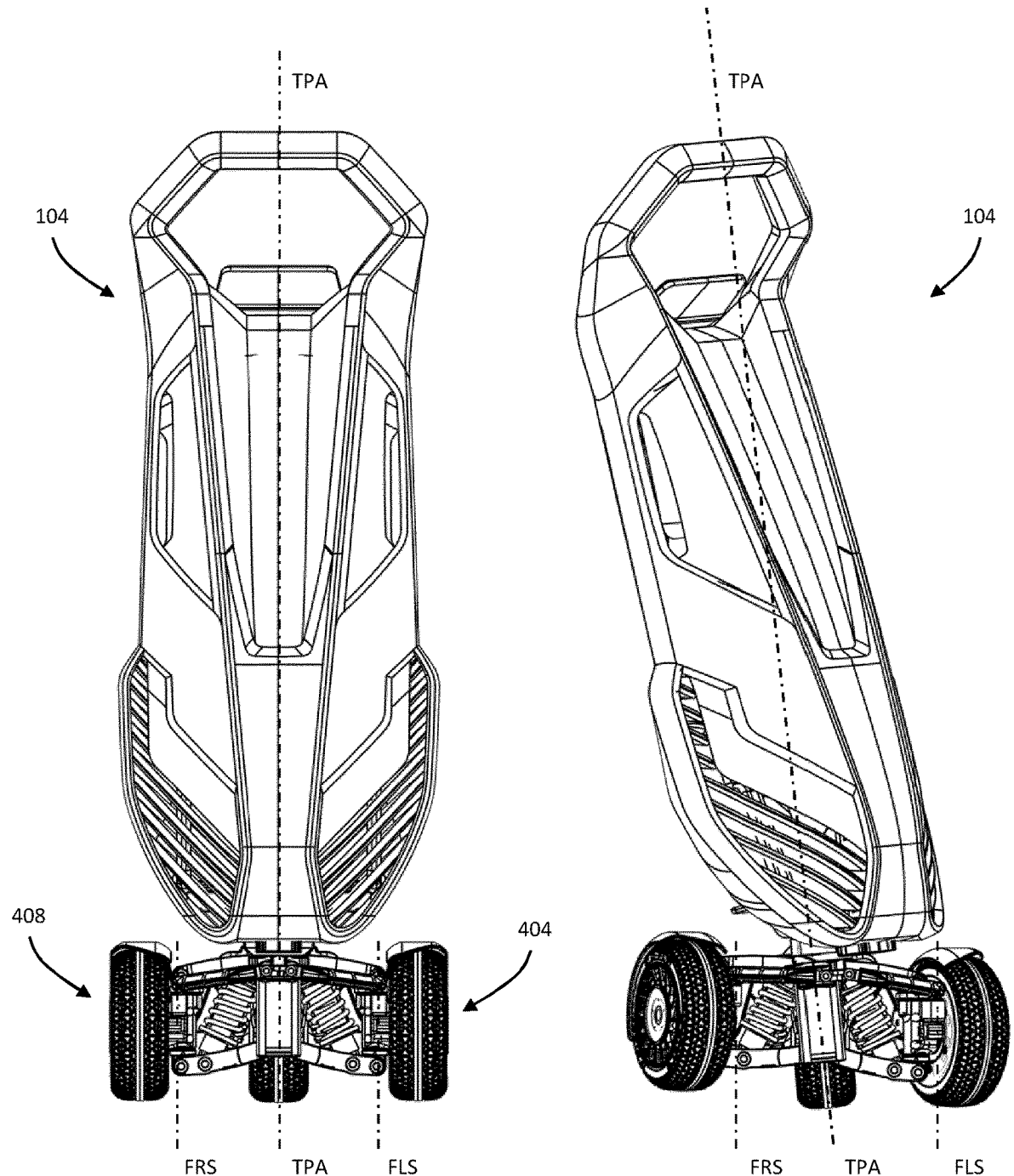
FIGS. 9a and 9b are front and underside views respectively of the scooter of FIG. 1 in a neutral condition.
FIGS. 9c and 9d are front and underside views respectively of the scooter of FIG. 1 in a first steering mode.
Figure 9B:
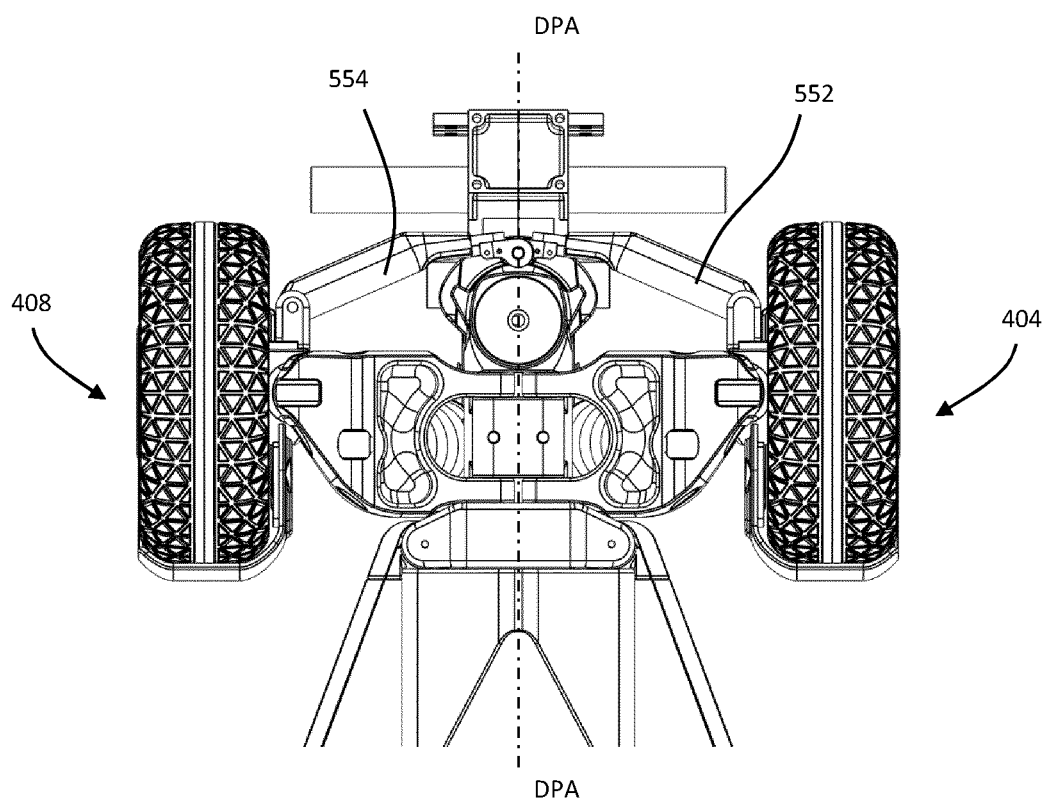
Figure 9D:
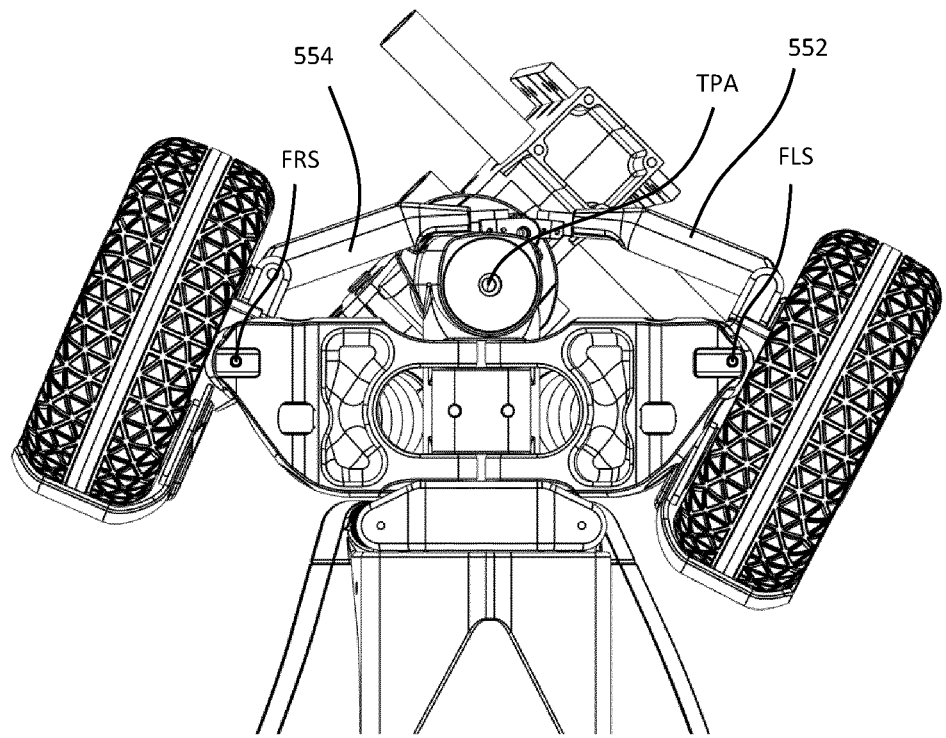

Such lateral movement of the steering lug 584 relative to the boss 400 (to which the suspension is attached) occurs in two ways, or steering modes:

The first mode is 'tiller rotation'. FIGS. 9a to 9d show this. In FIGS. 9a and 9b, the scooter 100 is in a neutral "wheels forward" position.

Rotation of the tiller assembly 104 with the rider's hands rotates the tiller pivot shaft about the tiller pivot axis TPA relative to the tiller pivot 546 and therefore the boss 400. This rotates the steering hub 572 which causes sideways, arcuate motion of the steering lug 584 which acts to steer the wheels simultaneously. This motion can be viewed by comparing FIGS. 9a and 9b to 9c and 9d. In particular, in FIG. 9d, the steering links 552, 554 have been moved to the right (when viewed, or to the left from the rider's perspective) because they are attached to the lug 584 at a position offset from the tiller pivot axis TPA.

Figure 10A:
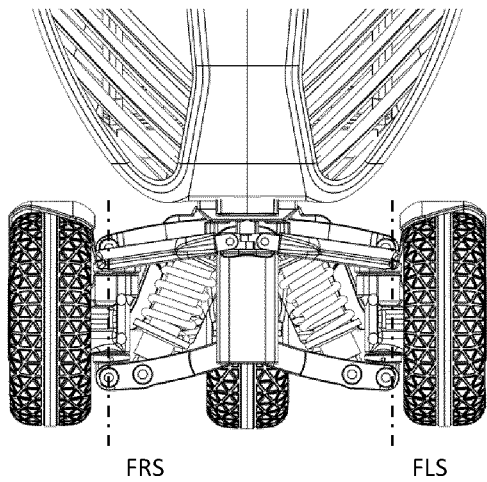
FIGS. 10a to 10c are front, rear and rear section views respectively of the scooter of FIG. 1 in a neutral condition.
Figure 10D:
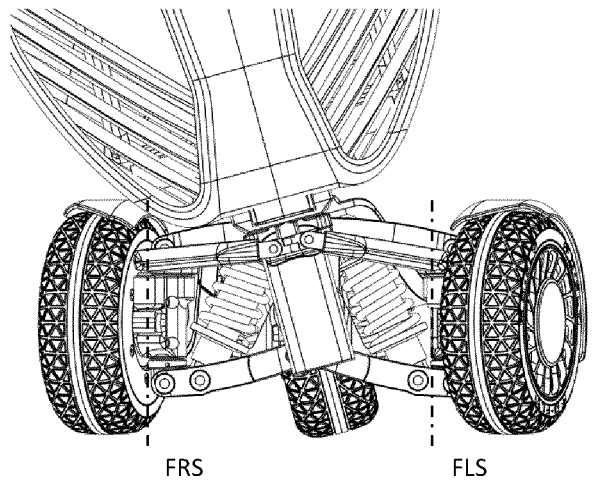
FIGS. 10d to 10f are front, rear and rear section views respectively of the scooter of FIG. 1 in a second steering mode.
Figure 10B:
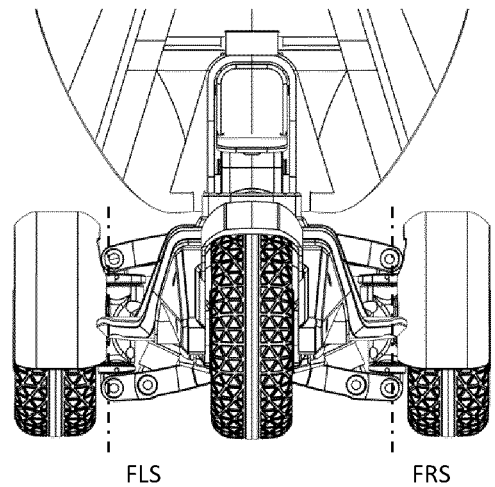
Figure 10E:
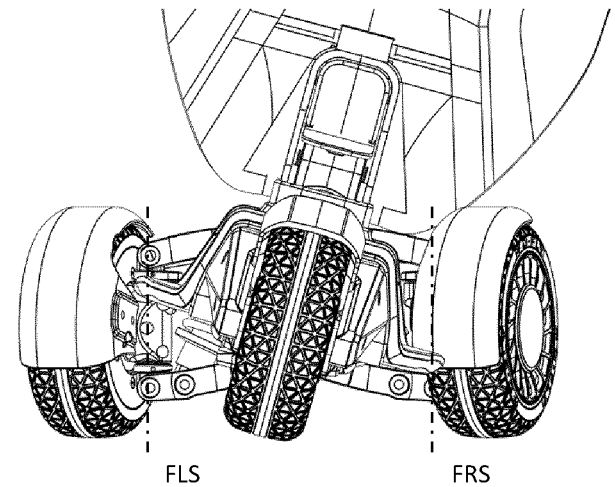
Figure 10C:
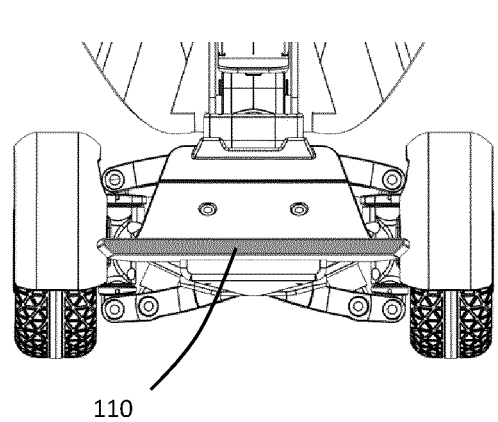
Figure 10F:
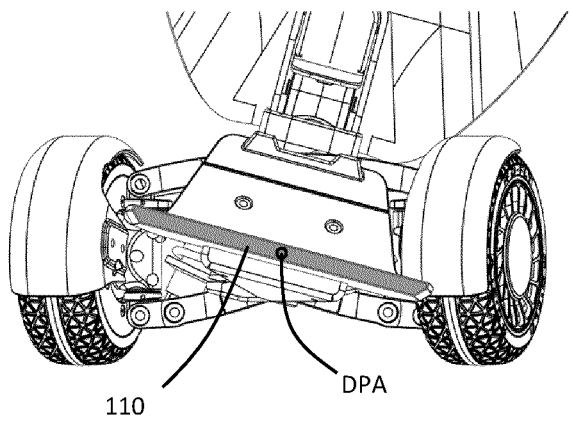

The second mode is 'deck roll'. FIGS. 10a to 10f show this mode. Note that FIGS. 10c and 10f show a section through the centre of the deck 110. FIGS. 10a to 10c show the scooter 100 in a neutral position.

In this mode, the deck 110 and therefore the deck mount 544 are rotated by the rider's feet (much like a skateboard or snowboard) such that rotation of the 110 and the deck tiller pivot 546 about the deck pivot axis DPA occurs (note that the deck pivot axis is shown in FIG. 9b for clarity). This causes sideways, arcuate motion of the steering lug 584 which acts to steer the wheels simultaneously about their respective steering axes FLS, FRS.

The above mechanism supports these modes either individually, or in combination. Crucially, both modes act to actuate the steering lug 584 which steers the wheels. It will be noted with reference to FIG. 6h that the horizontal distance between the tiller pivot axis TPA and the steering lug 546 is less than the vertical distance between the deck pivot axis DPA and the steering lug 546.

Rear Suspension

The rear wheel 700 is mounted for rotation about the rear wheel axis RW between the arms 714, 716 of the rear fork 708. The entire rear wheel carriage 702 (of which the fork 708 is a part) is mounted to the rear deck mount 704 for rotation about a rear wheel suspension axis RWS. The spring-damper 780 is nested within the spring-damper channel 756, attached to the rear deck mount 704 at a first end and to the fork 708 at a second end (specifically via the spring spin receiving bores 728, 730).

Downward pressure on the deck 110 relative to the wheel 700 (or conversely upward force on the wheel 700 relative to the deck 110) causes the wheel carriage 702 to rotate in a clockwise sense about the rear wheel suspension axis RWS when viewed in FIG. 7b. This acts to extend the spring-damper 780 which provides a damping force against the motion, as well as a resilient spring force to try and restore the neutral position of the rear wheel.

The rear brake 706 can be depressed against the rear wheel 700 against the bias of the spring 772 to provide a frictional braking force as known in the art. This is generally used as an "emergency" brake, as most braking is carried out by reverse-driving the front wheel motors to recover energy into the batteries.

Second Embodiment

Turning to FIG. 11, a second scooter 1100 is shown in accordance with the present invention. For the purposes of the present disclosure it is useful to define global directions and axes as follows:
Direction of forward travel along horizontal longitudinal axis X;
    Rotation about this axis is "roll";
Lateral direction along horizontal axis Y;
    Rotation about this axis is "pitch";
Vertical direction along vertical axis Z;
    Rotation about this axis is "yaw".

The scooter 1100 comprises a deck assembly 1102, a tiller assembly 1104, a front wheel suspension and steering assembly 1106 and a rear wheel assembly 1108.

Structure of the Second Embodiment

The second embodiment is identical to the first embodiment with the exception of the rear wheel assembly 1108. As such, reference numerals relating to the deck assembly 1102, tiller assembly 1104, and the front wheel suspension and steering assembly 1106 features will be numbered per the scooter 100, but 1000 greater.
Rear Wheel Assembly 1108

Figure 12A:
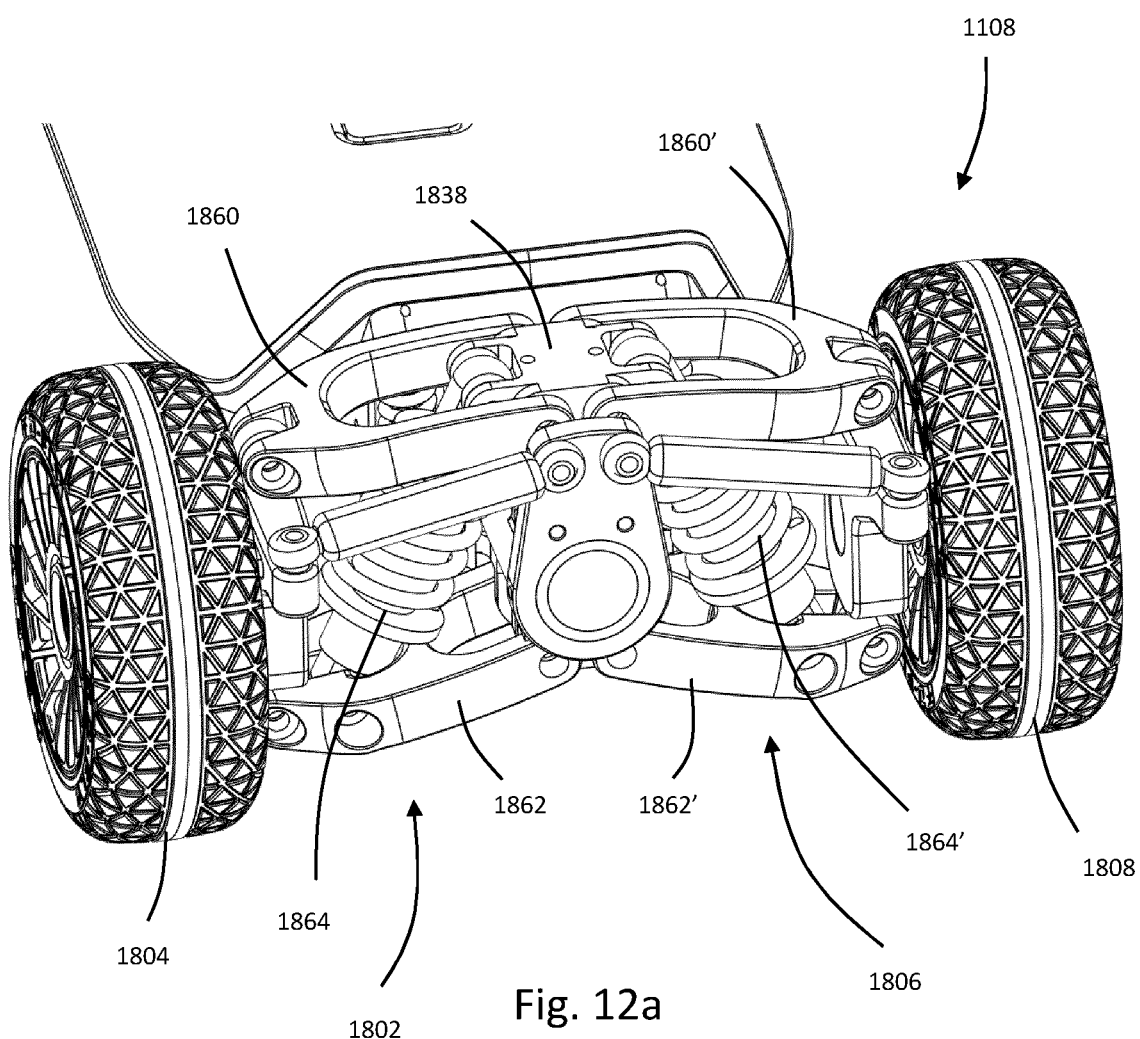
FIG. 12a is a detail view of a portion of the scooter of FIG. 11.
Figure 12B:
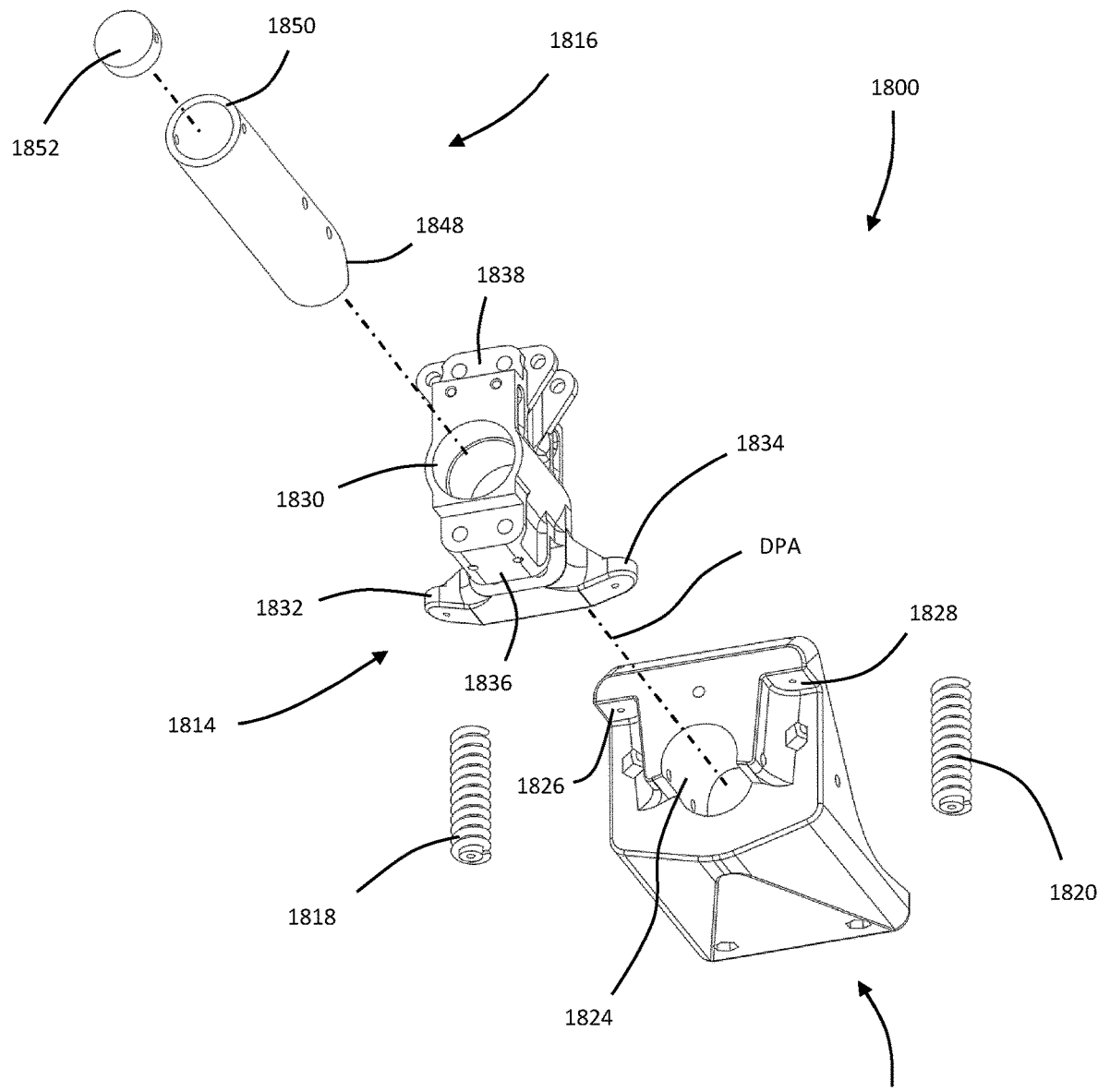
FIG. 12b is an exploded perspective view of various components of the scooter of FIG. 11.
Figure 12C:
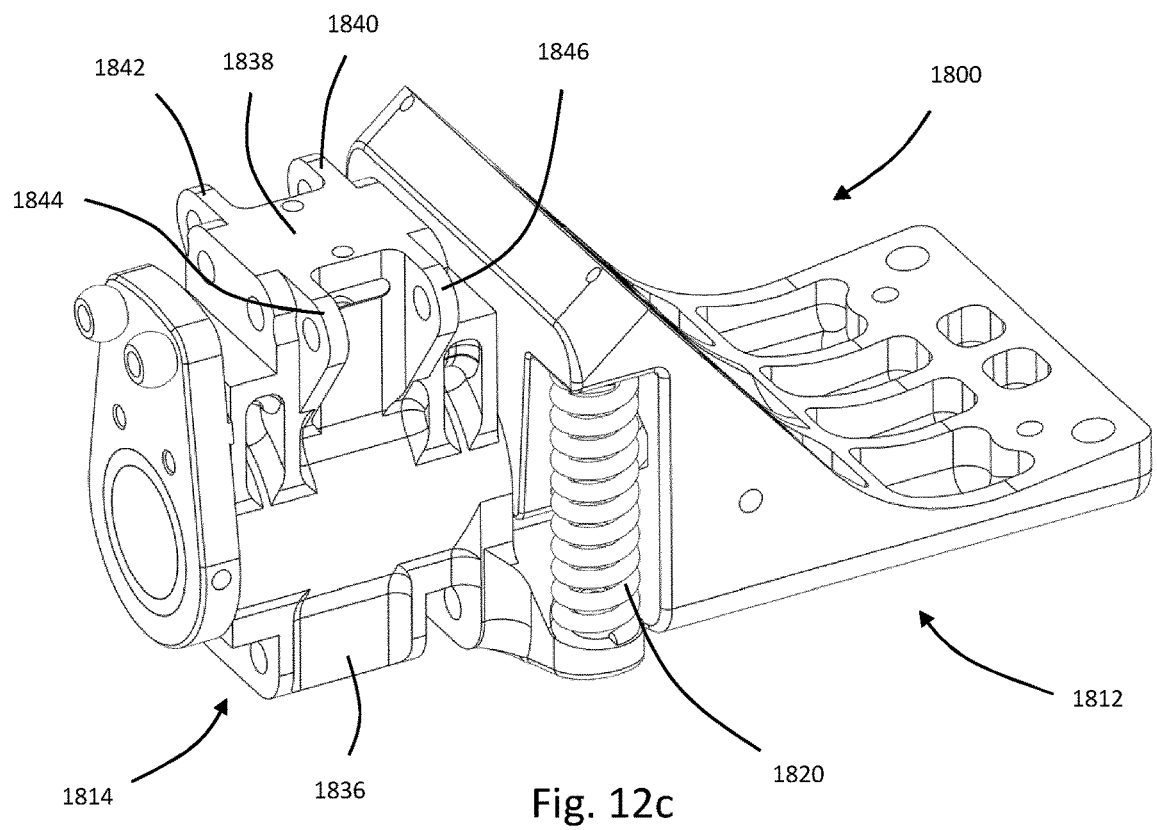
FIGS. 12c and 12d are perspective view of a subassembly of the scooter of FIG. 11.
Figure 12D:
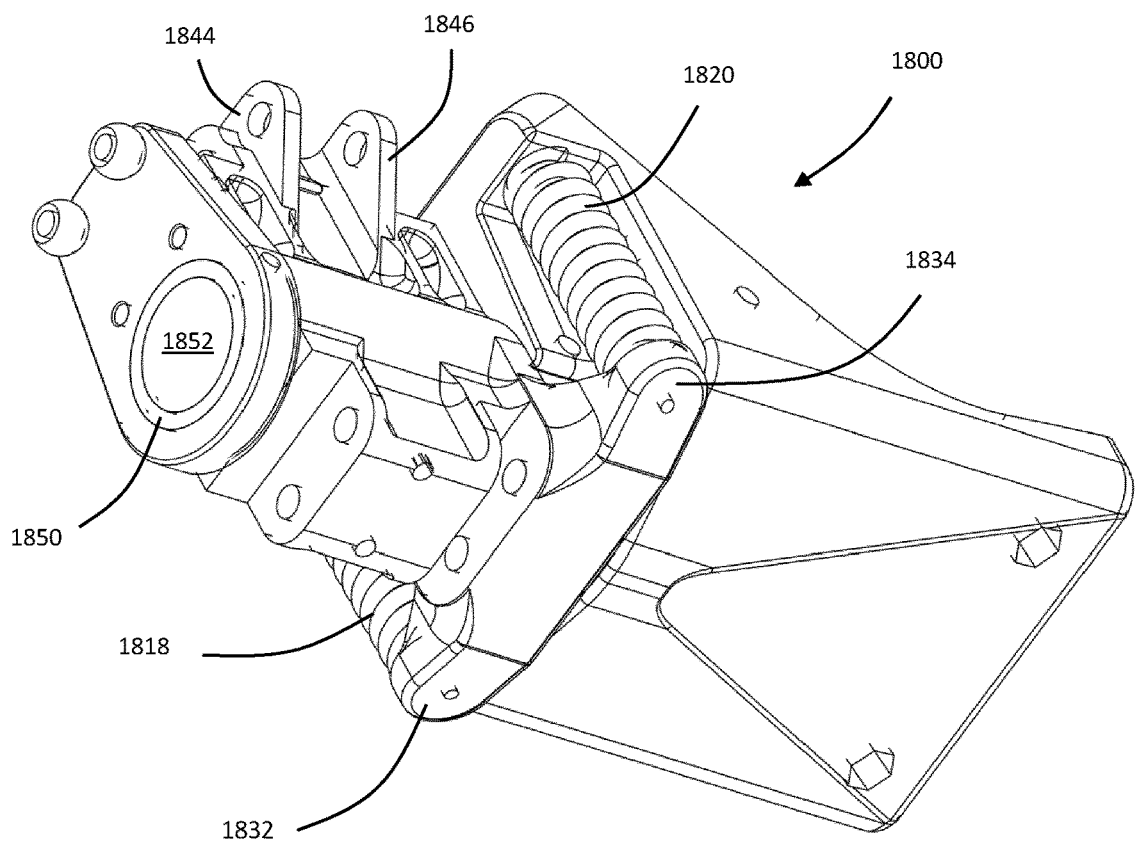
Figure 12E:
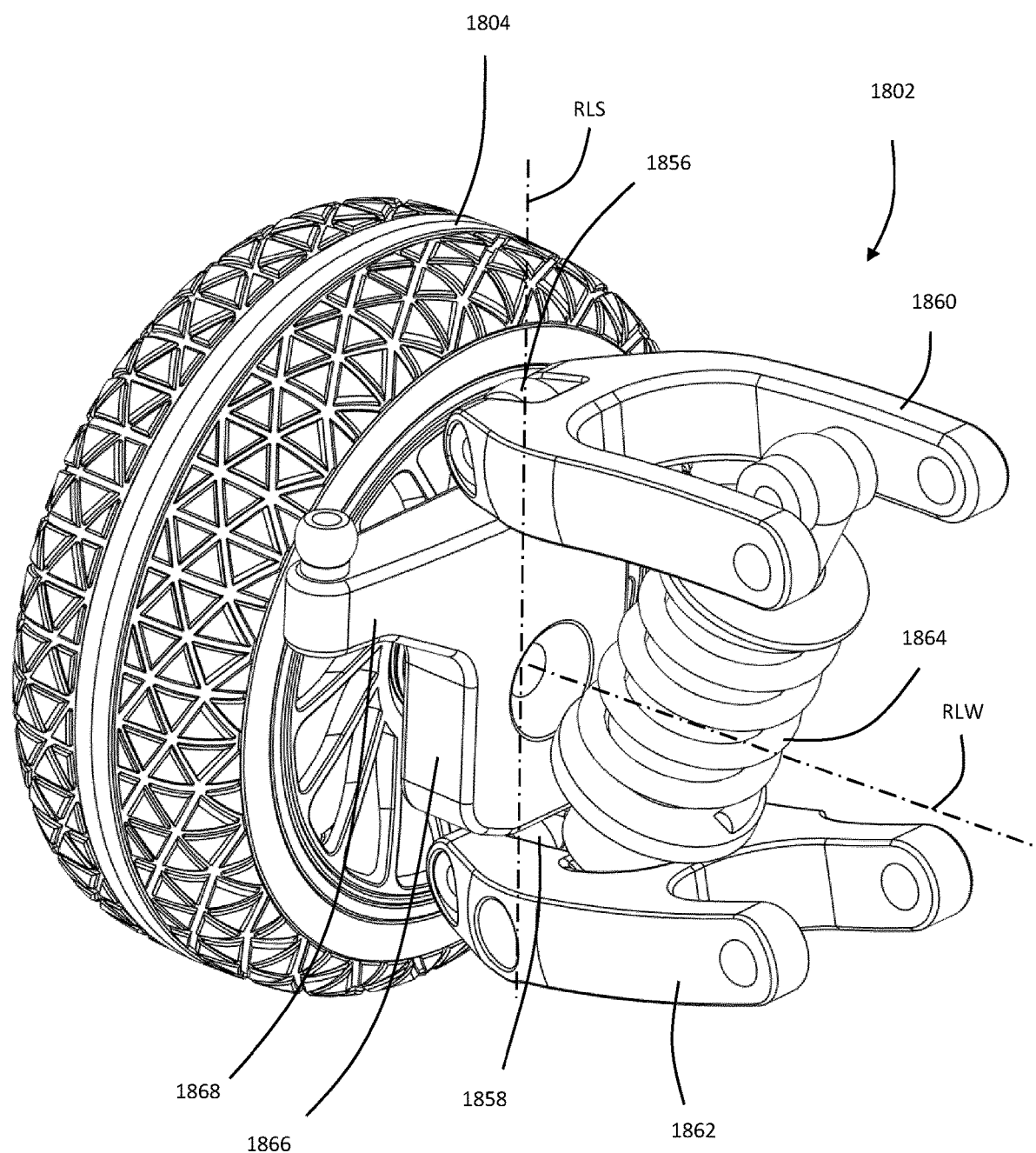
FIG. 12e is a perspective view of the rear left suspension assembly of the scooter of FIG. 11.
Figure 12F:
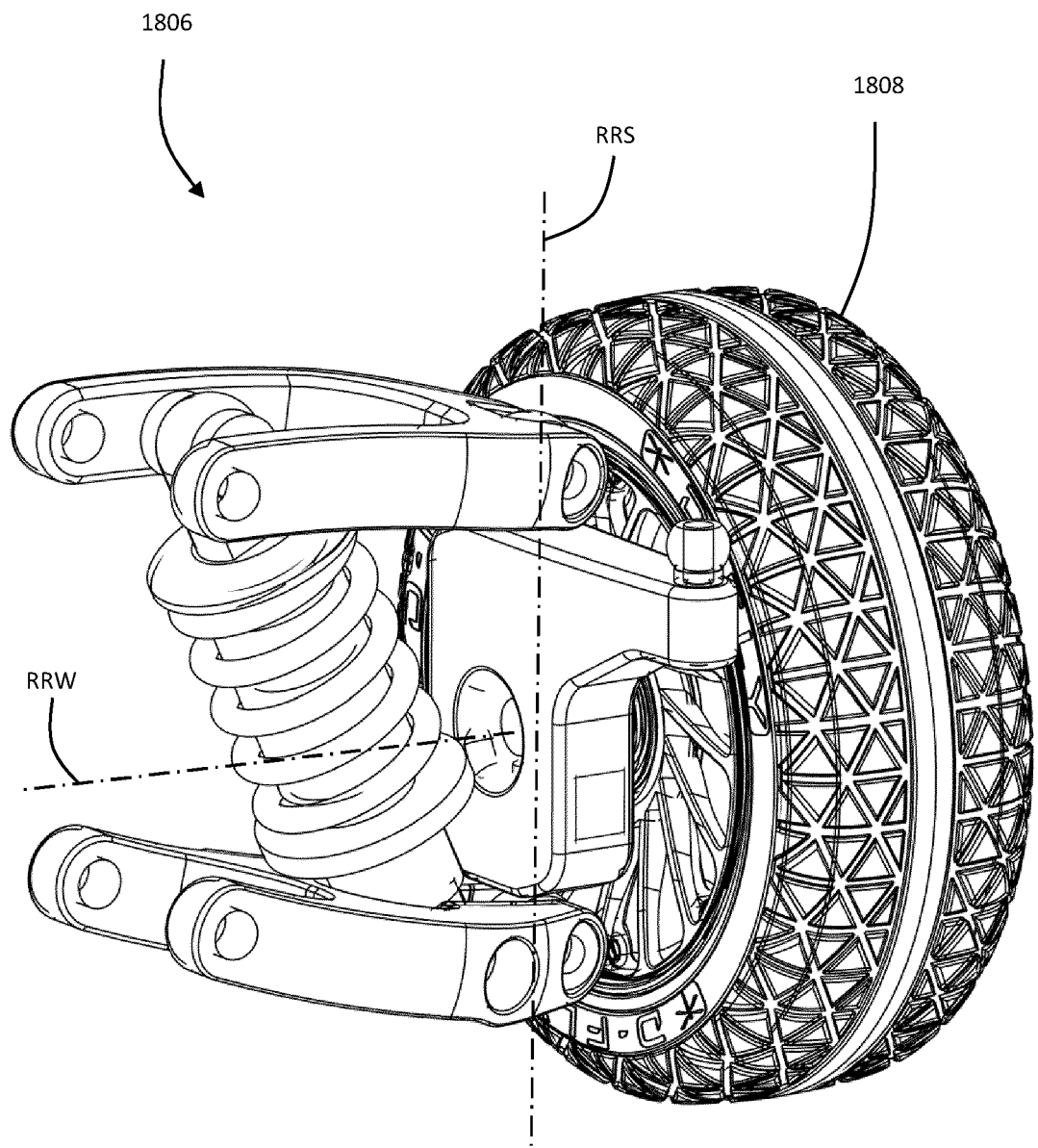
FIG. 12f is a perspective view of the rear right suspension assembly of the scooter of FIG. 11.
Figure 12G:
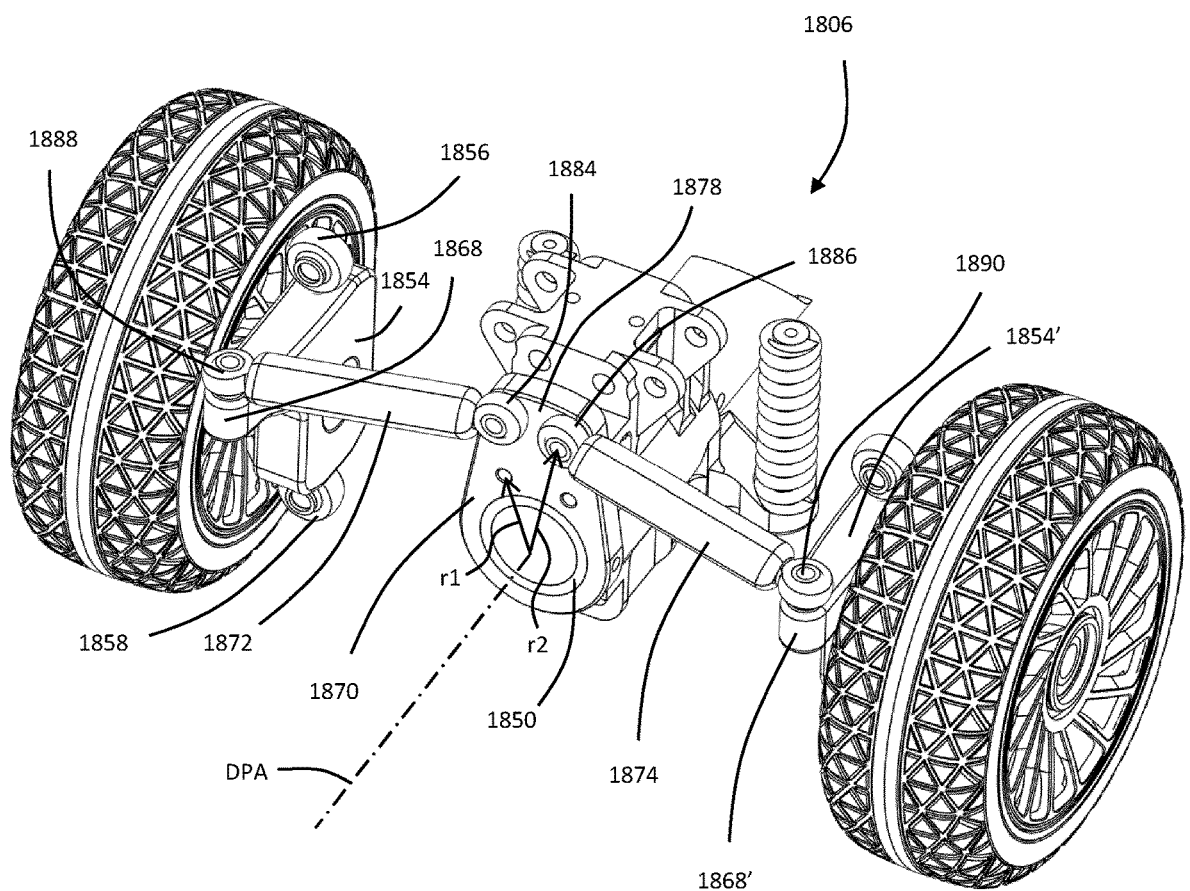
FIG. 12g is a perspective view of the rear steering assembly of the scooter of FIG. 11.

FIGS. 12a to 12g show the rear wheel suspension and steering assembly 1108.
The assembly can be separated into the following parts:
A mounting subassembly 1800 (FIGS. 12b to 12d);
A left suspension subassembly 1802 and left rear wheel 1804 (FIG. 12e);
A right suspension subassembly 1806 and right rear wheel 1808 (FIG. 12f); and,
A steering subassembly 1810 (FIG. 12g).
Mounting Subassembly 1800

Turning to FIGS. 12b to 12d, the mounting subassembly 1800 comprises a rear deck mount 1812, a rear boss 1814, a deck pivot shaft 1816 and left and right anti-camber springs 1818, 1820.

The deck mount 1812 comprises a deck abutment surface 1822 profiled to the underside of the deck 110. The rear deck mount 1812 further defines a deck pivot shaft opening 1824 extending in a generally longitudinal direction along the deck pivot axis DPA. The deck mount 1822 further defines two downwardly-facing camber spring attachment points 1826, 1828.

The rear boss 1814 comprises a pivot shaft throughbore 1830 extending along the deck pivot axis DPA. It also defines two spaced-apart upwardly-facing camber spring attachment points 1832, 1834, either side of the axis DPA. The boss 1814 defines a lower wishbone attachment lug 1836, an upper wishbone attachment lug 1838 and two spaced apart spring-damper attachment flanges 1840, 1842, 1844, 1846 on either side of the upper wishbone attachment lug 1838.

The deck pivot shaft 1816 is generally hollow and cylindrical having a tapered front end 1848, and a flat rear end 1850 into which a plug 1852 is inserted.
Left Suspension Subassembly 1802 and Left Rear Wheel 1804

Turning to FIG. 12e, the left suspension subassembly 1802 is shown. The left suspension subassembly 1802 is of an independent double-wishbone configuration. The assembly comprises a left wheel hub 1854, a left upper wheel pivot 1856, a left lower wheel pivot 1858 a left upper wishbone 1860, a left lower wishbone 1862 and a left spring-damper assembly 1864.

The left wheel hub 1854 comprises a body 1866 configured for rotational mounting of the left wheel 1804 about a rear left wheel axis RLW. The body 1866 defines a steering arm 1868 extending rearwardly therefrom.

The pivots 1856, 1858 are mounted above and below the body 1866 and joined by a steering kingpin for rotation relative thereto about a rear left wheel steering axis RLS The upper, lower wishbones 1860, 1862 and spring damper assembly 1864 are similar to those on the front suspension and will not be described in detail.
Right Suspension Subassembly and Right Rear Wheel 1808

The right suspension subassembly and wheel are a mirror image of the left suspension subassembly and left wheel, as described above. References to the parts will be made with the prime (')—for example right wheel hub 1866'. The right wheel 1804' rotates about a right wheel rotation axis RRW, which in a neutral steering position is parallel with the left wheel rotation axis RLW.
Steering Subassembly The steering subassembly 1806 comprises:
a deck pivot cam 1870;
a left-hand steering link 1872; and,
a right hand steering link 1874.

Referring to FIG. 12g, the deck pivot cam 1870 is a generally flat plate having a pivot shaft receiving formation 1876, and an eccentric portion 1878 comprising a first set of link openings 1880 at a first radius r1 from the deck pivot axis DPA and a second set of link openings 1882 at a second, greater radius from the deck pivot axis DPA.

The left and right hand steering links 1872, 1874 comprise respective ball joints 1884, 1886 at a medial end and respective ball joints 1888, 1890 at a lateral end.

Assembly and Operation of the Second Embodiment

Referring to FIGS. 12b to 12d, the deck pivot shaft 1816 is attached to the deck mount 1812 by attachment inside the opening 1824. It is then inserted into the throughbore 1830 in the boss 1814 such that the deck mount 1812 (and deck 110 attached thereto) can rotate about the deck pivot axis DPA.

The relative rotation between the deck mount 1812 and the boss 1814 is controlled by the two anti-camber springs 1818, 1820 extending between the points 1826, 1832 and 1828, 1834 respectively. As such, the mount 1812 and boss 1814 are resiliently biased to a neutral position (per FIG. 12a).

The left and right suspension subassemblies 1802, 1806 are attached to the boss 1814. The upper wishbones 1860, 1860' are attached to the upper wishbone lug 1838, and the lower wishbones 1862, 1862' attached to the lower wishbone lug 1836. The wishbones are mounted for rotation relative to the boss about axes parallel to the direction of travel X.

The spring-damper assemblies 1864, 1864' are positioned to extend between the spring damper attachment flanges 1840, 1842, 1844, 1846 of the boss 1814 and the lower wishbones 1862, 1862'.

The deck pivot cam 1870 is mounted to rotate with the shaft 1816, on the opposite side of the boss 1814 to the deck 110. The steering links 1872, 1874 extend in opposite directions from the second set of link openings 1882 to the upper side of the steering arms 1868, 1868' on each respective hub 1854, 1854'.

Figure 13A:
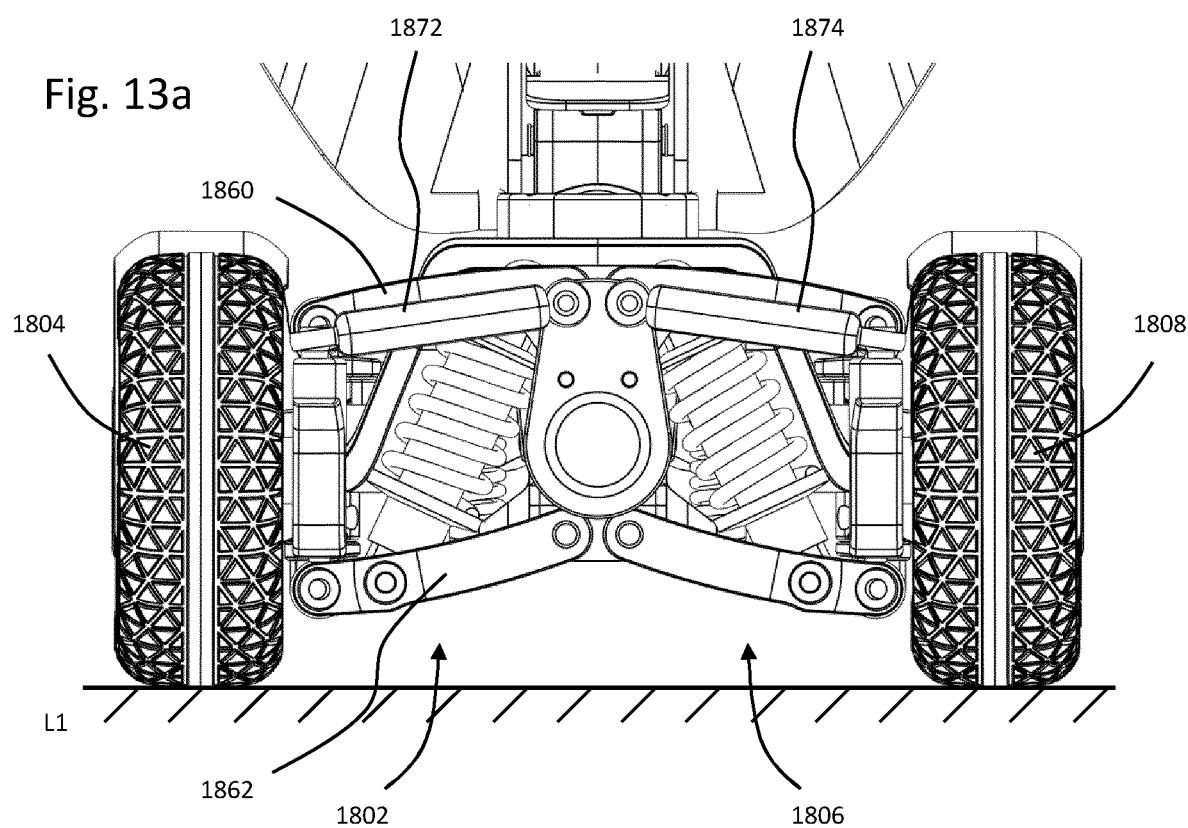
FIG. 13a is a rear view of a part of the scooter of FIG. 11 in a neutral condition.
Figure 13B:
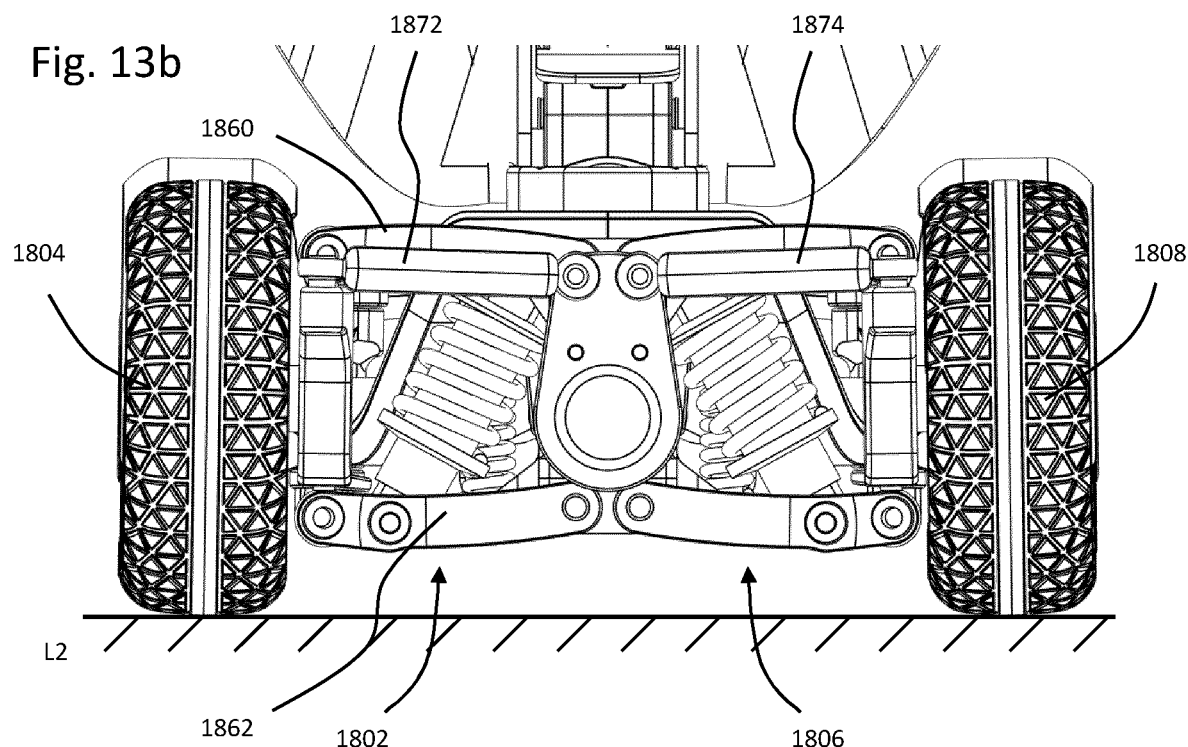
FIG. 13b is a rear view of a part of the scooter of FIG. 11 in an articulated condition of the rear suspension.

Comparing FIGS. 13*a* and 13*b*, articulation of the rear suspension is shown. In FIG. 13*a*, the suspension is in a neutral, unloaded position. The deck is level and all four wheels rest on a first level L1. Turning to FIG. 13*b*, the rear wheels have been raised relative to the deck to a second, higher level L2. In doing so, both of the wheels 1804, 1808 have caused the left and right suspension subassemblies 1802, 1806 respectively to articulate. For example, with respect to the left suspension 1802, the upper and lower wishbones 1860, 1860 have rotated in a clockwise direction (viewing FIG. 13*a*) to become parallel to the horizontal plane (FIG. 13*b*). In doing so, the left spring-damper assembly 1864 has resiliently compressed resulting in a damping force contrary to the direction of motion, and a resilient force acting to restore the wheel position to FIG. 13*a*. It will be noted that the steering links 1872, 1874 have also rotated about their respective end mountings.

Figure 14A:
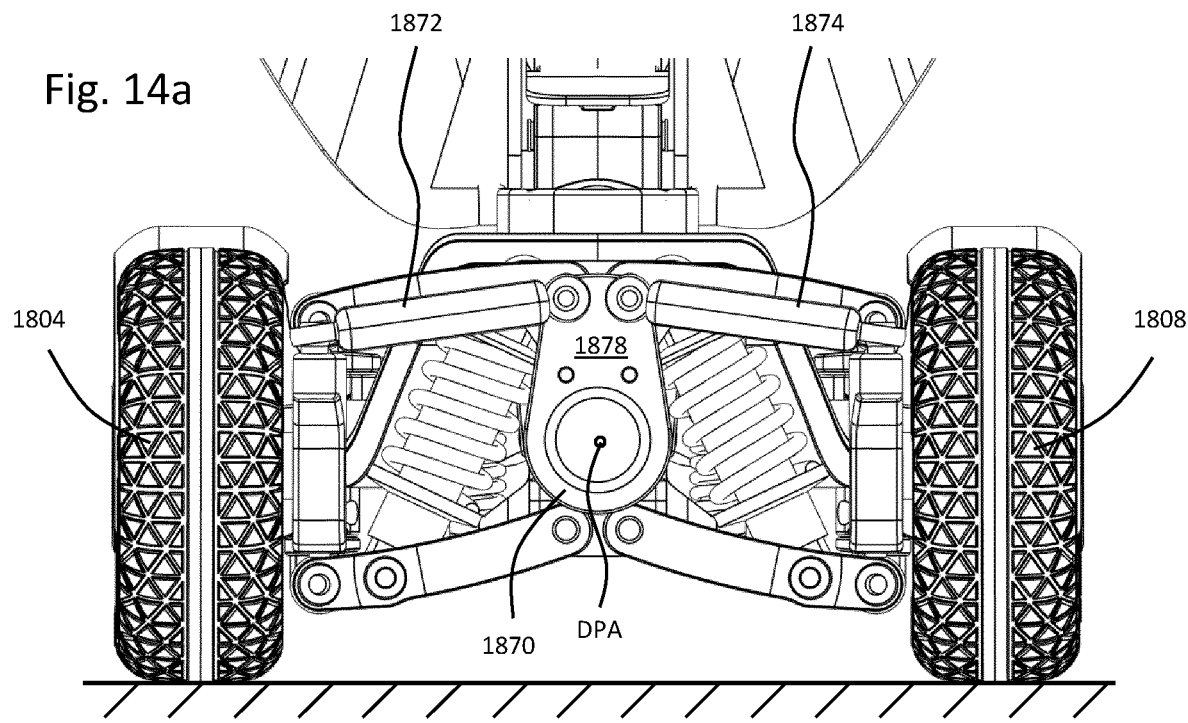
FIG. 14a is a rear view of a part of the scooter of FIG. 11 in a neutral condition.
Figure 14B:
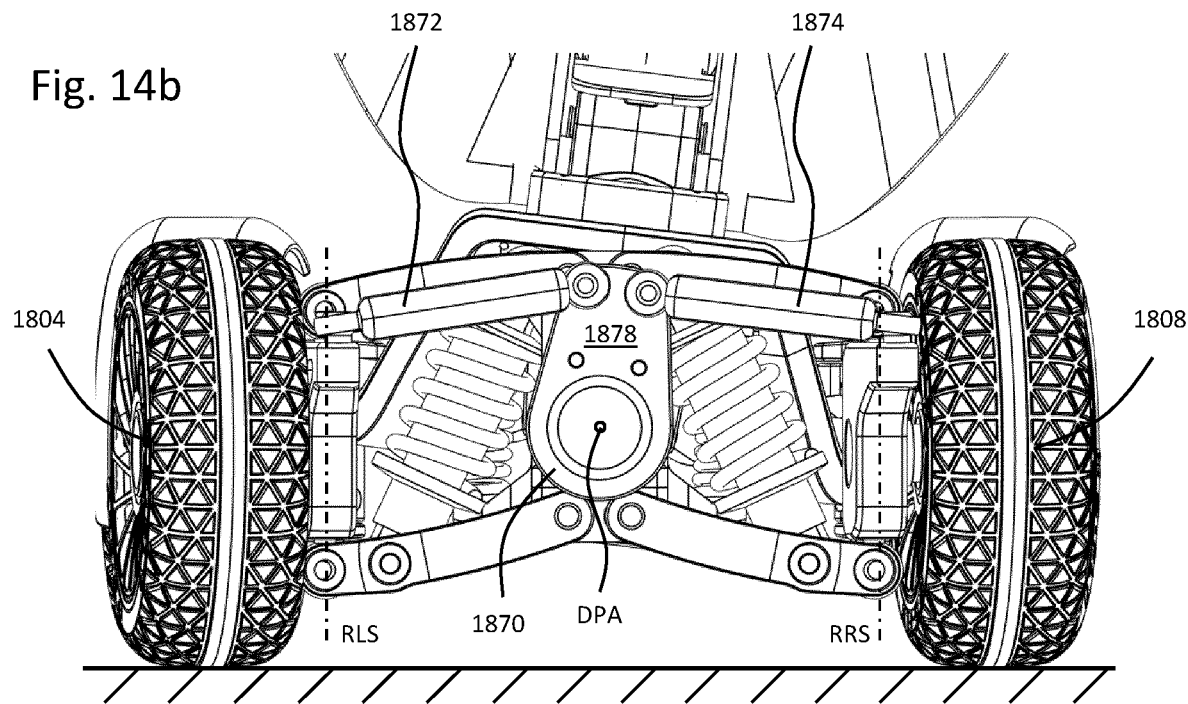
FIG. 14b is a rear view of a part of the scooter of FIG. 11 in an articulated condition of the rear steering system.
Figures 14C, 14D:
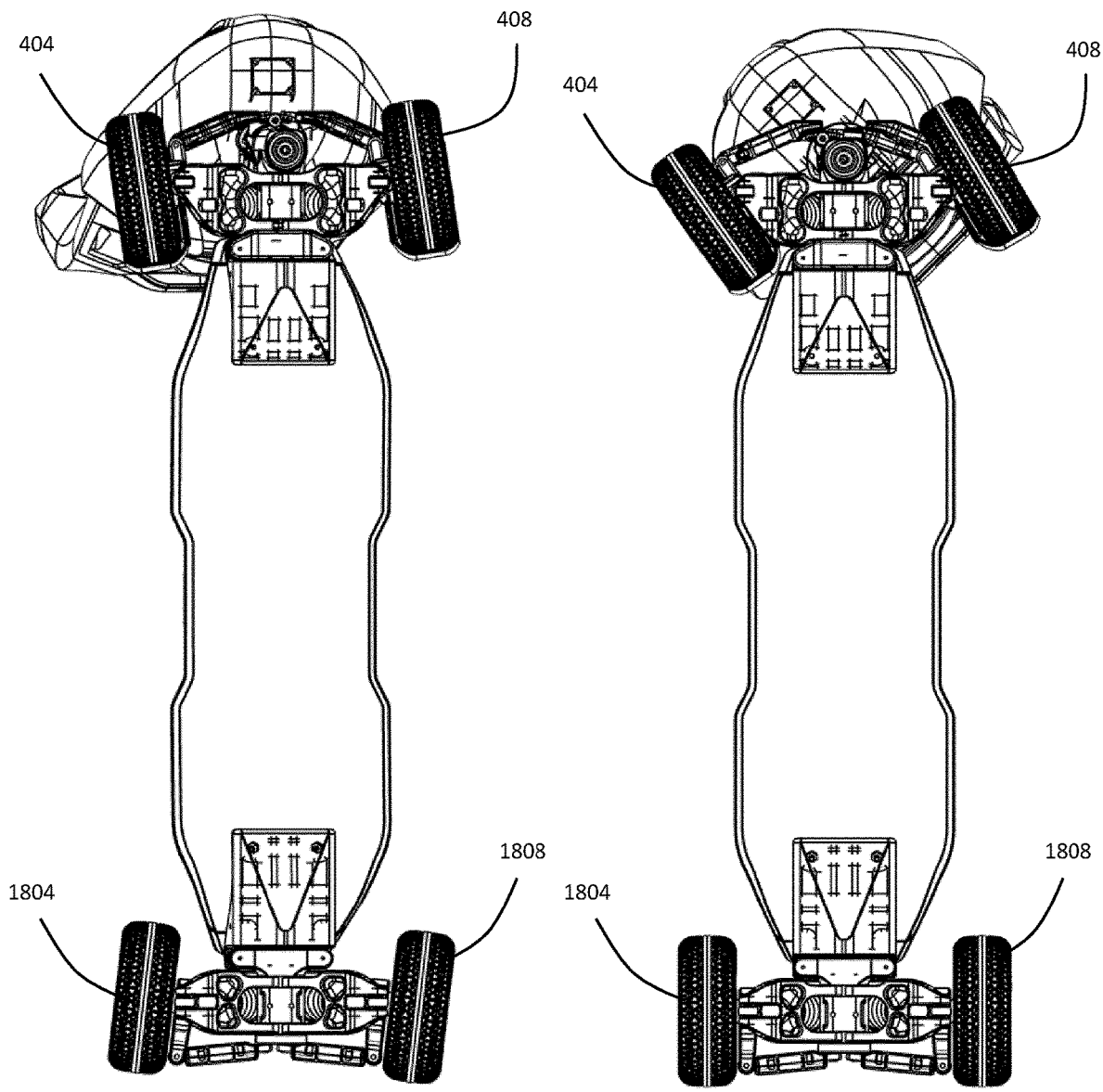
FIG. 14c is a plan view of the scooter of FIG. 11 in an articulated condition of the rear steering system.
FIG. 14d is a plan view of the scooter of FIG. 11 in a tiller pivot steering mode.

The rear steering capability is responsive to deck roll only (unlike the front wheels that are responsive to deck roll and tiller pivot). Comparing FIGS. 14*a* and 14*b*, rotation of the deck in a clockwise direction about the deck pivot axis DPA rotates the deck pivot shaft 1816 in the boss 1814 against the bias of the anti-camber springs 1818, 1820. It will be noted from above, that this lean to the right (in the direction of travel) causes the front wheels to rotate to steer to the right (i.e. in a clockwise direction about their respective steering axes FLS, FRS in plan). Such motion acts to move the eccentric portion 1878 of the deck pivot cam 1870. This also moves the steering links 1872, 1874 to the right, to rotate the hubs 1854, 1854' (and therefore wheels) in an anti-clockwise direction in plan about the rear steering axes RLS, RRS. In other words, the rear wheels steer to the left. FIG. 14*c* shows the steering motion of the wheels 1804, 1808 during board lean. FIG. 14*d* shows the wheel positions during the tiller pivot mode of steering—the rear wheels 1804, 1808 are not affected by this mode, and remain forward facing.

Figure 14E:
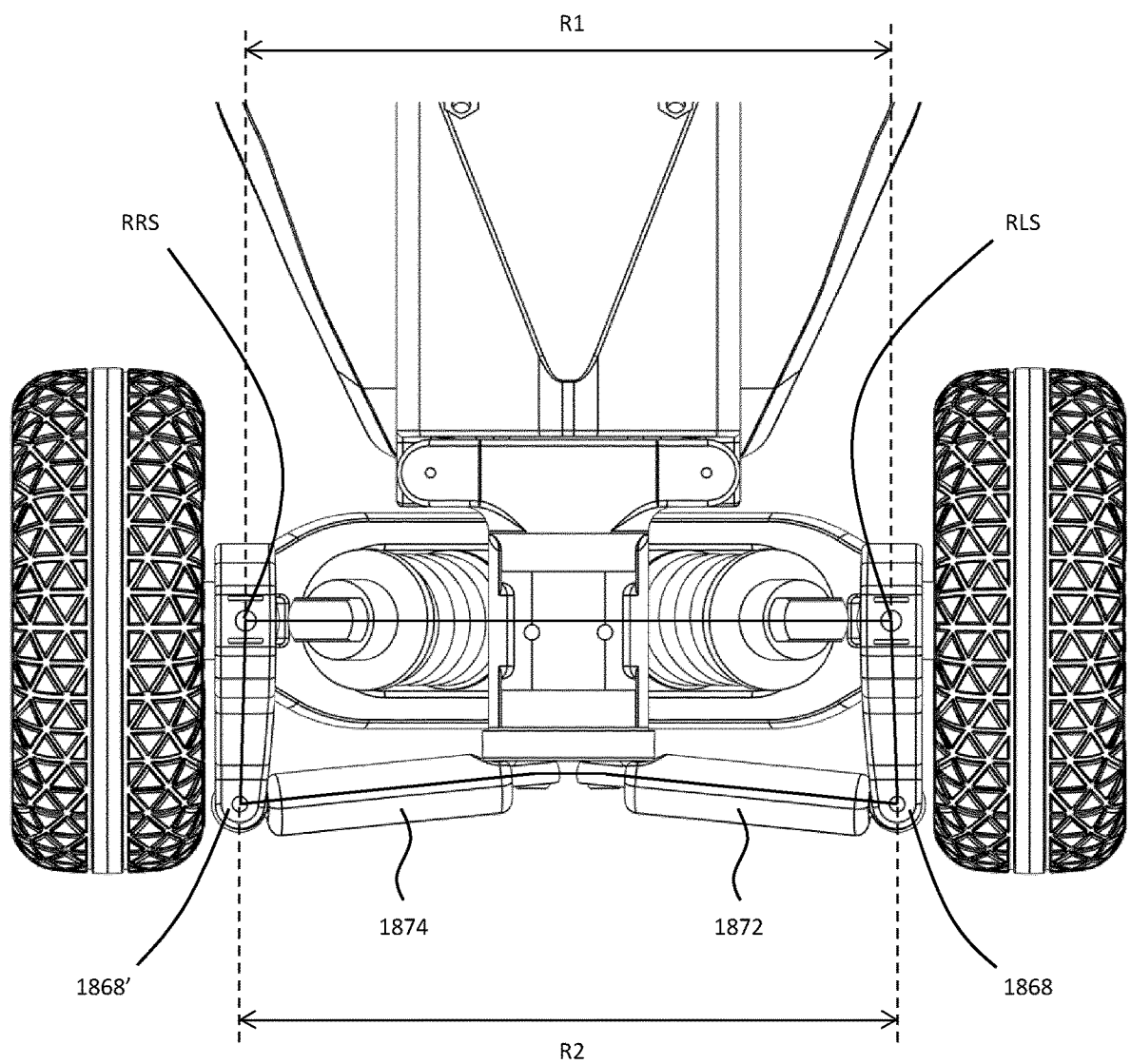
FIG. 14e is an underside view of the rear steering system.

Referring to FIG. 14*e*, (which is a view from underneath the vehicle, with the lower wishbones removed), the horizontal distance R1 between the steering axes RLS, RRS is less than the distance R2 between the axes of rotation between the steering links 1872, 1874 and the respective steering lugs 1868, 1868'. This provides so-called "Ackermann" steering—i.e. when the wheels are turned in a specific direction, the innermost wheel (closest to the centre of the turning circle) will rotate about the steering axis more than the outer wheel. In the present embodiment, R1<R2 because the steering links are forward of the kingpins. It will be noted that if the steering links are rearward of the kingpins then R1>R2 for Ackermann steering.

Adjustment of the Rear Steering of the Second Embodiment

The rear steering subassembly 1810 can be adjusted to provide a different level of rear steering assistance to the rider. Comparing FIGS. 15*a* and 15*b*, FIG. 15*a* is configured as above—i.e. with the steering links 1872, 1874 extending in opposite directions from the second set of link openings 1882 to the upper side of the steering arms 1868, 1868' on each respective hub 1854, 1854'. In FIG. 15*b*, the links 1872, 1874 have been removed and replaced extending in opposite directions from the first set of link openings 1880 to the lower side of the steering arms 1868, 1868' on each respective hub 1854, 1854'. The lower radius of the first openings 1880 means that rotation of the deck will provide a much lower degree of movement for the links 1872, 1874 thus producing a lesser rear steer effect. This is useful for e.g. beginners, and those who are less interested in "carving" turns with the deck lean mode of steering.

The invention claimed is:

1. A scooter comprising:
   a deck for a rider to stand on;
   a tiller projecting upwardly from the deck in use;
   two front wheels;
   a steering mechanism configured to steer the two front wheels about respective steering axes; and,
   at least one rear wheel;
   wherein the steering system has:
   a first mode of steering in which rotation of the tiller about a vertical axis steers the wheels; and,
   a second mode of steering in which rotation of the deck about a horizontal axis steers the wheels.

2. The scooter according to claim 1, comprising a central boss, wherein the tiller is mounted for rotation relative to the central boss about the vertical axis; and the deck is mounted for rotation relative to the central boss about the horizontal axis.

3. The scooter according to claim 2, wherein the steering system comprises a pair or steering arms connected to respective front wheels, the steering arms being connected to a steering hub, wherein the steering hub is configured to move with rotation of the tiller in the first steering mode, and with rotation of the deck in the second steering mode.

4. The scooter according to claim 3, wherein the steering hub is mounted for rotation with the tiller, the tiller is mounted for rotation in a tiller pivot member about the vertical axis, and the tiller pivot member is mounted for rotation in the central boss about the horizontal axis.

5. The scooter according to claim 2, comprising a resilient centring mechanism for resiling the tiller to a predetermined neutral rotational position relative to the central boss.

6. The scooter according to claim 2, comprising an anti-camber mechanism for resiling the deck to a predetermined neutral rotational position relative to the central boss.

7. The scooter according to claim 2, wherein the two front wheels are mounted to the central boss via a suspension system.

8. The scooter according to claim 7, wherein the suspension system is a double-wishbone suspension system.

9. The scooter according to claim 1, wherein the rear wheel is mounted for rotation in a rear wheel mount, and wherein the deck is rotatable about the horizontal axis about the rear wheel mount.

10. The scooter according to claim 1, comprising a pair of rear wheels and a rear steering mechanism configured to steer the two rear wheels about respective steering axes.

11. The scooter according to claim 10, wherein rotation of the deck about the horizontal axis steers the wheels.

12. The scooter according to claim 11, wherein rotation of the deck about the horizontal axis causes the front wheels to steer in a first direction about their respective steering axes, and causes the rear wheels to steer a second, opposite, direction about their respective steering axes.

13. The scooter according to claim 10, wherein the rear steering system is configured to steer the rear wheels in the second mode of steering but not in the first mode of steering.

14. The scooter according to claim 10, wherein the rear steering mechanism is adjustable to provide at least two steering settings, in which each steering steers the wheels by a different angle in response to a predetermined degree of deck roll.

15. The scooter according to claim 10, wherein at least one of the front steering mechanism or the rear steering mechanism is configured for Ackermann steering.

16. A motorised scooter comprising:
a deck for a rider to stand on;
a tiller projecting upwardly from the deck in use;
at least one front wheel; and
at least one rear wheel;
wherein at least one wheel is motorised;
wherein the tiller comprises a left-hand grip, a right-hand grip, and a first control member between the left-hand grip and right-hand grip, the control member being pivotable about a horizontal axis to control power to the motorised wheel,
wherein the first control member comprises a first control region adjacent the left-hand grip, and a second control region adjacent the right-hand grip, and
wherein the first and second control regions are spaced-apart and comprising a second control member between the first and second control regions.

17. The motorised scooter according to claim 16, wherein the control regions are at least part-cylindrical.

18. The motorised scooter according to claim 17, wherein the second control member is a button.

19. A motorised scooter comprising:
a deck for a rider to stand on;
a tiller projecting upwardly from the deck in use;
at least one front wheel; and
at least one rear wheel;
wherein at least one wheel is motorised;
wherein the tiller comprises a left-hand grip, a right-hand grip, and a first control member between the left-hand grip and right-hand grip, the first control member being pivotable about a horizontal axis to control power to the motorised wheel,
wherein the first control member comprises a first control region adjacent the left-hand grip, and a second control region adjacent the right-hand grip,
wherein the control regions are at least part-cylindrical, and
wherein a second control member is a button.

* * * * *